US010122986B2

(12) United States Patent
Hattori et al.

(10) Patent No.: US 10,122,986 B2
(45) Date of Patent: Nov. 6, 2018

(54) IMAGE PROCESSING DEVICE AND IMAGE PROCESSING METHOD

(75) Inventors: Shinobu Hattori, Tokyo (JP); Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 679 days.

(21) Appl. No.: 13/981,650

(22) PCT Filed: Feb. 16, 2012

(86) PCT No.: PCT/JP2012/053675
§ 371 (c)(1),
(2), (4) Date: Jul. 25, 2013

(87) PCT Pub. No.: WO2012/111755
PCT Pub. Date: Aug. 23, 2012

(65) Prior Publication Data
US 2013/0335525 A1     Dec. 19, 2013

(30) Foreign Application Priority Data

Feb. 18, 2011   (JP) ................................. 2011-033847

(51) Int. Cl.
*H04N 13/00* (2018.01)
*H04N 13/111* (2018.01)
(Continued)

(52) U.S. Cl.
CPC .............. *H04N 13/111* (2018.05); *G06T 7/13* (2017.01); *H04N 13/106* (2018.05);
(Continued)

(58) Field of Classification Search
CPC ..... G06T 1/20; G06T 7/0085; H04N 13/0007; H04N 13/0011; H04N 13/0029; H04N 13/0048; H04N 13/0242; H04N 2213/005
(Continued)

(56) References Cited

U.S. PATENT DOCUMENTS 9,153,032 B2 *  10/2015  Jung ..................... G06T 7/0085
2005/0094900 A1 *  5/2005  Abe ....................... G06T 3/403
                                                                382/300
(Continued)

FOREIGN PATENT DOCUMENTS

JP        2001-184497 A      7/2001
JP        2008-182669 A      8/2008
(Continued)

OTHER PUBLICATIONS

Tam et al., "Depth Map Generation for 3-D TV: Importance of Edge and Boundary Information" in: Three-Dimensional Imaging, Visualization, and Display, edited by B. Javidi et al. (Springer-Verlag, New York, 2008) pp. 153-182.*
(Continued)

*Primary Examiner* — Thai Q Tran
*Assistant Examiner* — Stephen R Smith
(74) *Attorney, Agent, or Firm* — Chip Law Group

(57) ABSTRACT

The present technique relates to an image processing device and an image processing method for realizing accurate depth image warping operations at the receiving side when depth images with reduced resolutions are transmitted. A parallax image generating unit reduces the resolutions of parallax images B1' and C1'. A boundary information generating unit generates boundary information about the parallax images B1' and C1'. A multiplexing unit transmits a multiplexed stream containing the parallax images B1' and C1' with the reduced resolutions and the boundary information. The present technique can be applied to encoding devices that encode glasses-free 3D images, for example.

21 Claims, 34 Drawing Sheets

(51) Int. Cl.
*G06T 7/13* (2017.01)
*H04N 13/161* (2018.01)
*H04N 13/139* (2018.01)
*H04N 13/106* (2018.01)
*G06T 1/20* (2006.01)
*H04N 13/243* (2018.01)

(52) U.S. Cl.
CPC ......... *H04N 13/139* (2018.05); *H04N 13/161* (2018.05); *G06T 1/20* (2013.01); *H04N 13/243* (2018.05); *H04N 2213/005* (2013.01)

(58) Field of Classification Search
USPC ....... 348/43, 42, 47; 345/419; 382/154, 232, 382/66, 300; 375/240.01
See application file for complete search history.

(56) References Cited

U.S. PATENT DOCUMENTS

| | | | | |
|---|---|---|---|---|
| 2006/0274094 | A1* | 12/2006 | Chen | G06T 3/403 347/5 |
| 2007/0024614 | A1* | 2/2007 | Tam | G06T 7/13 345/419 |
| 2008/0089428 | A1 | 4/2008 | Nakamura et al. | |
| 2008/0137972 | A1* | 6/2008 | Yamada | G06T 1/20 382/232 |
| 2009/0244066 | A1 | 10/2009 | Sugita et al. | |
| 2009/0245661 | A1* | 10/2009 | Ilbery | H04N 19/33 382/233 |
| 2010/0033617 | A1* | 2/2010 | Forutanpour | G06T 7/571 348/345 |
| 2010/0060717 | A1* | 3/2010 | Klein Gunnewiek | H04N 13/0011 348/43 |
| 2011/0141237 | A1* | 6/2011 | Cheng | H04N 13/026 348/46 |
| 2011/0261050 | A1* | 10/2011 | Smolic | G06T 15/20 345/419 |
| 2011/0285813 | A1* | 11/2011 | Girdzijauskas | H04N 13/0011 348/42 |
| 2012/0008672 | A1* | 1/2012 | Gaddy | G06T 1/0028 375/240.01 |
| 2012/0200669 | A1* | 8/2012 | Lai | G06T 5/002 348/43 |
| 2013/0113884 | A1* | 5/2013 | Leontaris | H04N 13/0029 348/43 |
| 2013/0162773 | A1* | 6/2013 | Tian | H04N 19/597 348/43 |
| 2013/0278719 | A1* | 10/2013 | Rusert | G06T 15/10 348/43 |
| 2013/0315472 | A1* | 11/2013 | Hattori | G06T 19/20 382/154 |

FOREIGN PATENT DOCUMENTS

| | | |
|---|---|---|
| JP | 2009-238117 A | 10/2009 |
| JP | 2010-157823 A | 7/2010 |

OTHER PUBLICATIONS

International Search Report dated Apr. 24, 2012, in PCT/JP2012/053675.

* cited by examiner

IMAGE PROCESSING DEVICE AND IMAGE PROCESSING METHOD

TECHNICAL FIELD

The present technique relates to image processing devices and image processing methods, and more particularly, to an image processing device and an image processing method for realizing accurate depth image warping operations at the receiving side when depth images with reduced resolutions are transmitted.

BACKGROUND ART

As a popular technique for viewing 3D images, there is currently a technique by which a viewer views images of two viewpoints that are alternately displayed. In viewing the images of two viewpoints, the viewer wears glasses that open the shutter for the left eye when one of the images of two viewpoints is displayed, and open the shutter for the right eye when the other one of the images is displayed (hereinafter referred to as the glasses-involving technique).

However, with such a glasses-involving technique, a viewer needs to purchase glasses as well as a 3D image display device, and this reduces the viewer's purchasing interest. Also, the need to wear glasses at the time of viewing is troublesome for a viewer. Therefore, there is an increasing demand for a viewing technique by which a viewer can view 3D images without glasses (hereinafter referred to as a glasses-free technique).

By the glasses-free technique, images of three or more viewpoints are displayed in such a manner that the viewable angle varies at the respective viewpoints, and the viewer can view a 3D image without glasses by seeing each image of any two viewpoints with the right and left eyes.

A decoding device that provides glasses-free viewing generates and displays images of three or more viewpoints from images of two viewpoints, for example (three or more viewpoints will be hereinafter referred to as "multi-view"). Specifically, an encoding device determines parallax (depth) values of images of two viewpoints, and transmits parallax images (depth images) representing the parallax values in the form of luminance values or the like to a decoding device. The decoding device generates multi-view parallax images by performing a warping operation on the received parallax images of the images of the two viewpoints. Using the multi-view parallax images, the decoding device generates multi-view images by performing a warping operation on the images of the two viewpoints, and combines the multi-view images for display.

It should be noted that a warping operation is an operation to change the parallax value (or pixel value) of each pixel in a parallax image (or image) of a predetermined viewpoint to the parallax value (or pixel value) of the pixel corresponding to the pixel in a parallax image (or an image) of a virtual viewpoint.

Examples of conventional image encoding techniques include AVC (Advanced Video Coding) and MVC (Multi-view Video Coding). Further, there is a suggested technique for encoding multi-view images (see Patent Document 1, for example).

CITATION LIST

Patent Documents

Patent Document 1: Japanese Patent Application Laid-Open No. 2008-182669

SUMMARY OF THE INVENTION

Problems to be Solved by the Invention

In a case where an encoding device compatible with a decoding device that provides glasses-free viewing reduces the data amount of parallax images by reducing the resolutions of the parallax images, the decoding device needs to increase the resolutions of the received parallax images, to generate the parallax images having the resolution not yet reduced.

However, it is difficult to increase the resolutions of parallax images having resolutions once reduced, and generate the parallax images having the resolutions not yet reduced. Particularly, in a boundary position where parallax values greatly vary, there is a large difference between the parallax values prior to a resolution reduction and the parallax values after the resolution reduction. As a result, the decoding device cannot perform accurate parallax image warping operations.

The present technique has been made in view of those circumstances, and aims to realize accurate depth image warping operations at the receiving side when depth images with reduced resolutions are transmitted.

Solutions to Problems

An image processing device of a first aspect of the present technique is an image processing device that includes: a resolution reducing unit that reduces the resolution of a depth image; a generating unit that generates boundary information indicating pixels adjacent to a boundary position where pixel values in the depth image vary; and a transmitting unit that transmits the depth image having the resolution reduced by the resolution reducing unit, and the boundary information generated by the generating unit.

An image processing method of the first aspect of the present technique is compatible with the image processing device of the first aspect of the present technique.

In the first aspect of the present technique, the resolution of a depth image is reduced, the boundary information indicating pixels adjacent to the boundary position where pixel values in the depth image vary is generated, and the depth image with the reduced resolution and the boundary information are transmitted.

An image processing device of a second aspect of the present technique is an image processing device that includes: a receiving unit that receives a depth image with a reduced resolution, and boundary information indicating pixels adjacent to a boundary position where pixel values in the depth image vary; a resolution increasing unit that increases the resolution of the depth image received by the receiving unit; and a depth image warping unit that generates a depth image of a virtual viewpoint by performing a warping operation on the depth image having the resolution increased by the resolution increasing unit, based on the boundary information received by the receiving unit and the position of the virtual viewpoint.

An image processing method of the second aspect of the present technique is compatible with the image processing device of the second aspect of the present technique.

In the second aspect of the present technique, a depth image with a reduced resolution and the boundary information indicating pixels adjacent to the boundary position where pixel values in the depth image vary are received. The resolution of the received depth image is increased. Based on the received boundary information and the position of a virtual viewpoint, a warping operation is performed on the depth image with the increased resolution, and a depth image of the virtual viewpoint is thus generated.

The image processing device of the first aspect and the image processing device of the second aspect can be realized by causing a computer to execute a program.

Also, to realize the image processing device of the first aspect and the image processing device of the second aspect, the program to be executed by a computer may be transmitted and provided via a transmission medium, or the program recorded on a recording medium may be provided.

Effects of the Invention

According to the first aspect of the present technique, depth images with reduced resolutions can be transmitted so that accurate depth image warping operations can be performed at the receiving side.

According to the second aspect of the present technique, accurate depth image warping operations can be performed when depth images with reduced resolutions are transmitted.

MODES FOR CARRYING OUT THE INVENTION

<Description of Depth Images (Parallax Images) in this Specification>

Figure 30:
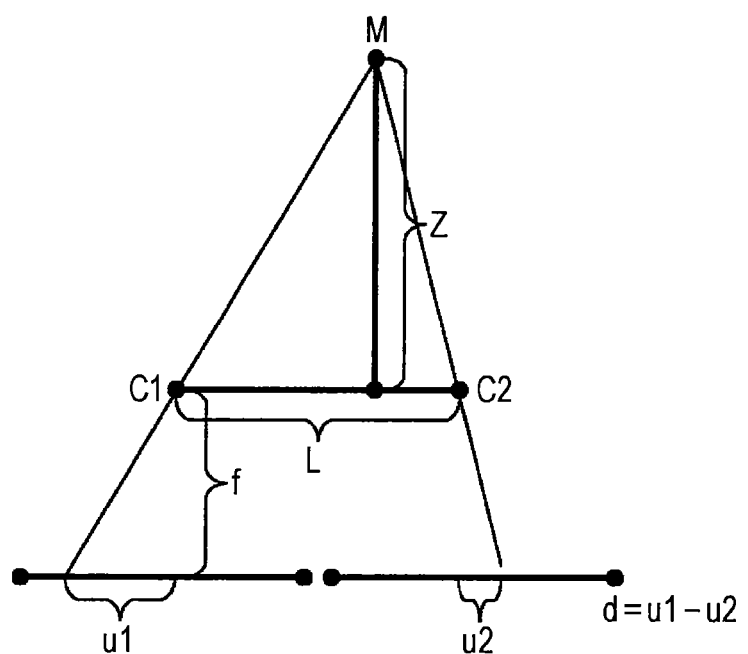
FIG. 30 is a diagram for explaining parallax and depth.

FIG. 30 is a diagram for explaining parallax and depth.

As shown in FIG. 30, when a color image of an object M is captured by a camera c1 located in a position C1 and a camera c2 located in a position C2, the object M has depth Z, which is the distance from the camera c1 (the camera c2) in the depth direction, and is defined by the following equation (a).

$$Z = (L/d) \times f \qquad (a)$$

Here, L represents the horizontal distance between the position C1 and the position C2 (hereinafter referred to as the inter-camera distance). Meanwhile, d represents the value obtained by subtracting the horizontal distance u2 between the position of the object M in the image captured by the camera c2 and the center of the captured image, from the horizontal distance u1 between the position of the object M in the image captured by the camera c1 and the center of the captured image. That is, d represents the parallax. Further, f represents the focal length of the camera c1, and, in the equation (a), the focal lengths of the camera c1 and the camera c2 are the same.

As shown in the equation (a), the parallax d and the depth Z can be uniquely converted. Therefore, in this specification, the image representing the parallax d and the image representing the depth Z of the color image of two viewpoints captured by the camera c1 and the camera c2 are collectively referred to as depth images (parallax images).

A depth image (a parallax image) is an image representing the parallax d or the depth Z, and a pixel value in a depth image (a parallax image) is not the parallax d or the depth Z but may be a value obtained by normalizing the parallax d, a value obtained by normalizing the reciprocal 1/Z of the depth Z, or the like.

A value I obtained by normalizing the parallax d with 8 bits (0 through 255) can be calculated according to the equation (b) shown below. Here, the number of normalization bits of the parallax d is not limited to 8, and may be some other number, such as 10 or 12.

[Mathematical Formula 3]

$$I = \frac{255 \times (d - D_{min})}{D_{max} - D_{min}} \quad (b)$$

In the equation (b), $D_{max}$ represents the maximum value of the parallax d, and $D_{min}$ represents the minimum value of the parallax d. The maximum value $D_{max}$ and the minimum value $D_{min}$ may be set for each one screen, or may be set once every few screens.

A value y obtained by normalizing the reciprocal 1/Z of the depth Z with 8 bits (0 through 255) can be determined according to the equation (c) shown below. Here, the number of normalization bits of the reciprocal 1/Z of the depth Z is not limited to 8, and may be some other number, such as 10 or 12.

[Mathematical Formula 4]

$$y = 255 \times \frac{\frac{1}{Z} - \frac{1}{Z_{far}}}{\frac{1}{Z_{near}} - \frac{1}{Z_{far}}} \quad (c)$$

In the equation (c), $Z_{far}$ represents the maximum value of the depth Z, and $Z_{near}$ represents the minimum value of the depth Z. The maximum value $Z_{far}$ and the minimum value $Z_{near}$ may be set for each one screen, or may be set once every few screens.

As described above, in this specification, an image having a pixel value I obtained by normalizing the parallax d, and an image having a pixel value y obtained by normalizing the reciprocal 1/Z of the depth Z are collectively referred to as depth images (parallax images), as the parallax d and the depth Z can be uniquely converted. The color format of the depth images (parallax images) is YUV420 or YUV400 format, but may be some other color format.

When attention is focused on the value I or the value y as information, instead of a pixel value in a depth image (a parallax image), the value I or the value y is set as depth information (parallax information). Further, a map formed by mapping the value I or the value y is set as a depth map (a parallax map).

<First Embodiment>
[Example Structure of a First Embodiment of an Encoding Device]

Figure 1:
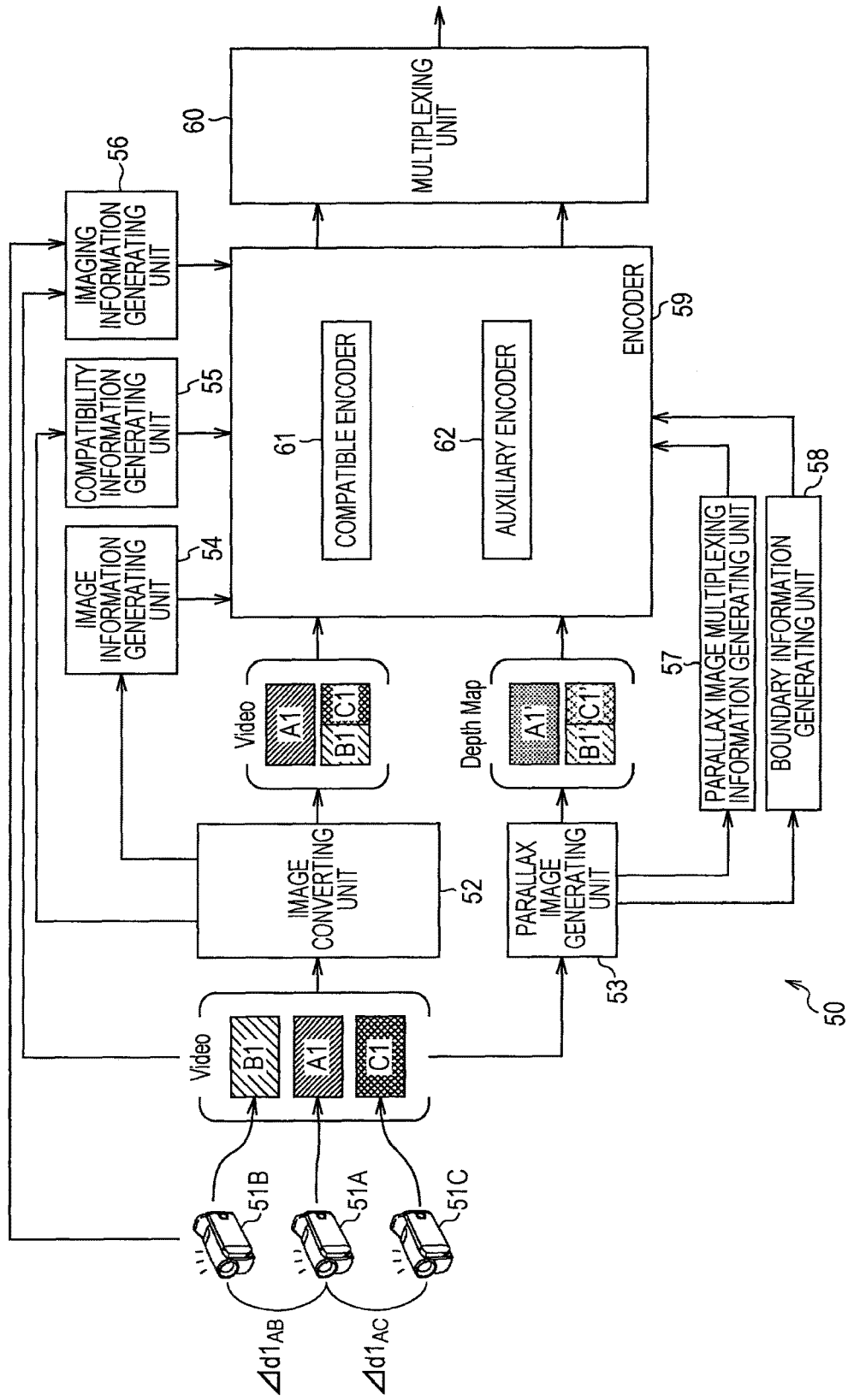
FIG. 1 is a block diagram showing an example structure of a first embodiment of an encoding device to which the present technique is applied.

FIG. 1 is a block diagram showing an example structure of a first embodiment of an encoding device as an image processing device to which the present technique is applied.

The encoding device 50 shown in FIG. 1 includes imaging units 51A through 51C, an image converting unit 52, a parallax image generating unit 53, an image information generating unit 54, a compatibility information generating unit 55, an imaging information generating unit 56, a parallax image multiplexing information generating unit 57, a boundary information generating unit 58, an encoder 59, and a multiplexing unit 60.

The encoding device 50 reduces the resolution of a parallax image, and encodes the parallax image. Boundary information (is_depth_edge), which is the information indicating whether the pixel is adjacent to a boundary position where the parallax value of the parallax image greatly varies, is added to the encoded parallax image, and the encoded parallax image is then transmitted.

Specifically, in the encoding device 50, the imaging unit 51A captures a HD (High Definition) image of a predetermined viewpoint as a viewpoint image A1, and supplies the viewpoint image A1 to the image converting unit 52, the parallax image generating unit 53, and the imaging information generating unit 56. In a position at a distance $\Delta d1_{AB}$ from the imaging unit 51A in a horizontal direction, the imaging unit 51B captures an HD image, as a viewpoint image B1, of a different viewpoint from that of the viewpoint image A1, and supplies the viewpoint image B1 to the image converting unit 52, the parallax image generating unit 53, and the imaging information generating unit 56. In a position at a distance $\Delta d1_{AC}$ from the imaging unit 51A in the opposite horizontal direction from the imaging unit 51A, the imaging unit 51C captures an HD image, as a viewpoint image C1, of a different viewpoint from those of the viewpoint image A1 and the viewpoint image B1, and supplies the viewpoint image C1 to the image converting unit 52, the parallax image generating unit 53, and the imaging information generating unit 56.

The viewpoints corresponding to the viewpoint image B1 and the viewpoint image C1 are the outer viewpoints among the viewpoints of the image that can be perceived as a 3D image. Accordingly, using the viewpoint images A1 through C1, the decoding device compatible with the encoding device 50 can generate multi-view images by interpolating an image of a viewpoint that is located further inside compared with the viewpoints of the viewpoint image B1 and the viewpoint image C1. As a result, multi-view images can be generated with higher precision than in a case where an image of an outer viewpoint is interpolated with the use of images of inner viewpoints. The distance $\Delta d1_{AB}$ and the distance $\Delta d1_{AC}$ may be constant, or may vary with time.

The image converting unit 52 determines the viewpoint image A1 to be a compatible image, as the viewpoint image A1 is supplied from the innermost imaging unit 51A of the imaging units 51A through 51C in the horizontal direction. Of multi-view images, the compatible image is an image that is encoded by a conventional encoding technique so as to ensure compatibility with conventional encoding devices. The image converting unit 52 supplies information designating the viewpoint image A1 as the compatible image to the compatibility information generating unit 55, and supplies the viewpoint image A1 as the compatible image directly to the encoder 59.

The image converting unit 52 also determines the viewpoint image B1 and the viewpoint image C1, which are the viewpoint images other than the viewpoint image A1, to be auxiliary images. The auxiliary images are images for generating, by using the compatible image, an image of a larger number of viewpoints than the compatible image. According to a predetermined multiplexing technique, the image converting unit 52 reduces the resolutions of the viewpoint image B1 and the viewpoint image C1, which are the auxiliary images, and thus multiplexes those viewpoint images. Specifically, where the multiplexing technique is the Side By Side technique, for example, the image converting unit 52 halves the resolutions of the viewpoint image B1 and the viewpoint image C1. The image converting unit 52 then multiplexes the viewpoint image B1 having its resolution halved (hereinafter referred to as the ½ resolution viewpoint image B1) and the viewpoint image C1 having its resolution halved (hereinafter referred to the ½ resolution viewpoint image C1), so that the ½ resolution viewpoint image B1 turns into the image in the left half of the screen and the ½ resolution viewpoint image C1 turns into the image in the right half of the screen. The image converting unit 52 supplies the multiplexed image obtained as a result of the multiplexing to the encoder 59, and supplies information indicating the multiplexing technique used for multiplexing the auxiliary images to the image information generating unit 54.

Using the viewpoint images A1 through C1 supplied from the imaging units 51A through 51C, the parallax image generating unit 53 detects the parallax values of the respective pixels of the viewpoint images A1 through C1. The parallax image generating unit 53 generates a parallax image A1' indicating the parallax value of each pixel of the viewpoint image A1 as the compatible image, and supplies the parallax image A1' to the encoder 59.

The parallax image generating unit 53 also generates a parallax image B1' indicating the parallax value of each pixel of the viewpoint image B1 as an auxiliary image, and a parallax image C1' indicating the parallax value of each pixel of the viewpoint image C1 as an auxiliary image, and supplies those parallax images to the boundary information generating unit 58. The parallax image generating unit 53 further functions as a resolution reducing unit, and, according to a predetermined multiplexing technique, reduces the resolutions of the parallax image B1' and the parallax image C1'. The resultant multiplexed image is then supplied to the encoder 59. The parallax image generating unit 53 supplies information indicating the multiplexing technique used for multiplexing the parallax images of the auxiliary images to the parallax image multiplexing information generating unit 57.

Based on the information supplied from the image converting unit 52, the image information generating unit 54 generates information indicating the multiplexing technique for the auxiliary images and the like as image information about the compatible image and the auxiliary images, and supplies the image information to the encoder 59.

Based on the information supplied from the image converting unit 52, the compatibility information generating unit 55 generates information designating the compatible image and a compatible mode as compatibility information about compatibility, and supplies the compatibility information to the encoder 59.

It should be noted that the compatible mode is the mode indicating the encoding method for the compatible image. For example, the compatible mode may be a mono mode indicating an encoding method for encoding a compatible image of a single viewpoint by the AVC technique, a frame packing mode indicating an encoding method for multiplexing compatible images of two viewpoints and encoding the multiplexed image by the AVC technique, a stereo mode indicating an encoding method for encoding compatible images of two viewpoints by the MVC technique, or the like.

Using the viewpoint images A1 through C1 supplied from the imaging units 51A through 51C, the imaging information generating unit 56 detects the distance between the viewpoints of two viewpoint images among the viewpoint images A1 through C1 (hereinafter referred to as the inter-viewpoint distance). Specifically, the imaging information generating unit 56 detects inter-viewpoint distances that are the distance $\Delta d1_{AB}$ between the imaging unit 51A and the imaging unit 51B in the horizontal direction, and the distance $\Delta d1_{AC}$ between the imaging unit 51A and the imaging unit 51C in the horizontal direction.

The imaging information generating unit 56 obtains, from the imaging units 51A through 51C, internal parameters of the imaging units 51A through 51C and a rotation matrix for warping operations. The internal parameters include focal length, the position of the principal point (the optical center of the lens) that is the center of the image, and distortion coefficient in the radial direction. The imaging information generating unit 56 generates imaging information that is the information about the inter-viewpoint distances, the internal parameters, and the rotation matrix for warping operations, and supplies the imaging information to the encoder 59.

Based on the information supplied from the parallax image generating unit 53, the parallax image multiplexing information generating unit 57 generates parallax image multiplexing information that is the information about the multiplexing of parallax images such as the information indicating the multiplexing technique for the parallax images of the auxiliary images, and supplies the parallax image multiplexing information to the encoder 59.

The boundary information generating unit 58 functions as a boundary detecting unit, and detects respective boundary positions from the parallax image B1' and the parallax image C1' supplied from the parallax image generating unit 53. The boundary information generating unit 58 then functions as a generating unit, and, based on the detected boundary positions, generates boundary information about each pixel or each macroblock. The boundary information is supplied to the encoder 59. It should be noted that a "macroblock" is a unit for encoding.

The encoder 59 is formed with a compatible encoder 61 and an auxiliary encoder 62. The compatible encoder 61 encodes the multiplexed image of the compatible image supplied from the image converting unit 52 by the conventional AVC technique, and adds various kinds of information to the encoded image. The resultant encoded stream is supplied as a compatible stream to the multiplexing unit 60.

The auxiliary encoder 62 functions as an encoding unit, and encodes, by a predetermined technique, the multiplexed image of the auxiliary images from the image converting unit 52, and the parallax image A1' of the compatible image and the multiplexed image of the parallax images of the auxiliary images from the parallax image generating unit 53. The encoding technique used by the auxiliary encoder 62 may be the AVC technique, the MVC technique, the MPEG2 (Moving Picture Experts Group phase 2) technique, or the like.

The auxiliary encoder 62 adds the image information from the image information generating unit 54, the compatibility information from the compatibility information generating unit 55, the imaging information from the imaging information generating unit 56, the parallax image multiplexing information from the parallax image multiplexing information generating unit 57, the boundary information from the boundary information generating unit 58, and the like, to the encoded images obtained as a result of the encoding. An encoded stream is thus generated. The auxiliary encoder 62 supplies the encoded stream as an auxiliary stream to the multiplexing unit 60.

The multiplexing unit 60 generates TSs (Transport Streams) from the compatible stream supplied from the compatible encoder 61 and the auxiliary stream supplied from the auxiliary encoder 62, and multiplexes the TSs. The multiplexing unit 60 functions as a transmitting unit, and transmits the multiplexed stream obtained as a result of the multiplexing.

[Example of the Boundary Information]

Figure 2:
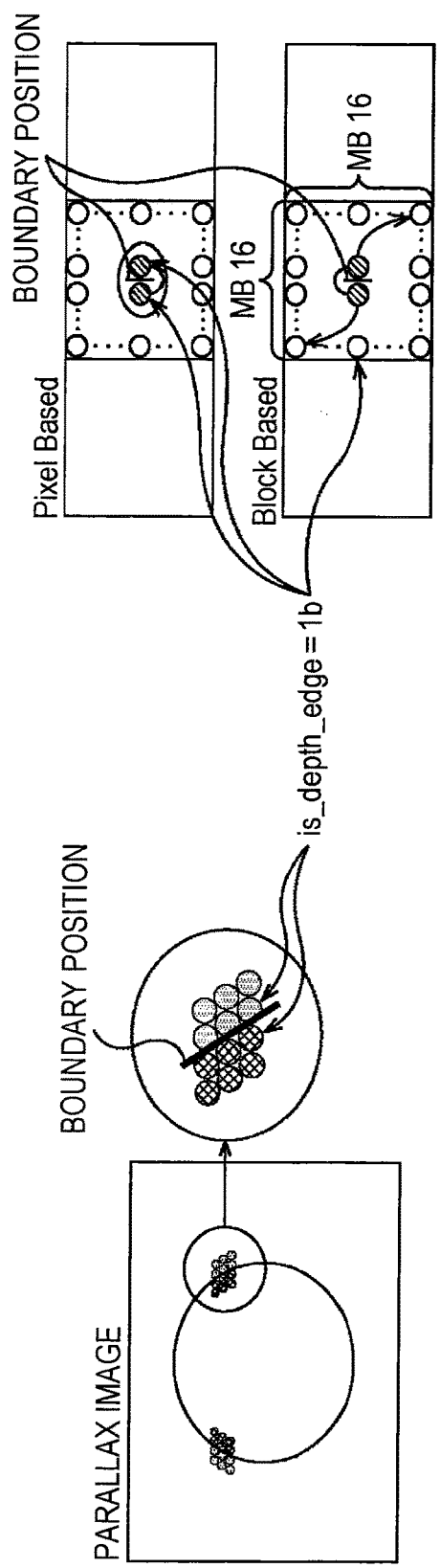
FIG. 2 is a diagram showing an example of boundary information.

FIG. 2 is a diagram showing an example of the boundary information.

In FIG. 2, the small circles represent pixels, and the patterns in the circles represent parallax values.

In the parallax image in the example shown in FIG. 2, the parallax value in the circular region located at the center of the screen greatly differs from the parallax value in the region other than the circular region, as shown in the left-side portion of FIG. 2. Accordingly, there is a boundary position on the boundary between the circular region existing at the center of the screen and the region other than the circular region.

In a case where the boundary information is generated on a pixel basis, the boundary information about two pixels adjacent to the boundary position is 1, which indicates that the subject pixel is adjacent to the boundary position, for example, as shown in the upper right portion of FIG. 2. The boundary information about the pixels other than the two adjacent ones is 0, which indicates that the pixel is not adjacent to the boundary position.

In a case where the boundary information is generated on a macroblock basis, the boundary information about a macroblock (MB) containing two pixels adjacent to the boundary position is 1, which indicates that the subject pixel is adjacent to the boundary position, for example, as shown in the lower right portion of FIG. 2. The boundary information about the macroblocks other than the above described macroblock is 0, which indicates that the subject pixel is not adjacent to the boundary position.

[Description of an Operation of the Encoding Device]

Figure 3:
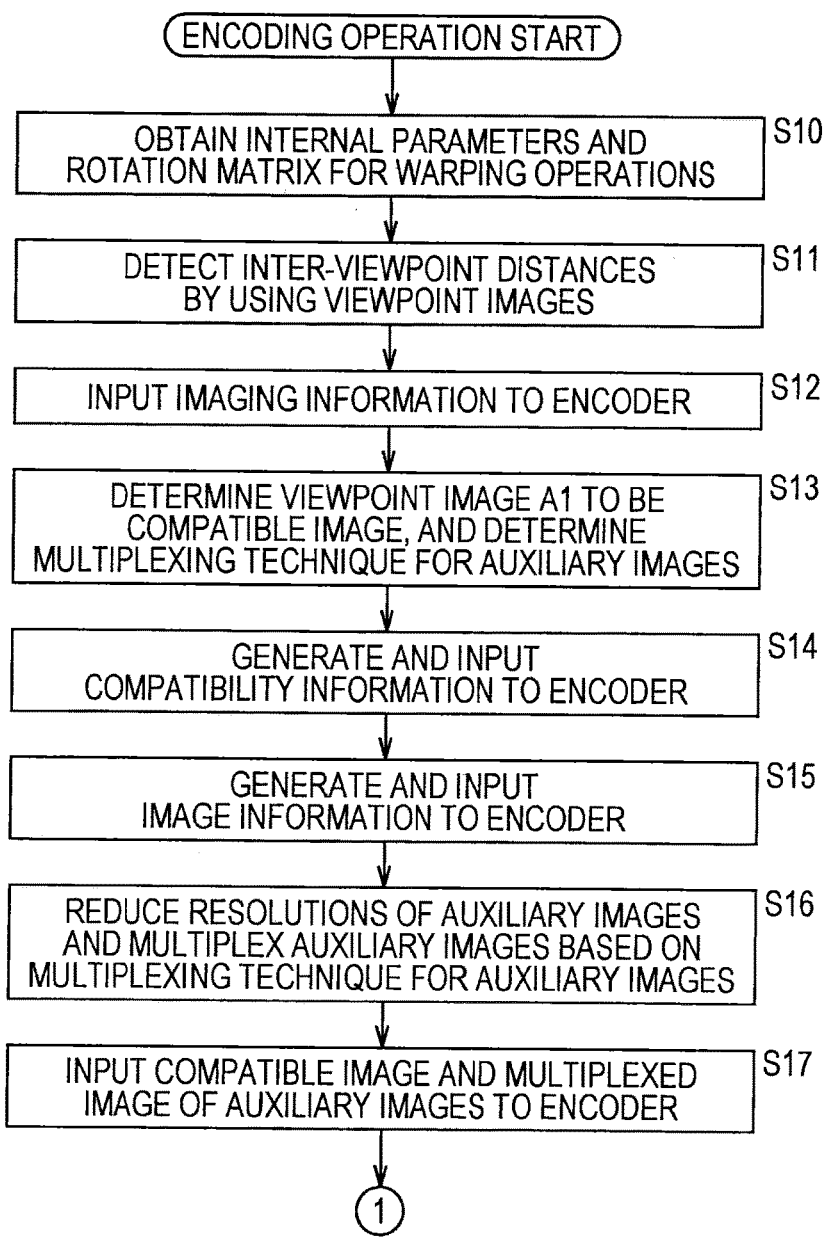
FIG. 3 is a flowchart for explaining an encoding operation by the encoding device shown in FIG. 1.
Figure 4:
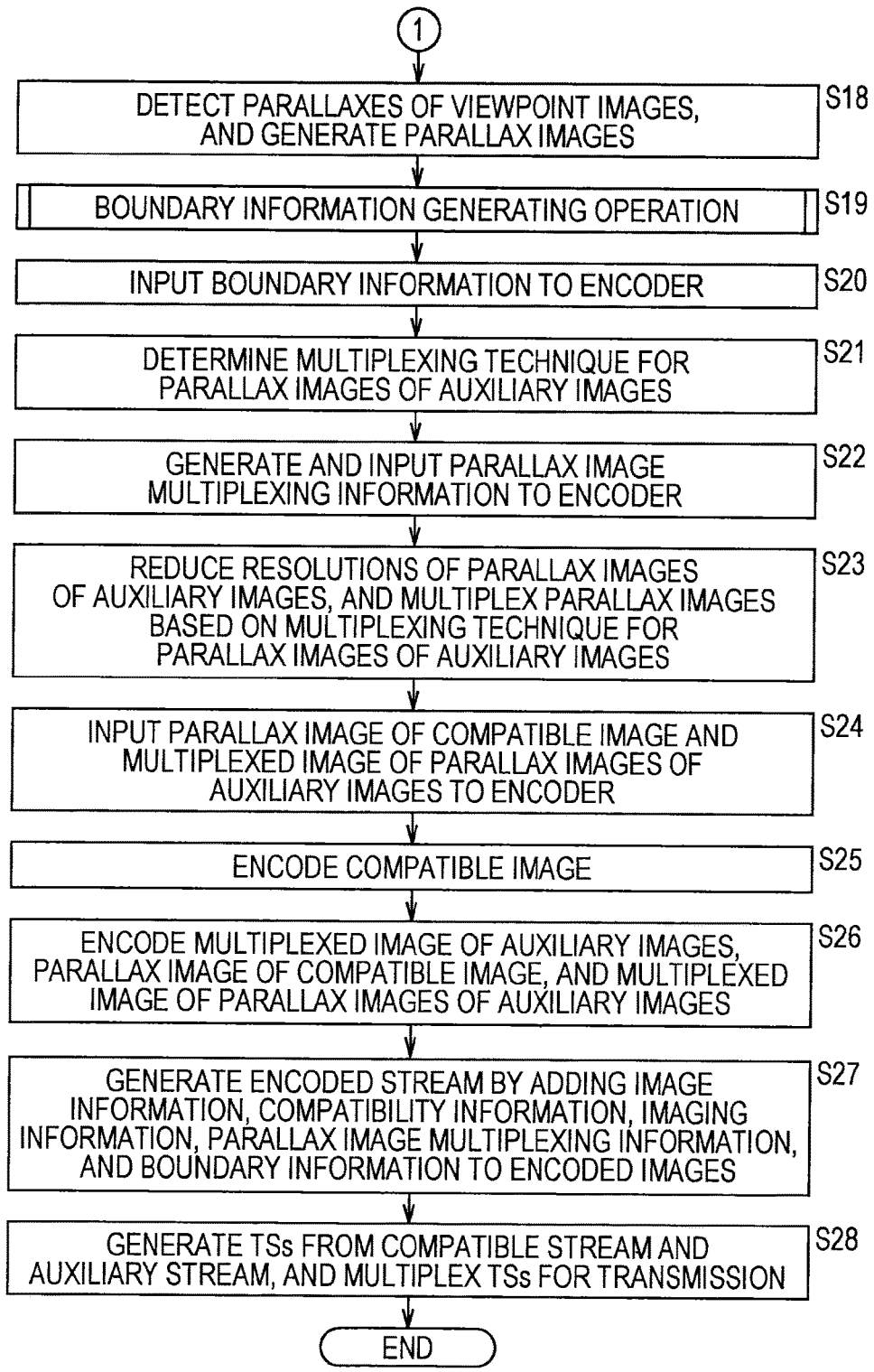
FIG. 4 is another flowchart for explaining the encoding operation by the encoding device shown in FIG. 1.

FIGS. 3 and 4 are flowcharts for explaining an encoding operation by the encoding device 50 shown in FIG. 1. This encoding operation is started when the viewpoint images A1 through C1 are output from the imaging units 51A through 51C, for example.

In step S10 of FIG. 3, the imaging information generating unit 56 obtains, from the imaging units 51A through 51C, the internal parameters of the imaging units 51A through 51C and the rotation matrix for warping operations.

In step S11, using the viewpoint images A1 through C1 supplied from the imaging units 51A through 51C, the imaging information generating unit 56 detects the inter-viewpoint distance between each two viewpoint images among the viewpoint images A1 through C1.

In step S12, the imaging information generating unit 56 generates the imaging information that is the information about the inter-viewpoint distances, the internal parameters, and the rotation matrix for warping operations, and supplies the imaging information to the encoder 59.

In step S13, the image converting unit 52 determines the viewpoint image A1 to be the compatible image, the viewpoint image A1 being supplied from the innermost imaging unit 51A of the imaging units 51A through 51C in the horizontal direction, and determines the multiplexing technique for the auxiliary images. The image converting unit 52 supplies the information designating the viewpoint image A1 as the compatible image to the compatibility information generating unit 55, and supplies the multiplexing technique for the auxiliary images to the image information generating unit 54.

In step S14, based on the information supplied from the image converting unit 52, the compatibility information generating unit 55 generates the compatibility information that is the information designating the viewpoint image A1 as the compatible image and a compatible mode such as the mono mode, and supplies the compatibility information to the encoder 59.

In step S15, based on the information supplied from the image converting unit 52, the image information generating unit 54 generates the information indicating the multiplexing technique for the auxiliary images and the like as the image information, and supplies the image information to the encoder 59.

In step S16, the image converting unit 52 determines the auxiliary images to be the viewpoint image B1 and the viewpoint image C1, which are the viewpoint images other than the viewpoint image A1. Based on the auxiliary image multiplexing technique determined in step S13, the resolutions of the auxiliary images are then reduced, and the auxiliary images are multiplexed. The multiplexed image of the auxiliary images is thus formed.

In step S17, the image converting unit 52 inputs the viewpoint image A1 as the compatible image and the multiplexed image of the auxiliary images to the encoder 59.

In step S18 of FIG. 4, using the viewpoint images A1 through C1 supplied from the imaging units 51A through 51C, the parallax image generating unit 53 detects the parallax values of the respective pixels of the viewpoint images A1 through C1, and generates the parallax images A1' through C1'. The parallax image generating unit 53 then supplies the parallax image B1' and the parallax image C1' to the boundary information generating unit 58.

In step S19, the boundary information generating unit 58 performs a boundary information generating operation to generate the boundary information about the parallax image B1' and the parallax image C1' supplied from the parallax image generating unit 53. This boundary information generating operation will be described later in detail, with reference to FIG. 5.

In step S20, the boundary information generating unit 58 inputs the boundary information generated in step S19, to the encoder 59.

In step S21, the parallax image generating unit 53 determines the multiplexing technique for the parallax images of the auxiliary images, and supplies the information indicating the multiplexing technique to the parallax image multiplexing information generating unit 57.

In step S22, based on the information supplied from the parallax image generating unit 53, the parallax image multiplexing information generating unit 57 generates parallax image multiplexing information that is the information indicating the multiplexing technique for the parallax images of the auxiliary images, and inputs the parallax image multiplexing information to the encoder 59.

In step S23, based on the multiplexing technique for the parallax images of the auxiliary images determined in step S21, the parallax image generating unit 53 reduces the resolutions of the parallax image B1' and the parallax image C1' of the auxiliary images, and multiplexes the parallax images, to obtain the multiplexed image of the parallax images of the auxiliary images.

In step S24, the parallax image generating unit 53 inputs the parallax image A1' of the compatible image and the multiplexed image of the parallax images of the auxiliary images to the encoder 59.

In step S25, the compatible encoder 61 of the encoder 59 encodes the viewpoint image A1 as the compatible image supplied from the image converting unit 52 by the conventional AVC technique, and supplies the resultant encoded stream as a compatible stream to the multiplexing unit 60.

In step S26, the auxiliary encoder 62 encodes, by a predetermined technique, the multiplexed image of the auxiliary images from the image converting unit 52, and the parallax image A1' of the compatible image and the multiplexed image of the parallax images of the auxiliary images from the parallax image generating unit 53.

In step S27, the auxiliary encoder 62 adds the image information from the image information generating unit 54, the compatibility information from the compatibility information generating unit 55, the imaging information from the imaging information generating unit 56, the parallax image multiplexing information from the parallax image multiplexing information generating unit 57, the boundary information from the boundary information generating unit 58, and the like, to the encoded images obtained as a result of the encoding performed in step S26. An encoded stream is thus generated. The auxiliary encoder 62 supplies the encoded stream as an auxiliary stream to the multiplexing unit 60.

In step S28, the multiplexing unit 60 generates TSs (Transport Streams) from the compatible stream supplied from the compatible encoder 61 and the auxiliary stream supplied from the auxiliary encoder 62, and multiplexes the TSs for transmission. The operation then comes to an end.

Figure 5:
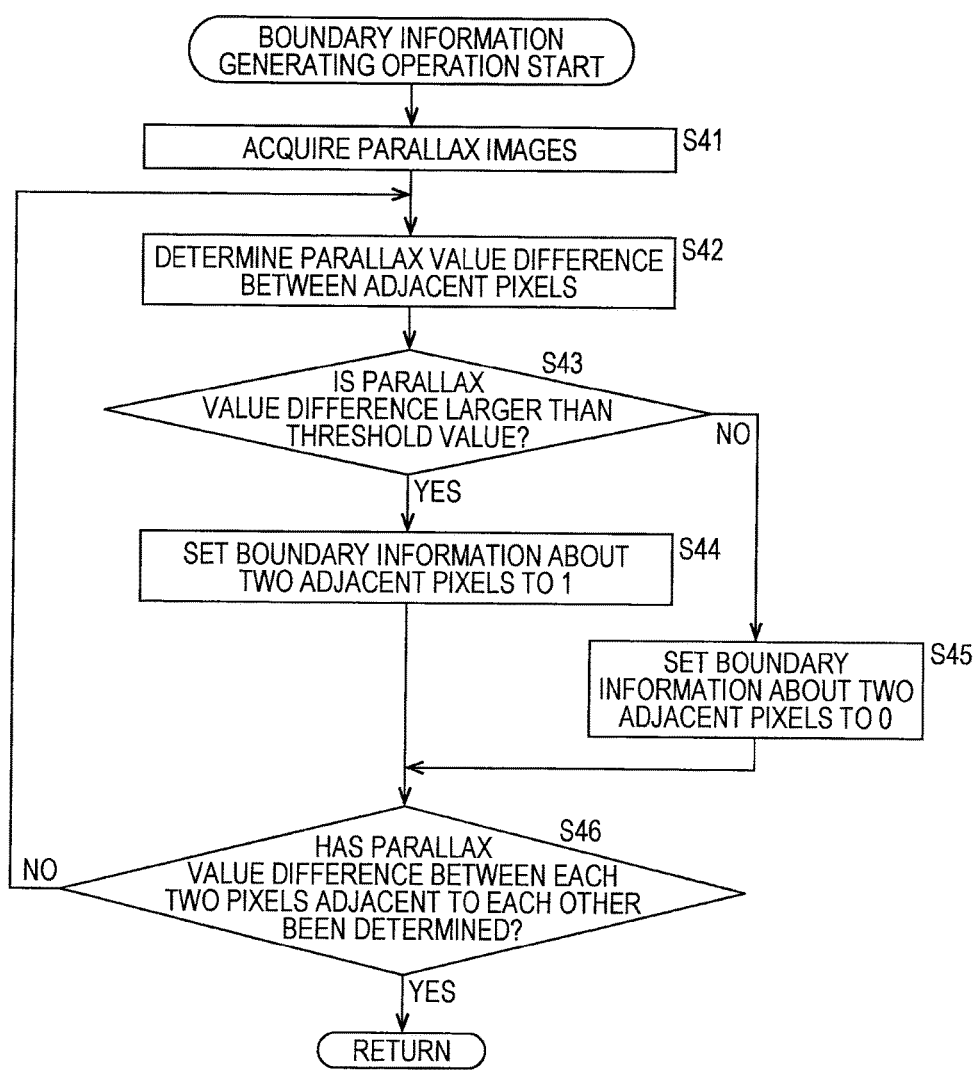
FIG. 5 is a flowchart for explaining in detail the boundary information generating operation of FIG. 4.

FIG. 5 is a flowchart for explaining in detail the boundary information generating operation of step S19 of FIG. 4. In FIG. 5, the boundary information generating operation is performed to generate the boundary information on a pixel basis. Also, the boundary information generating operation of FIG. 5 is performed for each parallax image.

In step S41 of FIG. 5, the boundary information generating unit 58 acquires a parallax image supplied from the parallax image generating unit 53.

In step S42, the boundary information generating unit 58 determines the parallax value difference between pixels that are adjacent to each other and have not been subjected to the operation in step S42, among the pixels adjacent to each other in the horizontal direction in the parallax image.

In step S43, the boundary information generating unit 58 determines whether the parallax value difference determined in step S42 is larger than a predetermined threshold value.

If the parallax value difference is determined to be larger than the predetermined threshold value in step S43, the boundary information generating unit 58, in step S44, detects the boundary position that is the position between the two adjacent pixels to be subjected to the operation of step S42, and sets the boundary information about the two pixels to 1.

If the parallax value difference is determined not to be larger than the predetermined threshold value in step S43, on the other hand, the boundary information generating unit 58, in step S45, sets the boundary information that is not 1 among the boundary information about the two adjacent pixels to be subjected to the operation of step S42, to 0.

After the procedure of step S44 or step S45, the boundary information generating unit 58, in step S46, determines whether the parallax value difference between each two pixels adjacent to each other in the horizontal direction in the parallax image has been determined.

If it is determined in step S46 that the parallax value difference between each two pixels adjacent to each other in the horizontal direction in the parallax image has not been determined, the operation returns to step S42, and the procedures of steps S42 through S46 are repeated until the parallax value difference between each two pixels adjacent to each other in the horizontal direction in the parallax image is determined.

If it is determined in step S46 that the parallax value difference between each two pixels adjacent to each other in the horizontal direction in the parallax image has been determined, the operation returns to step S19 of FIG. 4, and then moves on to step S20.

In a case where the boundary information is generated on a macroblock basis, the boundary information generating unit 58 carries out the procedures of steps S42 through S46 on a macroblock basis in the boundary information generating operation of FIG. 5.

Specifically, the boundary information generating unit 58, in step S42, determines the parallax value difference between pixels adjacent to each other in the horizontal direction in a predetermined macroblock in the parallax image, and, in step S43, determines whether at least one of the parallax value differences is larger than a predetermined threshold value. If at least one parallax value difference is determined to be larger than the predetermined threshold value, the boundary information generating unit 58, in step S44, sets the boundary information about the macroblock corresponding to the difference, to 1. If all the parallax value differences are determined to be equal to or smaller than the predetermined threshold value, on the other hand, the boundary information generating unit 58, in step S45, sets the boundary information not having set to 1 among the boundary information about the macroblocks corresponding to the differences, to 0.

As described above, the encoding device 50 reduces the resolutions the parallax images, and transmits the parallax images with the reduced resolutions and the boundary information. Accordingly, the later described decoding device can perform warping operations on the parallax images of the auxiliary images, based on the boundary information. As a result, the decoding device can perform accurate warping operations on the parallax images of the auxiliary images as described later.

Also, the encoding device 50 reduces the resolutions of the auxiliary images and the parallax images of the auxiliary images. Accordingly, the amount of information to be encoded can be made smaller, and the processing costs for the encoding operation and the decoding operation can be made lower than in a case where encoding is performed without a resolution reduction. As a result, decoding operations by the decoding device can be prevented from greatly affecting the image quality of multi-view images.

Further, the encoding device 50 determines a compatible image to be a single-view image among multi-view images, and performs encoding by a conventional encoding technique. Accordingly, compatibility with conventional encoding devices that encode 2D images can be ensured.

Also, the encoding device 50 generates parallax images, and transmits an encoded stream containing the parallax images. Accordingly, the decoding device compatible with the encoding device 50 does not need to generate parallax images for generating multi-view images, and the processing load on the decoding device can be reduced. As a result, the costs of the decoding device can be lowered. Also, parallax detecting operations by the decoding device can be prevented from greatly affecting the image quality of multi-view images.

[Example Structure of the Decoding Device]

Figure 6:
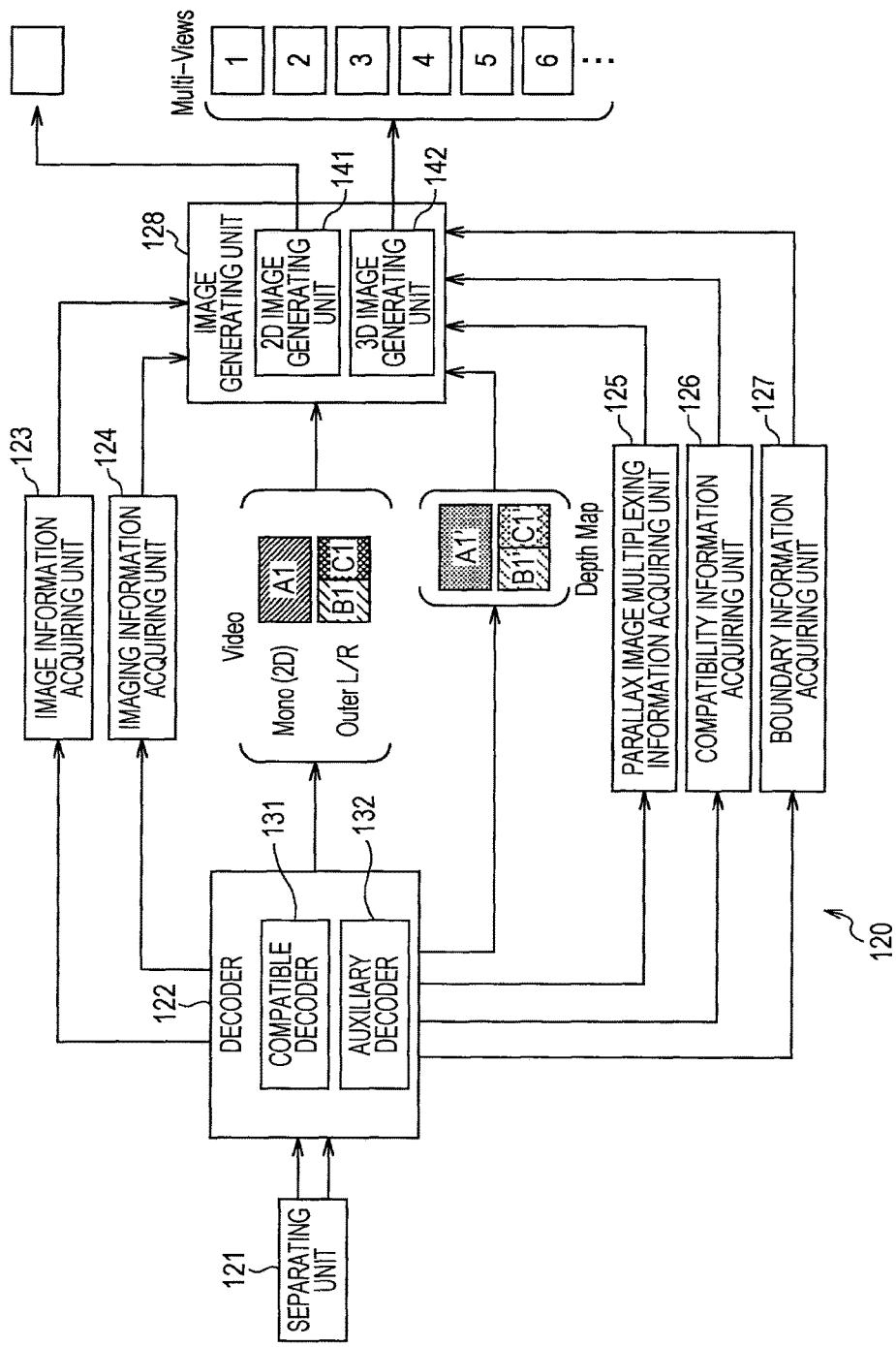
FIG. 6 is a diagram showing an example structure of a decoding device compatible with the encoding device shown in FIG. 1.

FIG. 6 is a diagram showing an example structure of the decoding device that decodes the multiplexed stream transmitted from the encoding device 50 shown in FIG. 1, the decoding device being an image processing device to which the present technique is applied.

The decoding device 120 shown in FIG. 6 includes a separating unit 121, a decoder 122, an image information acquiring unit 123, an imaging information acquiring unit 124, a parallax image multiplexing information acquiring unit 125, a compatibility information acquiring unit 126, a boundary information acquiring unit 127, and an image generating unit 128. The decoding device 120 decodes the multiplexed stream transmitted from the encoding device 50, generates multi-view images by performing parallax image warping operations based on the boundary information, and causes a display device (not shown) to display the generated images.

Specifically, the separating unit 121 of the decoding device 120 functions as a receiving unit, receiving the multiplexed stream transmitted from the encoding device 50, and separating the TSs from one another. The separating unit 121 extracts the compatible stream and the auxiliary stream from the separated TSs, and supplies the extracted streams to the decoder 122.

The decoder 122 is formed with a compatible decoder 131 and an auxiliary decoder 132. Based on compatibility information that is supplied from the auxiliary decoder 132, the compatible decoder 131 of the decoder 122 identifies the compatible stream from the compatible and auxiliary streams supplied from the separating unit 121. Based on the compatibility information, the compatible decoder 131 decodes the encoded compatible image contained in the compatible stream by a technique compatible with the AVC technique. The compatible decoder 131 supplies the viewpoint image A1 obtained as a result of the decoding to the image generating unit 128.

The auxiliary decoder 132 supplies the compatibility information contained in the auxiliary stream supplied from the separating unit 121, to the compatible decoder 131. Based on the compatibility information, the auxiliary decoder 132 identifies the auxiliary stream from the compatible and auxiliary streams supplied from the separating unit 121. The auxiliary decoder 132 functions as a decoding unit, and decodes, by a technique compatible with the auxiliary encoder 62 shown in FIG. 1, the multiplexed image of the auxiliary images, the parallax image of the compatible image, and the multiplexed image of the parallax images of the auxiliary images, which have been encoded and are contained in the auxiliary stream supplied from the separating unit 121.

The auxiliary decoder 132 supplies the multiplexed image of the auxiliary images, the parallax image of the compatible image, and the multiplexed image of the parallax images of the auxiliary images, which are obtained as a result of the decoding, to the image generating unit 128. Also, the auxiliary decoder 132 supplies the image information contained in the auxiliary stream to the image information acquiring unit 123, and supplies the imaging information to the imaging information acquiring unit 124. Further, the auxiliary decoder 132 supplies the parallax image multiplexing information contained in the auxiliary stream to the parallax image multiplexing information acquiring unit 125, and supplies the compatibility information to the compatibility information acquiring unit 126. The auxiliary decoder 132 also supplies the boundary information contained in the auxiliary stream to the boundary information acquiring unit 127.

The image information acquiring unit 123 acquires the image information supplied from the auxiliary decoder 132, and supplies the image information to the image generating unit 128. The imaging information acquiring unit 124 acquires the imaging information supplied from the auxiliary decoder 132, and supplies the imaging information to the image generating unit 128.

The parallax image multiplexing information acquiring unit 125 acquires the parallax image multiplexing information supplied from the auxiliary decoder 132, and supplies the parallax image multiplexing information to the image generating unit 128. The compatibility information acquiring unit 126 acquires the compatibility information supplied from the auxiliary decoder 132, and supplies the compatibility information to the image generating unit 128. The boundary information acquiring unit 127 acquires the boundary information supplied from the auxiliary decoder 132, and supplies the boundary information to the image generating unit 128.

The image generating unit 128 is formed with a 2D image generating unit 141 and a 3D image generating unit 142. In accordance with a 2D image display instruction from a viewer, the 2D image generating unit 141 of the image generating unit 128 outputs the viewpoint image A1, which is the compatible image supplied from the compatible decoder 131, and causes the display device (not shown) to display the image. This enables the viewer to view a 2D image.

Meanwhile, using the viewpoint image A1, the multiplexed image of the auxiliary images, the parallax image A1' of the compatible image, and the multiplexed image of the parallax images of the auxiliary images, which are supplied from the decoder 122, the 3D image generating unit 142 generates images that are of three or more viewpoints compatible with the display device (not shown) and have the same resolution as the compatible image, based on the image information, the imaging information, the parallax image multiplexing information, the compatibility information, the boundary information, and the like. The 3D image generating unit 142 then converts the resolution of the generated multi-view images to the resolution calculated by dividing the resolution of the compatible image and the auxiliary images by the number of viewpoints, and combines the generated images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the 3D Image Generating Unit]

Figure 7:
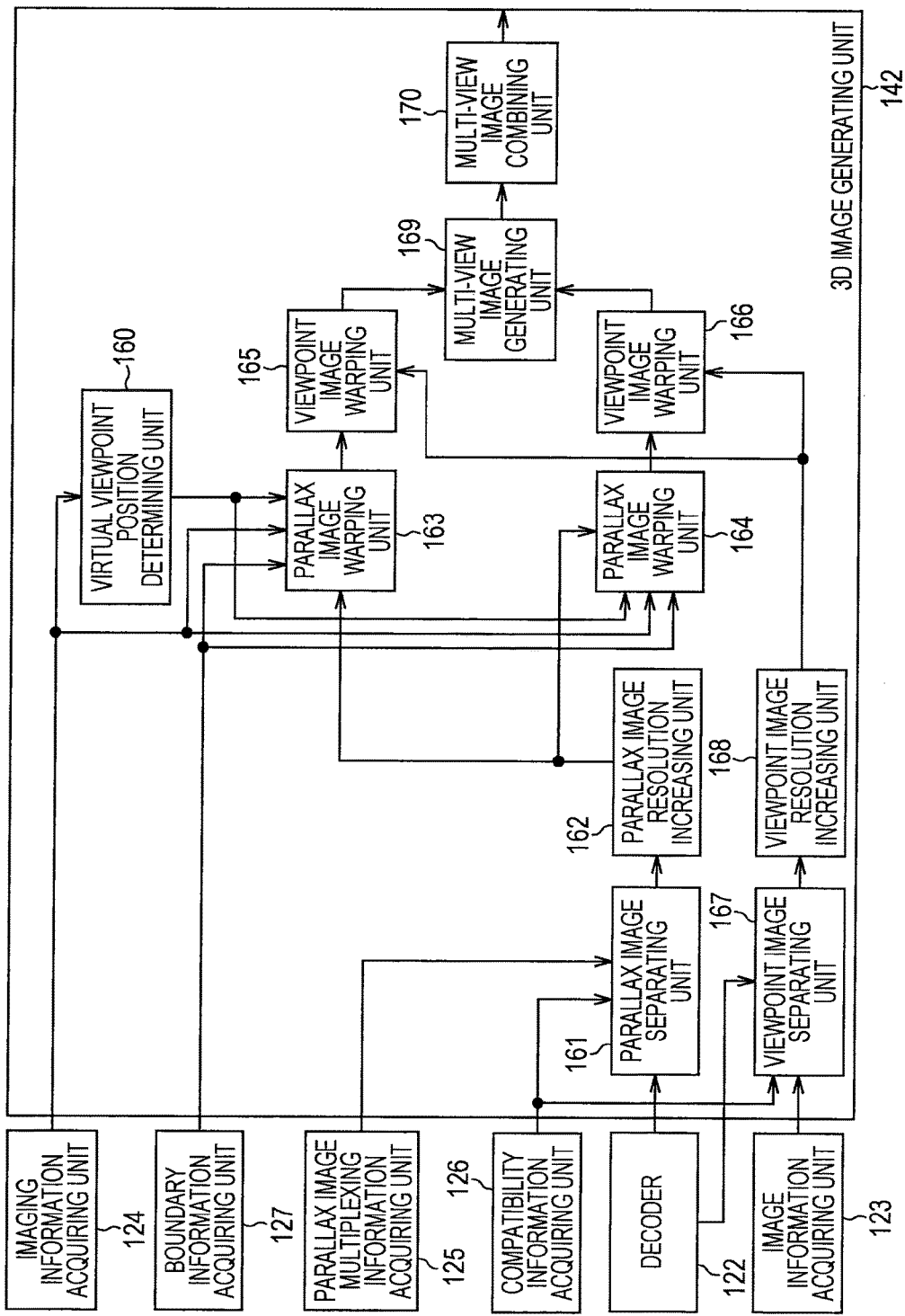
FIG. 7 is a block diagram showing a specific example structure of the 3D image generating unit shown in FIG. 6.

FIG. 7 is a block diagram showing a specific example structure of the 3D image generating unit 142 shown in FIG. 6.

As shown in FIG. 7, the 3D image generating unit 142 includes a virtual viewpoint position determining unit 160, a parallax image separating unit 161, a parallax image resolution increasing unit 162, a parallax image warping unit 163, a parallax image warping unit 164, a viewpoint image warping unit 165, a viewpoint image warping unit 166, a viewpoint image separating unit 167, a viewpoint image resolution increasing unit 168, a multi-view image generating unit 169, and a multi-view image combining unit 170.

Based on the inter-viewpoint distances contained in the imaging information supplied from the imaging information acquiring unit 124 and the number of viewpoints compatible with the display device (not shown), the virtual viewpoint position determining unit 160 of the 3D image generating unit 142 determines the positions of virtual viewpoints to be the positions of the viewpoints of the multi-view images being generated. Based on the positions of the respective virtual viewpoints, the virtual viewpoint position determining unit 160 generates parallax image identifying information for each of the parallax image warping unit 163 and the parallax image warping unit 164. The parallax image identifying information is to be used in generating images of the virtual viewpoints, and is for identifying parallax images of viewpoints located on the outer side of the virtual viewpoints. For each of the virtual viewpoints, the parallax image identifying information to be supplied to the parallax image warping unit 163 differs from the parallax image identifying information to be supplied to the parallax image warping unit 164.

The virtual viewpoint position determining unit 160 also supplies the positions of the respective virtual viewpoints and the corresponding parallax image identifying information to the parallax image warping unit 163 and the parallax image warping unit 164.

Based on the compatibility information supplied from the compatibility information acquiring unit 126, the parallax image separating unit 161 supplies the parallax image A1' of the compatible image supplied from the decoder 122, directly to the parallax image resolution increasing unit 162. Based on the parallax image multiplexing information supplied from the parallax image multiplexing information acquiring unit 125, the parallax image separating unit 161 also divides the multiplexed image of the parallax images of the auxiliary images supplied from the decoder 122. The parallax image separating unit 161 then supplies the parallax images of the viewpoint image B1 and the viewpoint image C1 that are obtained as a result and have half the resolution of the compatible image, to the parallax image resolution increasing unit 162.

The parallax image resolution increasing unit 162 functions as a resolution increasing unit, and increases the resolutions of the respective parallax images of the viewpoint image B1 and the viewpoint image C1, which are supplied from the parallax image separating unit 161 and have half the resolution of the compatible image. As a result, the parallax image resolution increasing unit 162 obtains the parallax images of the viewpoint image B1 and the viewpoint image C1 with the same resolution as that of the compatible image. The parallax image resolution increasing unit 162 then supplies the obtained parallax images of the viewpoint image B1 and the viewpoint image C1, and the parallax image A1' supplied from the parallax image separating unit 161, to the parallax image warping unit 163 and the parallax image warping unit 164.

The parallax image warping unit 163 functions as a parallax image warping unit. Specifically, based on the parallax image identifying information supplied from the virtual viewpoint position determining unit 160, the parallax image warping unit 163 selects, for each virtual viewpoint, one image from the parallax images of the viewpoint image B1 and the viewpoint image C1 and the parallax image A1', which are supplied from the parallax image resolution increasing unit 162. Based on the imaging information from the imaging information acquiring unit 124, the boundary information from the boundary information acquiring unit 127, and the positions of the virtual viewpoints from the virtual viewpoint position determining unit 160, the parallax image warping unit 163 performs a warping operation on the selected parallax image for each virtual viewpoint. The parallax image warping unit 163 supplies the parallax image of each virtual viewpoint generated through the warping operation to the viewpoint image warping unit 165.

The parallax image warping unit 164 functions as a parallax image warping unit, performing the same operations as those of the parallax image warping unit 163, and supplying the resultant parallax images of the respective virtual viewpoints to the viewpoint image warping unit 166.

The viewpoint image warping unit 165 functions as a viewpoint image warping unit. Specifically, based on the parallax image of each virtual viewpoint supplied from the parallax image warping unit 163, the viewpoint image warping unit 165 performs, for each virtual viewpoint, a warping operation on the viewpoint image supplied from the viewpoint image resolution increasing unit 168, the viewpoint image corresponding to the parallax image. As a result, an image of each virtual viewpoint including an occlusion region (described later in detail) is generated. The viewpoint image warping unit 165 supplies the image of each virtual viewpoint including an occlusion region to the multi-view image generating unit 169.

An occlusion region is a region that is formed due to a difference between a virtual viewpoint and the viewpoint of an actually formed viewpoint image. Such an occlusion region exists in an image of a virtual viewpoint, but does not exist in the viewpoint image corresponding to the parallax image used in generating the parallax image of the virtual viewpoint.

The viewpoint image warping unit 166 functions as a viewpoint image warping unit, and performs the same operations as those of the viewpoint image warping unit 165, based on the parallax images of the respective virtual viewpoints supplied from the parallax image warping unit 164.

Based on the compatibility information supplied from the compatibility information acquiring unit 126, the viewpoint image separating unit 167 supplies the viewpoint image A1 as the compatible image supplied from the decoder 122, directly to the viewpoint image resolution increasing unit 168. Based on the image information supplied from the image information acquiring unit 123, the viewpoint image separating unit 167 divides the multiplexed image of the auxiliary images supplied from the decoder 122. The viewpoint image separating unit 167 supplies the resultant viewpoint image B1 and the viewpoint image C1 each having a resolution that is half the resolution of the compatible image, to the viewpoint image resolution increasing unit 168.

The viewpoint image resolution increasing unit 168 increases the resolutions by performing an interpolating operation on each of the viewpoint image B1 and the viewpoint image C1 having the resolution that is half the resolution of the compatible image supplied from the viewpoint image separating unit 167. By doing so, the viewpoint image resolution increasing unit 168 obtains the viewpoint image B1 and the viewpoint image C1 having the same resolution as the compatible image. The viewpoint image resolution increasing unit 168 then supplies the parallax images of the obtained viewpoint image B1 and viewpoint image C1, and the viewpoint image A1 supplied from the viewpoint image separating unit 167, to the viewpoint image warping unit 165 and the viewpoint image warping unit 166.

The multi-view image generating unit 169 functions as an interpolating unit, and, for each virtual viewpoint, interpolates the occlusion region of the virtual viewpoint image supplied from one of the viewpoint image warping units 165 and 166 with the virtual viewpoint image supplied from the other one of the viewpoint image warping units 165 and 166. The multi-view image generating unit 169 supplies the respective resultant virtual viewpoint images as multi-view images to the multi-view image combining unit 170.

The multi-view image combining unit 170 converts the resolution of the multi-view images supplied from the multi-view image generating unit 169 into the resolution calculated by dividing the resolution of the compatible image and the auxiliary images by the number of the virtual viewpoints, and combines the resultant multi-view images to be displayed on the display device (not shown).

[Description of Generation of Virtual Viewpoint Images]

Figure 8:
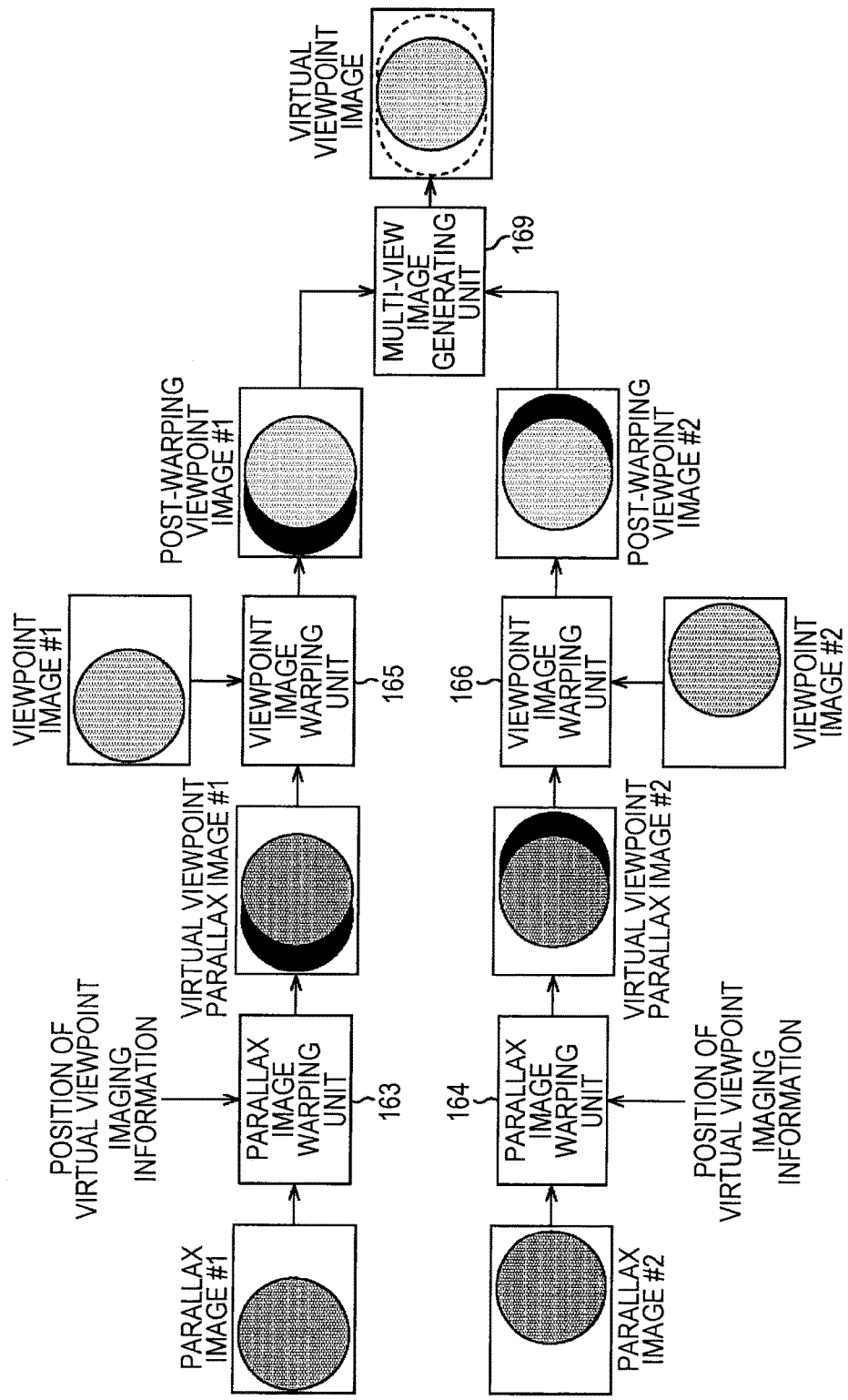
FIG. 8 is a diagram for explaining generation of an image of a virtual viewpoint.

FIG. 8 is a diagram for explaining generation of an image of a virtual viewpoint by the 3D image generating unit 142 shown in FIG. 7.

As shown in FIG. 8, the parallax image warping unit 163 and the parallax image warping unit 164 selects different parallax images from each other, based on the parallax image identifying information. In the example shown in FIG. 8, the parallax image warping unit 163 selects a parallax image that is formed with a circular region that is located in a left-side portion of the screen and has a predetermined parallax value other than 0, and a region that is other than the circular region and has a parallax value of 0 (hereinafter referred to as the parallax image #1). Meanwhile, the parallax image warping unit 164 selects a parallax image that is formed with a circular region that is located in a right-side portion of the screen and has a predetermined parallax value other than 0, and a region that is other than the circular region and has a parallax value of 0 (hereinafter referred to as the parallax image #2).

Based on the position of the virtual viewpoint and the imaging information, each of the parallax image warping units 163 and 164 performs a warping operation on the selected parallax image. As a result, the circular region in the parallax image #1 moves rightward, for example, and a virtual viewpoint parallax image #1 in which an occlusion region shown as a black region in the drawing is formed on the left side of the circular region is generated, as shown in FIG. 8. Meanwhile, the circular region in the parallax image #2 moves leftward, and a virtual viewpoint parallax image #2 in which an occlusion region shown as a black region in the drawing is formed on the right side of the circular region is generated. It should be noted that the position of the circular region in the virtual viewpoint parallax image #1 coincides with the position of the circular region in the virtual viewpoint parallax image #2. Each occlusion region is represented by a black region, for example.

Based on the virtual viewpoint parallax image #1, the viewpoint image warping unit 165 performs a warping operation on the viewpoint image #1 corresponding to the parallax image #1. In the example shown in FIG. 8, the circular region having the predetermined parallax value other than 0 in the viewpoint image #1 is a region in a different color from the other region having the parallax value of 0. Therefore, in the post-warping viewpoint image #1, the circular region in a different color from the surrounding region has moved rightward from the position of the circular region in the pre-warping viewpoint image #1, and an occlusion region exists on the left side of the circular region.

Meanwhile, based on the virtual viewpoint parallax image #2, the viewpoint image warping unit 166 performs a warping operation on the viewpoint image #2 corresponding to the parallax image #2. In the example shown in FIG. 8, the circular region having the predetermined parallax value other than 0 in the viewpoint image #2 is a region in a different color from the other region having the parallax value of 0. Therefore, in the post-warping viewpoint image #2, the circular region in a different color from the surrounding region has moved leftward from the position of the circular region in the pre-warping viewpoint image #2, and an occlusion region exists on the right side of the circular region.

The multi-view image generating unit 169 interpolates the occlusion region of one of the post-warping viewpoint images #1 and #2 with the other one of the viewpoint images. Specifically, since the parallax image identifying information is the information for identifying the viewpoint images of viewpoints on the outer side of the virtual viewpoint, the image of the occlusion region existing in one of the post-warping viewpoint images #1 and #2 exists in the other one of the viewpoint images. Therefore, the multi-view image generating unit 169 interpolates the image of the occlusion region existing in one of the post-warping viewpoint images #1 and #2 with the image of the occlusion region existing in the other one of the viewpoint images. As a result, a virtual viewpoint image in which any occlusion region does not exist is generated, as shown in FIG. 8.

[Description of a Parallax Image Warping Operation]

Figure 9:
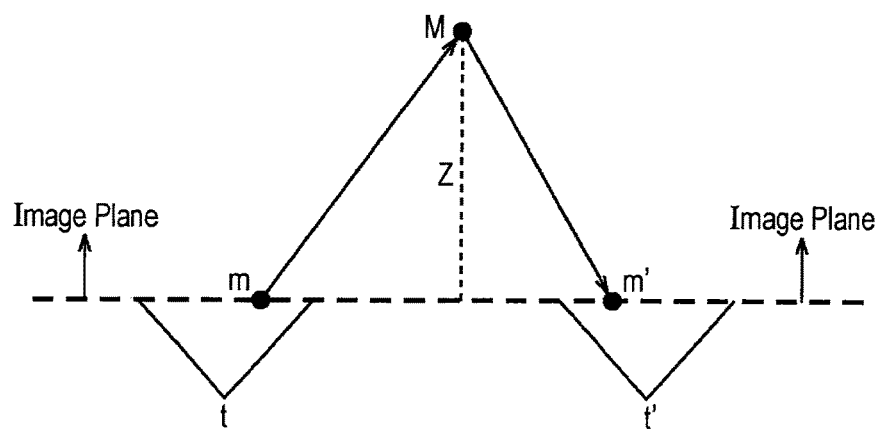
FIG. 9 is a diagram for explaining a parallax image warping operation.

FIG. 9 is a diagram for explaining a parallax image warping operation.

In a parallax image warping operation, the position m (x, y, z) of each pixel in a parallax image of a viewpoint in a selected position t ($t_x$, $t_y$, $t_z$) is first associated with a position m' (x', y', z') in a parallax image of a virtual viewpoint in a position t' ($t'_x$, $t'_y$, $t'_z$) via a three-dimensional space, as shown in FIG. 9.

Specifically, according to the equations (1) shown below, the position M (X, Y, Z) in the three-dimensional space corresponding to the position m (x, y, z) of a pixel of a parallax value Z in the parallax image of the viewpoint in the position t ($t_x$, $t_y$, $t_z$) is determined, and the position m' (x', y', z') corresponding to the position M (X, Y, Z) in the parallax image of the virtual viewpoint in the position t' ($t'_x$, $t'_y$, $t'_z$) is determined.

$$(X,Y,Z)^T = RA^{-1}(x,y,1)^T Z + (t_x, t_y, t_z)^T s(x',y',1)^T = \\ A'R'^{-1}[(X,Y,Z)^T - (t'_x, t'_y, t'_z)^T] \qquad (1)$$

In the equations (1), R represents the rotation matrix for warping operations of the imaging units 51A through 51C that capture parallax images, and is expressed by the following equation (2):

[Mathematical Formula 1]

$$R = \begin{bmatrix} r\_11 & r\_12 & r\_13 \\ r\_21 & r\_22 & r\_23 \\ r\_31 & r\_32 & r\_33 \end{bmatrix} \qquad (2)$$

In the equation (2), r_11 through r_13, r_21 through r_23, and r_31 through r_33 are predetermined values.

In the equations (1), A represents a matrix containing the internal parameters of the imaging units 51A through 51C that capture parallax images, and is expressed by the following equation (3):

[Mathematical Formula 2]

$$A = \begin{bmatrix} \text{focal\_length\_x} & \text{radial\_distortion} & \text{principal\_point\_x} \\ 0.0 & \text{focal\_length\_y} & \text{principal\_point\_y} \\ 0.0 & 0.0 & 1.0 \end{bmatrix} \quad (3)$$

In the equation (3), "focal_length_x" and "focal_length_y" represent the x-direction focal length and the y-direction focal length included in the internal parameters, respectively. "principal_point_x" and "principal_point_y" represent the x-direction position and the y-direction position of the principal point included in the internal parameters, respectively. "radial_distortion" represents the radial distortion coefficient included in the internal parameters.

Further, in the equations (1), R' is expressed in the same manner as R, and represents the rotation matrix for warping operations of a virtual imaging unit that captures virtual viewpoint parallax images. A' is expressed in the same manner as A, and represents a matrix containing the internal parameters of a virtual imaging unit that captures virtual viewpoint parallax images. Also, in the equations (1), s represents scaling factor.

After association is conducted in the above described manner, the pixels corresponding to the respective pixels in the selected parallax image are determined in the virtual viewpoint parallax image, based on the position m' (x', y', z') corresponding to the position m (x, y, z) of each pixel. In a case where two or more pixels are associated with a predetermined pixel in a virtual viewpoint parallax image, the pixel with the largest parallax value among the two or more pixels, or the pixel corresponding to the object on the front side, is set as the pixel corresponding to the predetermined pixel in the virtual viewpoint parallax image. The parallax value of each pixel in the selected parallax image is set as the parallax value of the pixel corresponding to the pixel in the virtual viewpoint parallax image, and, as a result, the virtual viewpoint parallax image is generated.

[Description of Parallax Image Warping Operations Based on Boundary Information]

Figure 10:
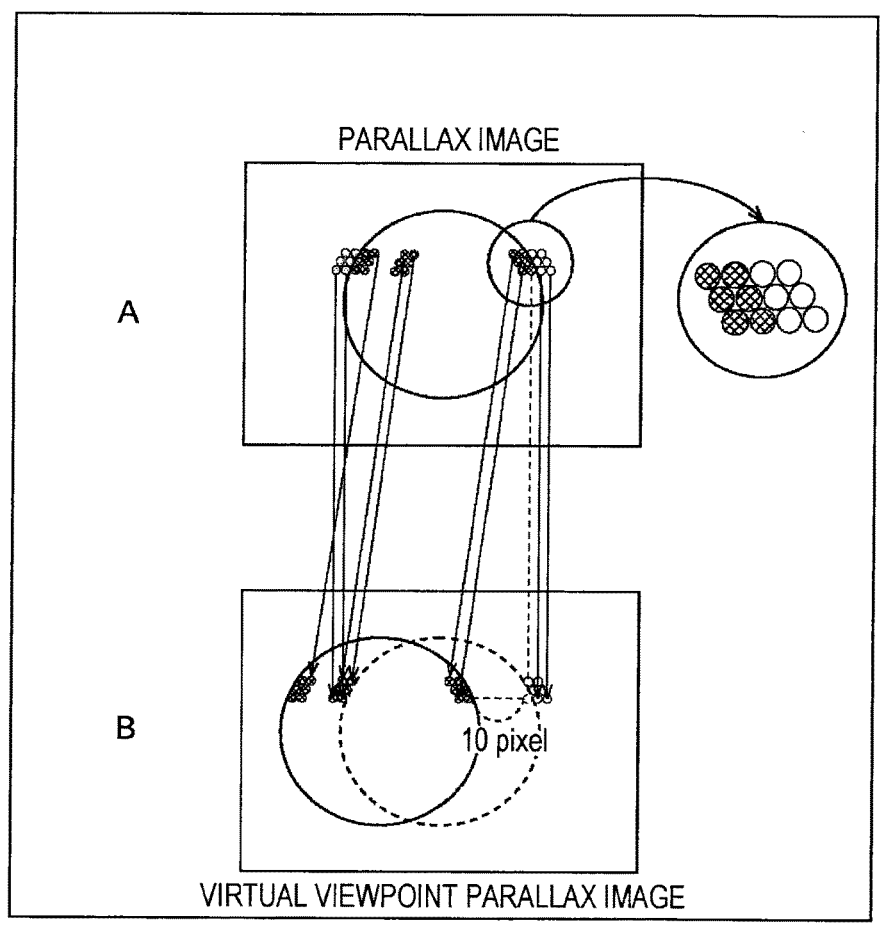
FIG. 10 is a diagram showing a parallax image having its resolution not yet reduced, and the result of a warping operation performed on the parallax image.
Figure 11:
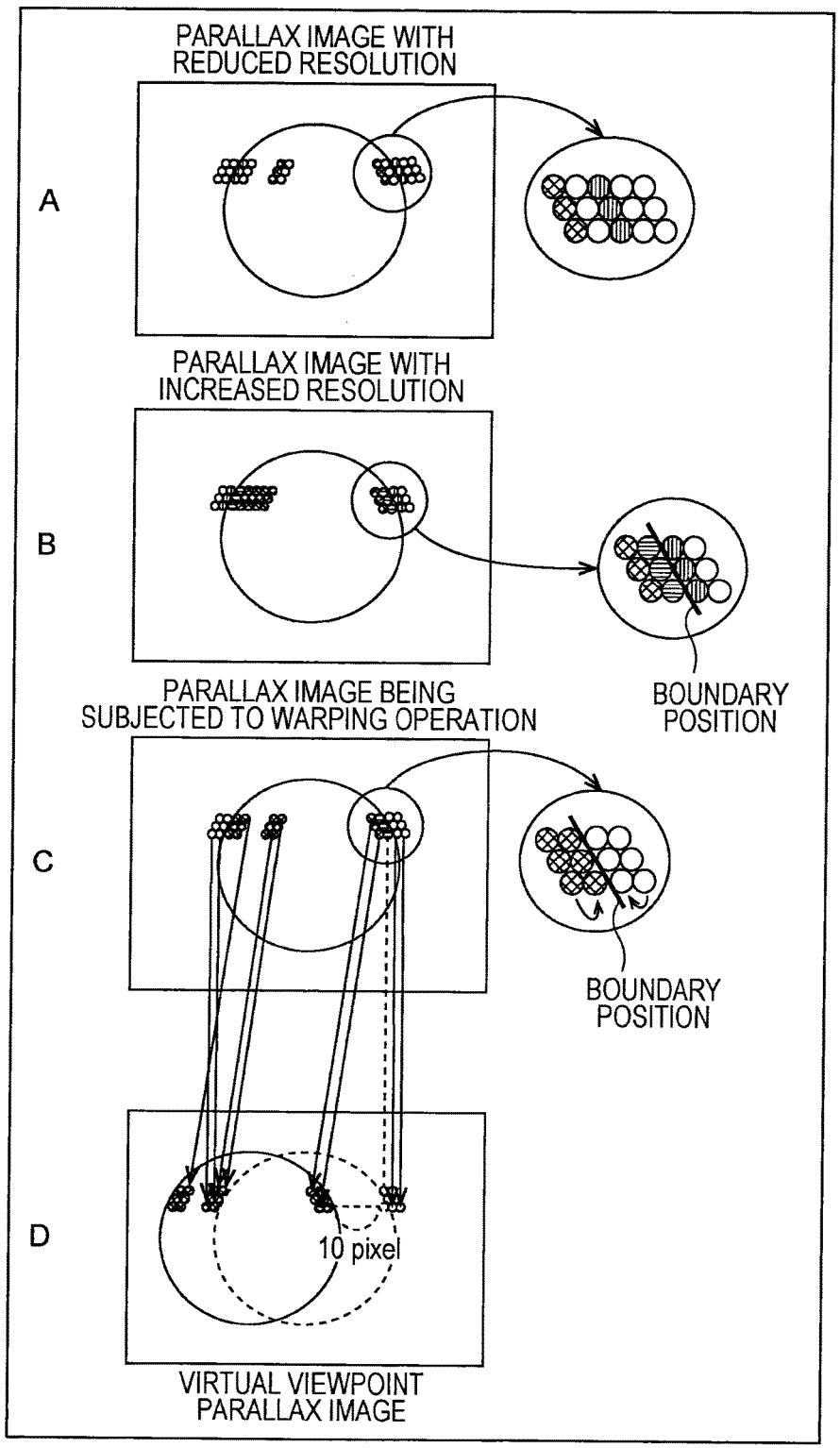
FIG. 11 is a diagram showing a parallax image with a reduced resolution, a parallax image with an increased resolution, a parallax image being subjected to a warping operation, and the result of the parallax image warping operation.
Figure 12:
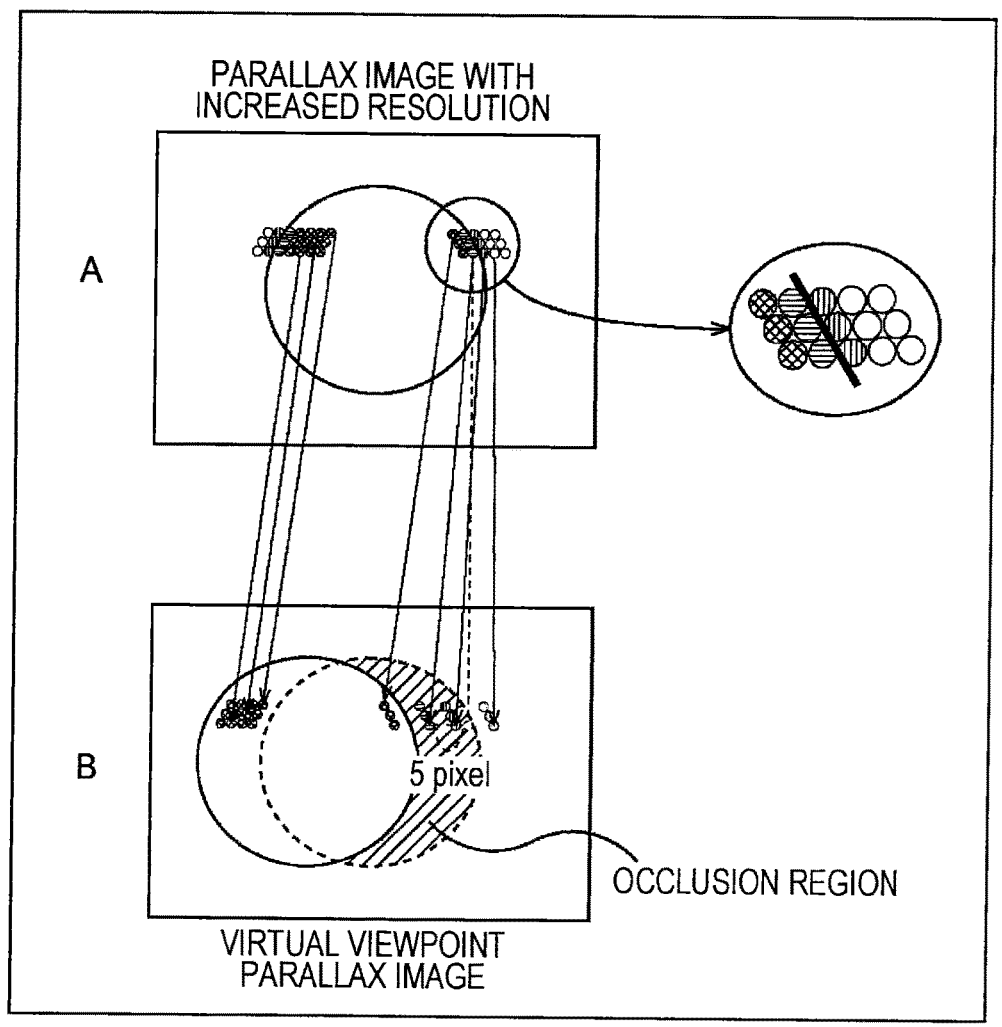
FIG. 12 is a diagram showing a parallax image having its resolution increased, and the result of a warping operation performed on the parallax image.

FIGS. 10 through 12 are diagrams for explaining parallax image warping operations to be performed by the parallax image warping unit 163 and the parallax image warping unit 164 of FIG. 7, based on the boundary information. In FIGS. 10 through 12, the small circles represent pixels, and the patterns in the circles represent parallax values.

FIG. 10 is a diagram showing a parallax image that has its resolution not yet reduced by the parallax image generating unit 53 of the encoding device 50, and the result of the warping operation performed on the parallax image.

In the example shown in FIG. 10, the parallax image having its resolution not yet reduced is a parallax image in which the circular region located at the center of the screen has a predetermined parallax value greatly different from 0, and the parallax value of the region other than the circular region is 0, as shown in A of FIG. 10. In this case, when a warping operation is performed on the parallax image having its resolution not yet reduced, the circular region moves leftward by the distance equivalent to 10 pixels, for example, in the virtual viewpoint parallax image obtained as a result of the warping operation, as shown in B of FIG. 10.

FIG. 11 is a diagram showing a parallax image having its resolution reduced by the parallax image generating unit 53 of the encoding device 50, a parallax image having its resolution increased by the parallax image resolution increasing unit 162, a parallax image being subjected to a warping operation, and the result of the parallax image warping operation.

In a case where the parallax image generating unit 53 performs a resolution reduction by setting the average parallax value between two pixels adjacent to each other in the horizontal direction in the parallax image of A of FIG. 10 having its resolution not yet reduced as the parallax value of the pixels corresponding to the two pixels in the parallax image having its resolution lowered, the parallax image having its resolution lowered is as shown in A of FIG. 11.

In FIG. 11, the parallax values of the pixels represented by the circles shaded with vertical lines is the average value between the parallax values of the pixels represented by the circles shaded with grid-like patterns and the parallax values of the pixels represented by the circles in gray. For ease of explanation, in A of FIG. 11, the pixels having their reductions not yet reduced are represented by circles, and the pixels to be removed by the resolution reduction are represented by the circles that are not shaded.

In this case, in the parallax image of A of FIG. 10 having its resolution not yet reduced, the boundary information about the pixels adjacent to the boundary between the circular region in which the parallax value is a predetermined value other than 0 and the other region having the parallax value of 0 is set to 1, and the boundary information about the pixels other than those pixels is set to 0.

When the parallax image of A of FIG. 11 having its resolution reduced is supplied, the parallax image resolution increasing unit 162 performs a resolution increase by conducting a linear interpolation on the parallax values of the respective pixels in the parallax image having its resolution increased, for example, by using the parallax value of two pixels adjacent to each other in the horizontal direction in the parallax image of A of FIG. 11 having its resolution reduced, the two pixels corresponding to those pixels. As a result, the parallax image of B of FIG. 11 having its resolution increased is generated. In B of FIG. 11, the parallax values of the pixels represented by the circles shaded with horizontal lines are values within the range of the parallax values of the pixels represented by the circles shaded with grid-like patterns and the parallax values of the pixels represented by the circles shaded with vertical lines. The same applies to A of FIG. 12, which will be described later.

As shown in C of FIG. 11, based on the boundary information, the parallax image warping unit 163 (164) changes the parallax values of the pixels corresponding to the boundary information indicating that the pixels are adjacent to the boundary position, to the parallax values of the pixels adjacent to those pixels in the parallax image shown in B of FIG. 11 having its resolution increased.

For example, between two adjacent pixels corresponding to the boundary information on a pixel basis in the parallax image of B of FIG. 11 having its resolution increased, the parallax image warping unit 163 (164) changes the parallax value of the pixel on the left side to the parallax value of the adjacent pixel located on the left side of the pixel. The parallax image warping unit 163 (164) also changes the parallax value of the pixel on the right side to the parallax value of the adjacent pixel located on the right side of the pixel.

After a warping operation is performed on the parallax image having parallax value changed in the above manner, the circular region having the predetermined parallax value other than 0 has moved leftward by the distance equivalent to 10 pixels in the virtual viewpoint parallax image obtained as a result of the warping operation, as shown in D of FIG. 11.

As described above, based on the boundary information, the parallax image warping unit 163 (164) changes the parallax value of each pixel adjacent to the boundary position to the parallax value of a pixel adjacent to the pixel in a parallax image having its resolution increased, and then subjects the resultant image to a warping operation. Accordingly, the parallax values of the pixels adjacent to the boundary position in the parallax image being subjected to a warping operation become closer to the parallax values in the parallax image having its resolution not yet reduced. Thus, more accurate warping operations can be performed on parallax images of the auxiliary images.

On the other hand, in a case where a warping operation is performed by using the parallax image of A of FIG. 12, which is the same as B of FIG. 11, having its resolution increased as shown in FIG. 12, parallax values are associated with an occlusion region in the virtual viewpoint parallax image obtained as a result of the warping operation, as shown in B of FIG. 12.

Specifically, the pixels represented by the circles shaded with horizontal lines need to move leftward by the distance equivalent to 10 pixels as shown in B of FIG. 10, but move leftward by the distance equivalent only to 5 pixels as shown in B of FIG. 12, for example. That is, an accurate warping operation is not performed. As a result, the occlusion region that is supposed to be associated with no parallax values is associated with parallax values, and an appropriate virtual viewpoint image is not obtained.

[Description of an Operation of the Decoding Device]

Figure 13:
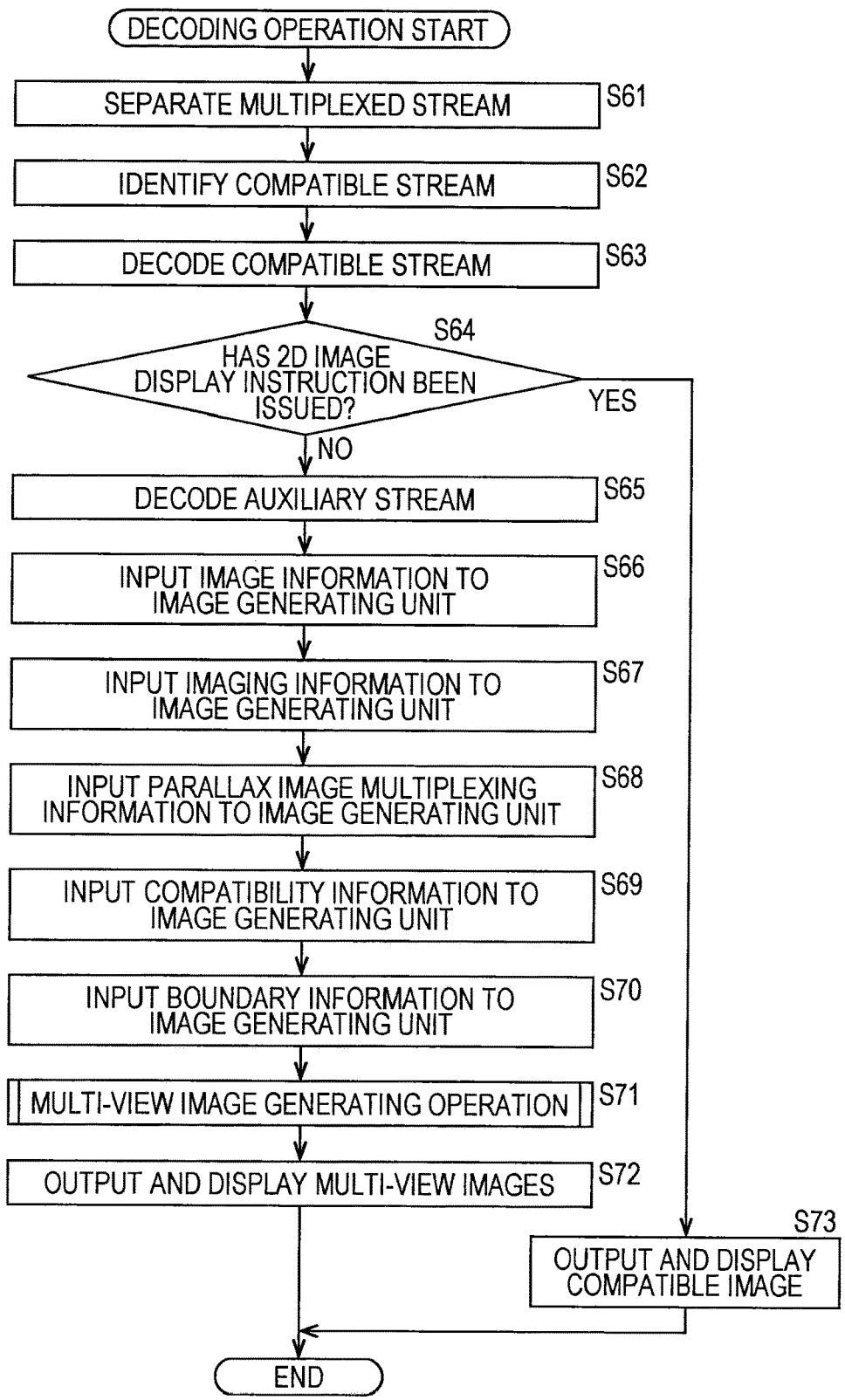
FIG. 13 is a flowchart for explaining a decoding operation by the decoding device shown in FIG. 6.

FIG. 13 is a flowchart for explaining a decoding operation by the decoding device 120 shown in FIG. 6. This decoding operation is started when the multiplexed stream transmitted from the encoding device 50 shown in FIG. 1 is input to the decoding device 120, for example.

In step S61 of FIG. 13, the separating unit 121 of the decoding device 120 receives the multiplexed stream transmitted from the encoding device 50, and separates the TSs from one another. The separating unit 121 extracts the compatible stream and the auxiliary stream from the separated TSs, and supplies the extracted streams to the decoder 122. The auxiliary decoder 132 of the decoder 122 supplies the compatibility information contained in the auxiliary stream supplied from the separating unit 121, to the compatible decoder 131.

In step S62, based on compatibility information that is supplied from the auxiliary decoder 132, the compatible decoder 131 identifies the compatible stream from the compatible and auxiliary streams supplied from the separating unit 121.

In step S63, based on the compatibility information, the compatible decoder 131 decodes the compatible image contained in the compatible stream by a technique compatible with the AVC technique, and supplies the resultant viewpoint image A1 to the image generating unit 128.

In step S64, the image generating unit 128 determines whether a 2D image display instruction has been issued from a viewer. If it is determined in step S64 that a 2D image display instruction has not been issued from a viewer, or if a glasses-free 3D image display instruction has been issued from a viewer, the auxiliary decoder 132 identifies the auxiliary stream from the compatible and auxiliary streams supplied from the separating unit 121, based on the compatibility information.

In step S65, the auxiliary decoder 132 decodes, by a technique compatible with the auxiliary encoder 62 shown in FIG. 1, the multiplexed image of the auxiliary images, the parallax image A1' of the compatible image, and the multiplexed image of the parallax images of the auxiliary images, which have been encoded and are contained in the auxiliary stream. The auxiliary decoder 132 supplies the multiplexed image of the auxiliary images, the parallax image A1' of the compatible image, and the multiplexed image of the parallax images of the auxiliary images, which are obtained as a result of the decoding, to the image generating unit 128. Also, the auxiliary decoder 132 supplies the image information contained in the auxiliary stream to the image information acquiring unit 123, and supplies the imaging information to the imaging information acquiring unit 124. Further, the auxiliary decoder 132 supplies the parallax image multiplexing information contained in the auxiliary stream to the parallax image multiplexing information acquiring unit 125, and supplies the compatibility information to the compatibility information acquiring unit 126. The auxiliary decoder 132 also supplies the boundary information contained in the auxiliary stream to the boundary information acquiring unit 127.

In step S66, the image information acquiring unit 123 acquires the image information supplied from the auxiliary decoder 132, and inputs the image information to the image generating unit 128. In step S67, the imaging information acquiring unit 124 acquires the imaging information supplied from the auxiliary decoder 132, and inputs the imaging information to the image generating unit 128.

In step S68, the parallax image multiplexing information acquiring unit 125 acquires the parallax image multiplexing information supplied from the auxiliary decoder 132, and inputs the parallax image multiplexing information to the image generating unit 128. In step S69, the compatibility information acquiring unit 126 acquires the compatibility information supplied from the auxiliary decoder 132, and inputs the compatibility information to the image generating unit 128.

In step S70, the boundary information acquiring unit 127 acquires the boundary information supplied from the auxiliary decoder 132, and inputs the boundary information to the image generating unit 128.

In step S71, the 3D image generating unit 142 of the image generating unit 128 performs a multi-view image generating operation to generate a combined image of multi-view images. This multi-view image generating operation will be described later in detail, with reference to FIG. 14.

In step S72, the multi-view image combining unit 170 of the 3D image generating unit 142 outputs the combined image of multi-view images generated through the procedure of step S71 to the display device (not shown), and causes the display device to display the combined image so that the viewable angle varies at the respective viewpoints. The operation then comes to an end.

If it is determined in step S64 that a 2D image display instruction has been issued from a viewer, on the other hand, the 2D image generating unit 141 of the image generating unit 128, in step S73, outputs the viewpoint image A1 as the compatible image supplied from the compatible decoder 131 to the display device (not shown), and causes the display device to display the viewpoint image A1. The operation then comes to an end.

Figure 14:
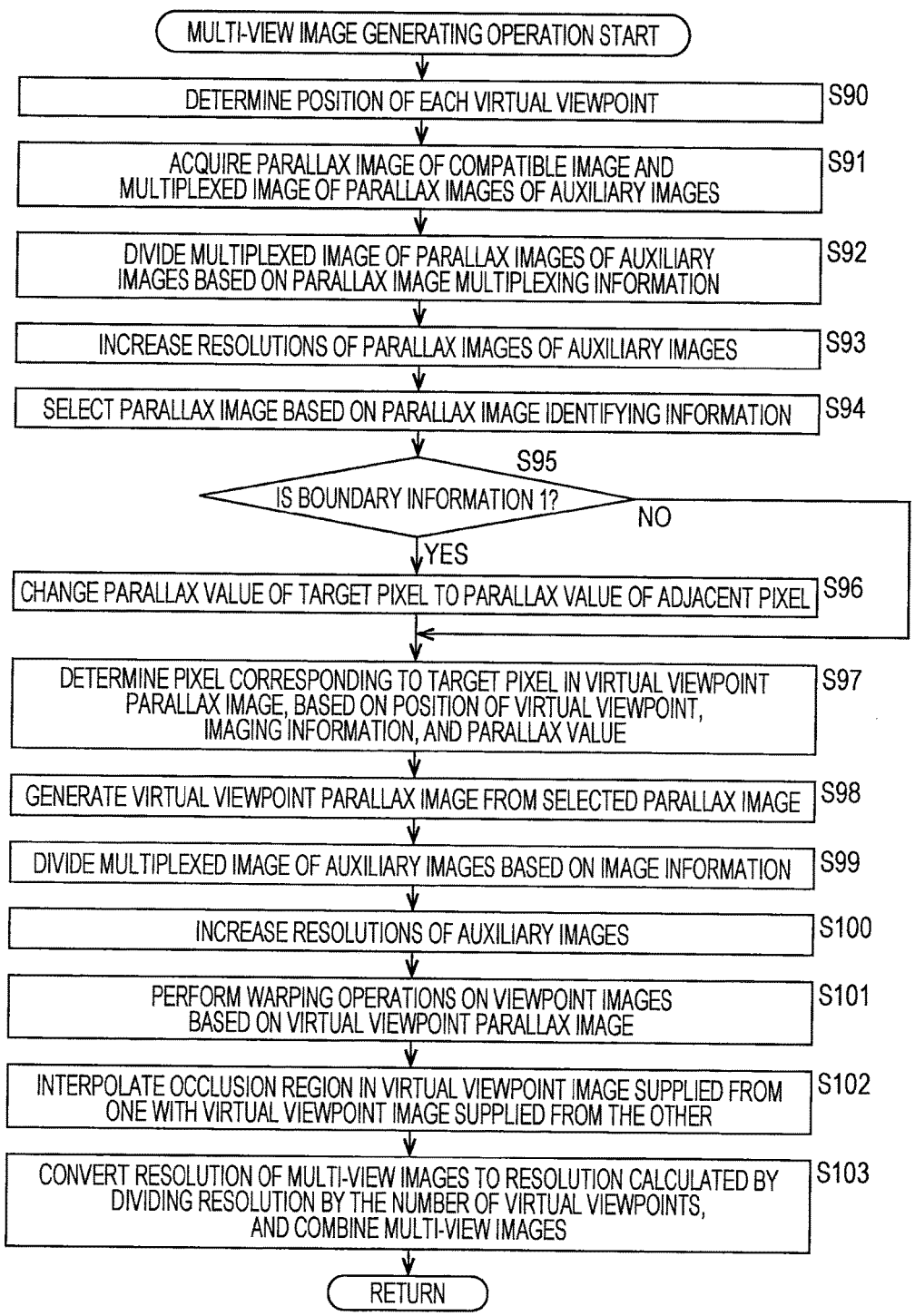
FIG. 14 is a flowchart for explaining in detail the multi-view image generating operation of FIG. 13.

FIG. 14 is a flowchart for explaining in detail the multi-view image generating operation of step S71 of FIG. 13.

In step S90 of FIG. 14, based on the inter-viewpoint distances contained in the imaging information supplied from the imaging information acquiring unit 124 and the number of viewpoints compatible with the display device (not shown), the virtual viewpoint position determining unit 160 (FIG. 7) of the 3D image generating unit 142 determines the positions of respective virtual viewpoints. Based on the positions of the respective virtual viewpoints, the virtual viewpoint position determining unit 160 generates parallax image identifying information for each of the parallax image warping unit 163 and the parallax image warping unit 164. The virtual viewpoint position determining unit 160 also supplies the positions of the respective virtual viewpoints and the corresponding parallax image identifying information to the parallax image warping unit 163 and the parallax image warping unit 164.

In step S91, the parallax image separating unit 161 acquires the parallax image A1' of the compatible image and the multiplexed image of the parallax images of the auxiliary images supplied from the auxiliary decoder 132.

In step S92, based on the parallax image multiplexing information supplied from the parallax image multiplexing information acquiring unit 125, the parallax image separating unit 161 divides the multiplexed image of the parallax images of the auxiliary images. The parallax image separating unit 161 then supplies the resultant parallax images of the viewpoint image B and the viewpoint image C that are the auxiliary images and have a resolution that is half the resolution of the compatible image, to the parallax image resolution increasing unit 162. Based on the compatibility information supplied from the compatibility information acquiring unit 126, the parallax image separating unit 161 supplies the parallax image A1' directly to the parallax image resolution increasing unit 162.

In step S93, the parallax image resolution increasing unit 162 increases the resolutions of the parallax images of the viewpoint image B and the viewpoint image C that are the auxiliary images and have the resolution that is half the resolution of the compatible image supplied from the parallax image separating unit 161. As a result, the parallax image resolution increasing unit 162 obtains the parallax images of the viewpoint image B1 and the viewpoint image C1 with the same resolution as that of the compatible image. The parallax image resolution increasing unit 162 then supplies the obtained parallax images of the viewpoint image B1 and the viewpoint image C1, and the parallax image A1' supplied from the parallax image separating unit 161, to the parallax image warping unit 163 and the parallax image warping unit 164.

In step S94, based on the parallax image identifying information supplied from the virtual viewpoint position determining unit 160, the parallax image warping unit 163 selects, for each virtual viewpoint, one image from the parallax images of the viewpoint image B1 and the viewpoint image C1 and the parallax image A1', which are supplied from the parallax image resolution increasing unit 162. The parallax image warping unit 164 performs the same operations as those of the parallax image warping unit 163.

In steps S95 through S98, the parallax image warping units 163 and 164 each perform a warping operation on the selected parallax image.

Specifically, for each unit in the boundary information, the pixel corresponding to the boundary information in the selected parallax image is set as the pixel to be subjected to the parallax image warping operation (hereinafter referred to as the target pixel), and the procedures of steps S95 through S97 are carried out.

That is, in step S95, the parallax image warping unit 163 (164) determines whether the boundary information about the target pixel is 1. If the boundary information about the target pixel is determined to be 1 in step S95, the operation moves on to step S96.

In step S96, the parallax image warping unit 163 (164) changes the parallax value of the target pixel to the parallax value of the adjacent pixel located on the left or right side of the target pixel, and the operation moves on to step S97.

If the boundary information about the target pixel is determined not to be 1 in step S95, or if the boundary information about the target pixel is determined to be 0, the operation moves on to step S97.

In step S97, for each virtual viewpoint, the parallax image warping unit 163 (164) determines the pixel corresponding to the target pixel in the virtual viewpoint parallax image according to the above described equations (1), based on the position of the virtual viewpoint, the imaging information, and the parallax value of the target pixel. If the boundary information about the target pixel is 1, the parallax value of the target pixel used here is the parallax value changed in step S97. If the boundary information about the target pixel is 0, on the other hand, the parallax value of the target value used here is the parallax value of the target pixel in the parallax image selected in step S94.

In step S98, based on the pixel determined in step S97, the parallax image warping unit 163 (164) generates a virtual viewpoint parallax image from the selected parallax image, for each virtual viewpoint. Specifically, for each virtual viewpoint, the parallax image warping unit 163 (164) sets the parallax value of each pixel in the selected parallax image as the parallax value of the pixel determined in step S97 in the virtual viewpoint parallax image. The parallax image warping unit 163 (164) then supplies each resultant virtual viewpoint parallax image to the viewpoint image warping unit 165 (166).

In step S99, based on the image information supplied from the image information acquiring unit 123, the viewpoint image separating unit 167 divides the multiplexed image of the auxiliary images supplied from the auxiliary decoder 132. The viewpoint image separating unit 167 then supplies the resultant viewpoint images B1 and C1 having a resolution that is half the resolution of the compatible image, to the parallax image resolution increasing unit 162. Based on the compatibility information supplied from the compatibility information acquiring unit 126, the viewpoint image separating unit 167 supplies the viewpoint image A1 as the compatible image supplied from the compatible decoder 131, directly to the viewpoint image resolution increasing unit 168.

In step S100, the viewpoint image resolution increasing unit 168 increases the resolutions of the viewpoint image B1 and the viewpoint image C1 that are the auxiliary images and have the resolution that is half the resolution of the compatible image supplied from the viewpoint image separating unit 167. By doing so, the viewpoint image resolution increasing unit 168 obtains the viewpoint image B1 and the viewpoint image C1 having the same resolution as the compatible image. The viewpoint image resolution increasing unit 168 then supplies the obtained viewpoint image B1 and viewpoint image C1, and the viewpoint image A1 supplied from the viewpoint image separating unit 167, to the viewpoint image warping unit 165 and the viewpoint image warping unit 166.

In step S101, based on the parallax image of each virtual viewpoint supplied from the parallax image warping unit 163, the viewpoint image warping unit 165 performs, for each virtual viewpoint, a warping operation on the viewpoint image supplied from the viewpoint image resolution increasing unit 168, the viewpoint image corresponding to the parallax image. As a result, an image of each virtual viewpoint including an occlusion region is generated. The viewpoint image warping unit 165 supplies the image of each virtual viewpoint including an occlusion region to the multi-view image generating unit 169. The viewpoint image warping unit 166 performs the same operations as those of the viewpoint image warping unit 165, based on the parallax images of the respective virtual viewpoints supplied from the parallax image warping unit 164.

In step S102, for each virtual viewpoint, the multi-view image generating unit 169 interpolates the occlusion region of the virtual viewpoint image supplied from one of the viewpoint image warping units 165 and 166 with the virtual viewpoint image supplied from the other one of the viewpoint image warping units 165 and 166. The multi-view image generating unit 169 supplies the respective resultant virtual viewpoint images as multi-view images to the multi-view image combining unit 170.

In step S103, the multi-view image combining unit 170 converts the resolution of the multi-view images supplied from the multi-view image generating unit 169 into the resolution calculated by dividing the resolution of the compatible image and the auxiliary images by the number of the virtual viewpoints, and combines the resultant multi-view images, to generate a combined image of the multi-view images. The operation returns to step S71 of FIG. 13, and then moves on to step S72.

As described above, based on the boundary information transmitted from the encoding device 50, the decoding device 120 performs warping operations on the parallax images of the auxiliary images. Accordingly, the decoding device 120 can change each parallax image being subjected to a warping operation to a parallax image similar to the parallax image having its resolution not yet reduced, by changing the parallax values of the pixels adjacent to the boundary position in the parallax image of each auxiliary image having its resolution increased, to the parallax values of the pixels adjacent to the pixels adjacent to the boundary position, and subjecting each changed parallax image to a warping operation. As a result, accurate warping operations can be performed on the parallax images of the auxiliary images.

<Second Embodiment>
[Example Structure of a Second Embodiment of an Encoding Device]

Figure 15:
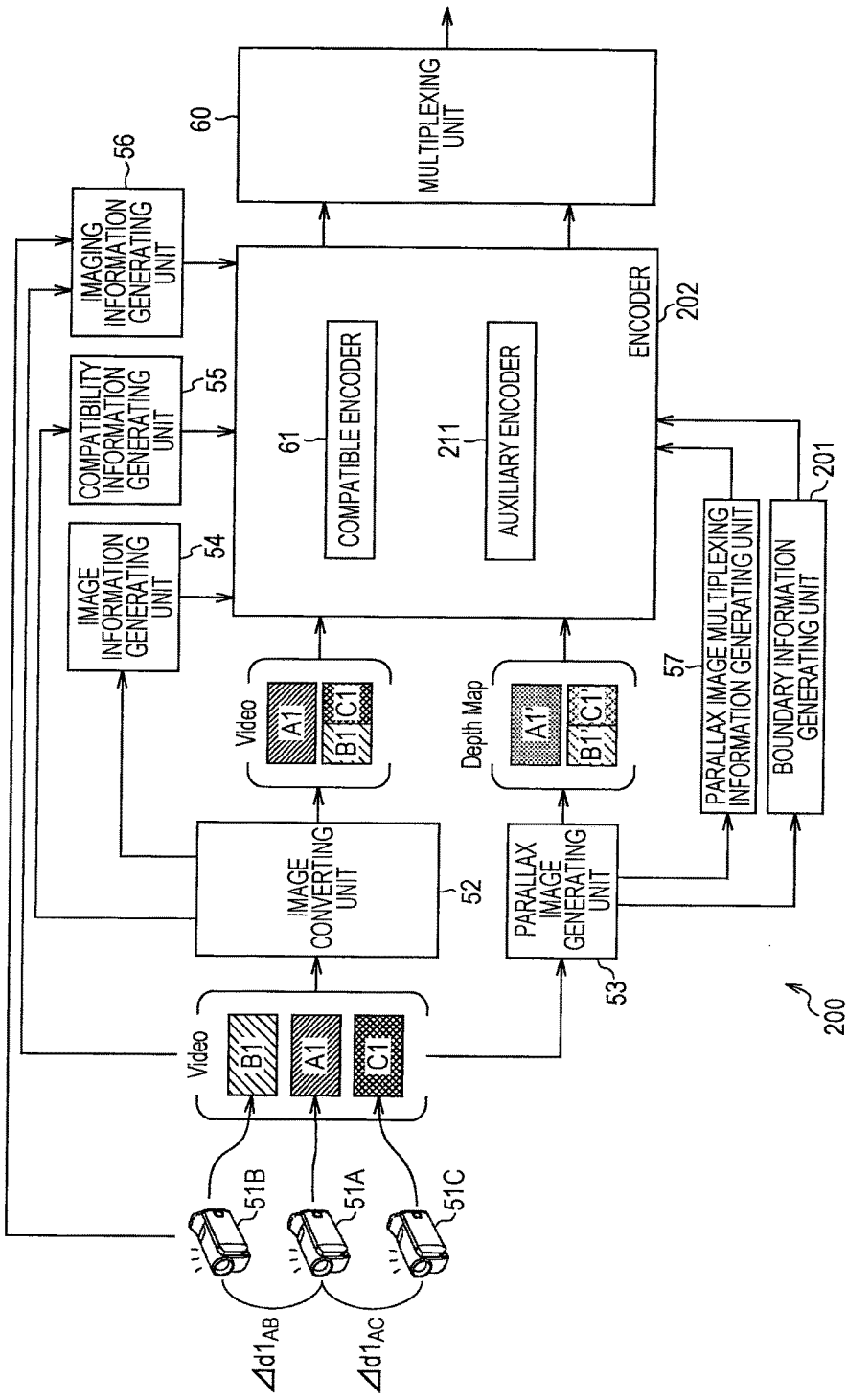
FIG. 15 is a block diagram showing an example structure of a second embodiment of an encoding device to which the present technique is applied.

FIG. 15 is a block diagram showing an example structure of a second embodiment of an encoding device as an image processing device to which the present technique is applied.

In the structure illustrated in FIG. 15, the same components as those in FIG. 1 are denoted by the same reference numerals as those in FIG. 1. The explanations that have already been made will not be repeated.

The structure of the encoding device 200 shown in FIG. 15 differs from the structure shown in FIG. 1, mainly in that the boundary information generating unit 58 is replaced with a boundary information generating unit 201, and the encoder 59 is replaced with an encoder 202.

The encoding device 200 transmits left-side boundary information (is_left_edge) indicating whether the pixel corresponding to the boundary information indicating whether the pixel is adjacent to the boundary position is located on the left side of the boundary position.

Specifically, the boundary information generating unit 201 of the encoding device 200 detects respective boundary positions from a parallax image B1' and a parallax image C1' supplied from a parallax image generating unit 53. The boundary information generating unit 201 then functions as a generating unit, and, based on the detected boundary positions, generates boundary information and left-side boundary information on a pixel basis. The boundary information and the left-side boundary information are supplied to the encoder 202.

The encoder 202 is formed with a compatible encoder 61 and an auxiliary encoder 211.

Like the auxiliary encoder 62 shown in FIG. 1, the auxiliary encoder 211 of the encoder 202 encodes, by a predetermined technique, a multiplexed image of auxiliary images from an image converting unit 52, and a parallax image A1' of a compatible image and a multiplexed image of parallax images of the auxiliary images from the parallax image generating unit 53.

The auxiliary encoder 211 also adds image information from an image information generating unit 54, compatibility information from a compatibility information generating unit 55, imaging information from an imaging information generating unit 56, parallax image multiplexing information from a parallax image multiplexing information generating unit 57, the boundary information and the left-side boundary information from the boundary information generating unit 201, and the like, to the encoded images obtained as a result of the encoding. An encoded stream is thus generated. The auxiliary encoder 211 supplies the encoded stream as an auxiliary stream to a multiplexing unit 60.

[Description of an Operation of the Encoding Device]

An encoding operation to be performed by the encoding device 200 shown in FIG. 15 is the same as the encoding operation shown in FIGS. 3 and 4, except that the left-side boundary information as well as the boundary information is input to the encoder 202 in step S20 of FIG. 4, and a different boundary information generating operation is performed. Therefore, only the boundary information generating operation is described below.

Figure 16:
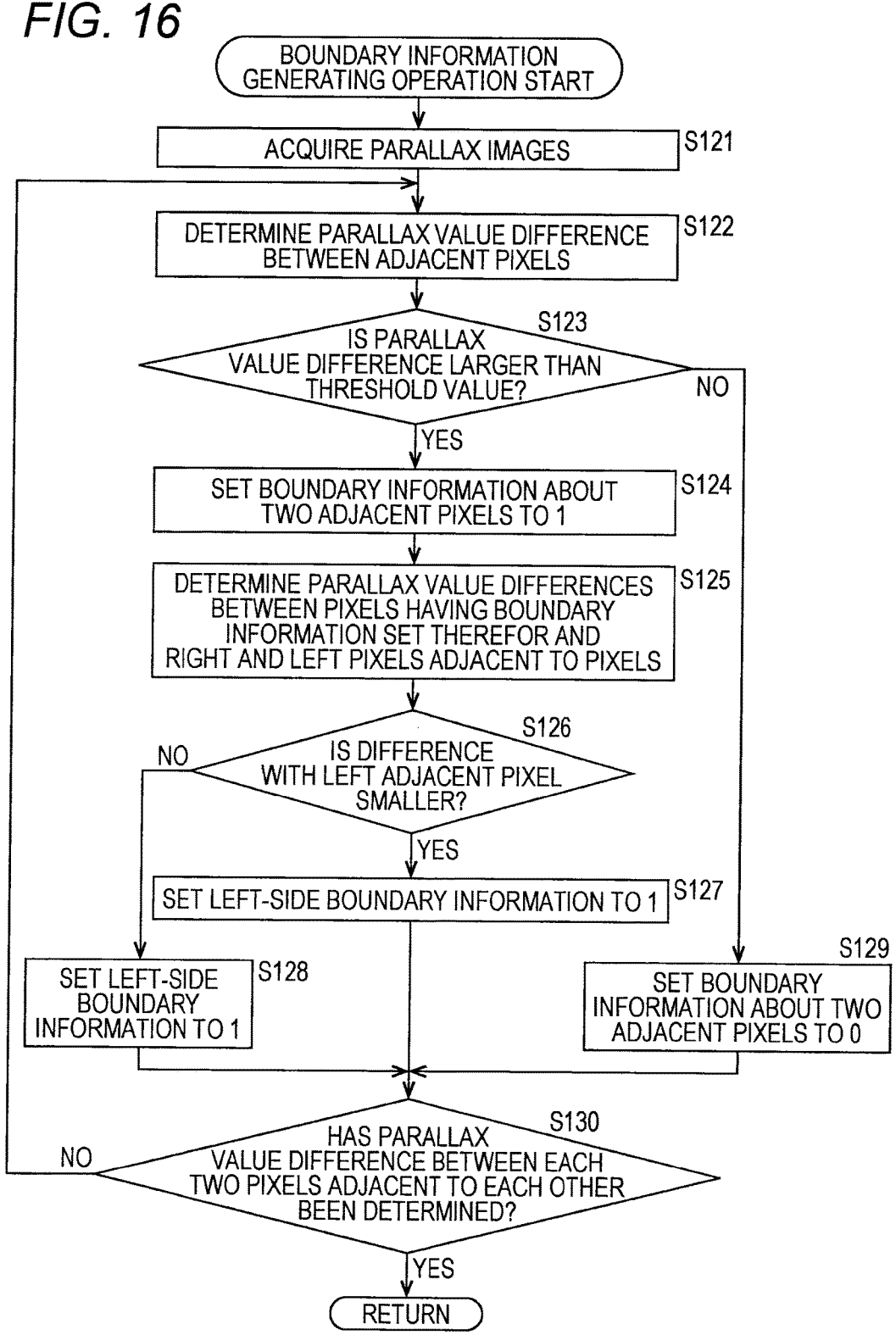
FIG. 16 is a flowchart for explaining in detail a boundary information generating operation by the encoding device shown in FIG. 15.

FIG. 16 is a flowchart for explaining in detail the boundary information generating operation by the encoding device 200 shown in FIG. 15.

The procedures of steps S121 through S124, S129, and S130 of FIG. 16 are the same as the procedures of steps S41 through S46 of FIG. 5.

After the procedure of step S124 of FIG. 16, the operation moves on to step S125, and the following procedures of steps S125 through S128 are carried out for each of the two pixels having the boundary information set therefor in the procedure of step S124.

In step S125, the boundary information generating unit 201 calculates the parallax value differences between a pixel having the boundary information set therefor in the procedure of step S124 and the right-side and left-side pixels adjacent to the pixel.

In step S126, the boundary information generating unit 201 determines whether the difference determined in step S125 with respect to the left-side adjacent pixel is smaller than the difference with the right-side adjacent pixel.

If the difference with the left-side adjacent pixel is determined to be smaller than the difference with the right-side adjacent pixel in step S126, the operation moves on to step S127. In step S127, the boundary information generating unit 201 sets the left-side boundary information about the pixel having the boundary information set therefor in the procedure of step S124, to 1. The operation then moves on to step S130.

If the difference with the left-side adjacent pixel is determined not to be smaller than the difference with the right-side adjacent pixel in step S126, on the other hand, the boundary information generating unit 201 sets the left-side boundary information about the pixel having the boundary information set therefor in the procedure of step S124, to 0. The operation then moves on to step S130.

As described above, the encoding device 200 transmits the left-side boundary information as well as the boundary information, so that the later described decoding device can perform warping operations on the parallax images of the auxiliary images, based on the boundary information and the left-side boundary information. As a result, the decoding device can perform more accurate warping operations on the parallax images of the auxiliary images as described later.

[Example Structure of the Decoding Device]

Figure 17:
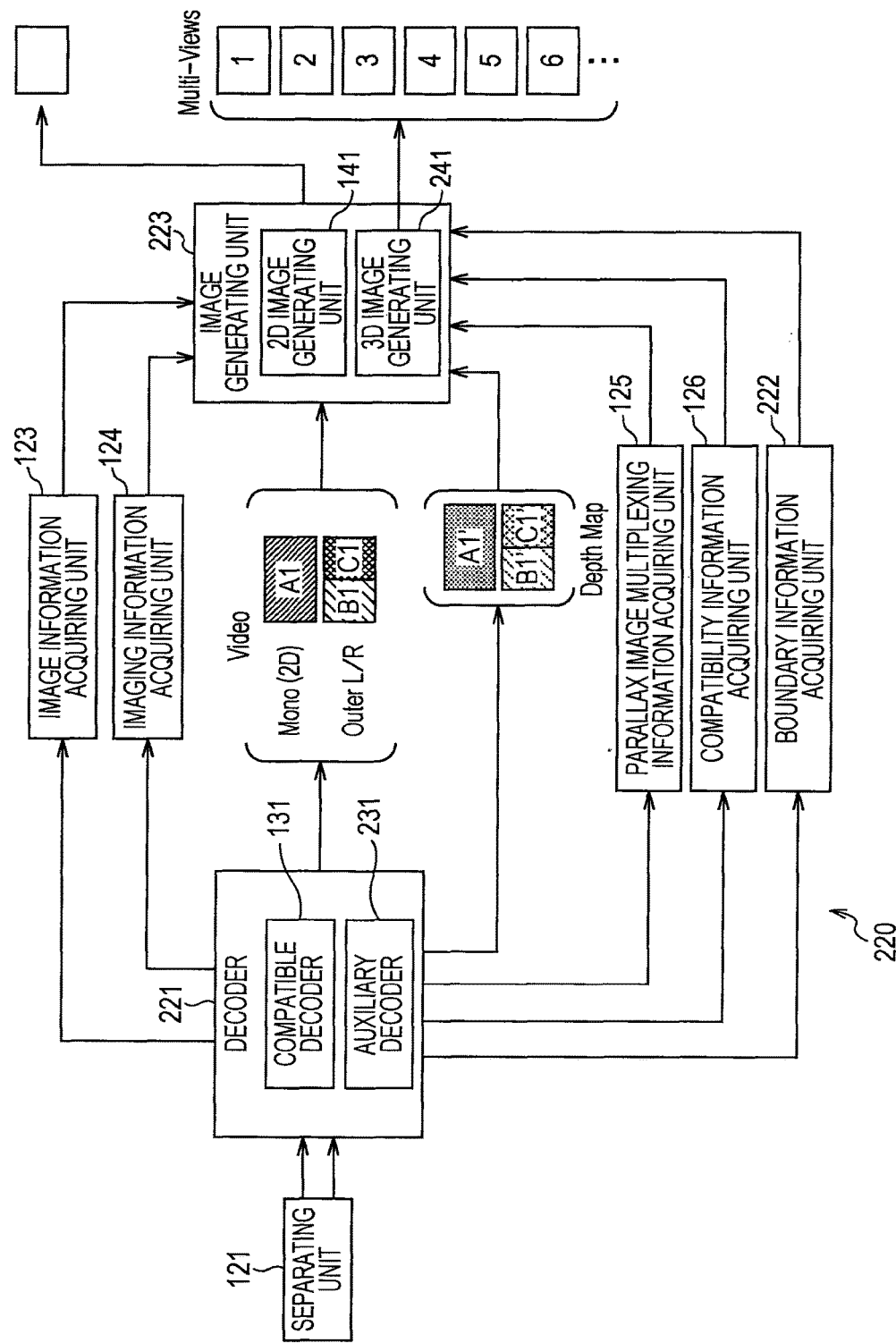
FIG. 17 is a diagram showing an example structure of a decoding device compatible with the encoding device shown in FIG. 15.

FIG. 17 is a diagram showing an example structure of the decoding device that decodes the multiplexed stream transmitted from the encoding device 200 shown in FIG. 15, the decoding device being an image processing device to which the present technique is applied.

In the structure illustrated in FIG. 17, the same components as those in FIG. 6 are denoted by the same reference numerals as those in FIG. 6. The explanations that have already been made will not be repeated.

The structure of the decoding device 220 shown in FIG. 17 differs from the structure shown in FIG. 6, mainly in that the decoder 122, the boundary information acquiring unit 127, and the image generating unit 128 are replaced with a decoder 221, a boundary information acquiring unit 222, and an image generating unit 223. The decoding device 220 decodes the multiplexed stream transmitted from the encoding device 200, generates multi-view images by performing parallax image warping operations based on boundary information and left-side boundary information, and causes a display device (not shown) to display the generated images.

Specifically, the decoder 221 of the decoding device 220 is formed with a compatible decoder 131 and an auxiliary decoder 231. Like the auxiliary decoder 132 shown in FIG. 6, the auxiliary decoder 231 of the decoder 221 supplies the compatibility information contained in the auxiliary stream supplied from a separating unit 121, to the compatible decoder 131. Like the auxiliary decoder 132, the auxiliary decoder 231 identifies the auxiliary stream from the compatible and auxiliary streams supplied from the separating unit 121, based on the compatibility information. The auxiliary decoder 231 decodes, by a technique compatible with the auxiliary encoder 211 shown in FIG. 15, the multiplexed image of the auxiliary images, the parallax image of the compatible image, and the multiplexed image of the parallax images of the auxiliary images, which have been encoded and are contained in the auxiliary stream supplied from the separating unit 121.

The auxiliary decoder 231 supplies the multiplexed image of the auxiliary images, the parallax image of the compatible image, and the multiplexed image of the parallax images of the auxiliary images, which are obtained as a result of the decoding, to the image generating unit 223. Also, like the auxiliary decoder 132, the auxiliary decoder 231 supplies the image information contained in the auxiliary stream to an image information acquiring unit 123, and supplies the imaging information to an imaging information acquiring unit 124. Further, like the auxiliary decoder 132, the auxiliary decoder 231 supplies the parallax image multiplexing information contained in the auxiliary stream to a parallax image multiplexing information acquiring unit 125, and supplies the compatibility information to a compatibility information acquiring unit 126. The auxiliary decoder 231 also supplies the boundary information and the left-side boundary information contained in the auxiliary stream to the boundary information acquiring unit 222.

The boundary information acquiring unit 222 acquires the boundary information and the left-side boundary information supplied from the auxiliary decoder 231, and supplies the boundary information and the left-side boundary information to the image generating unit 223.

The image generating unit 223 is formed with a 2D image generating unit 141 and a 3D image generating unit 241. Using the viewpoint image A1, the multiplexed image of the auxiliary images, the parallax image A1' of the compatible image, and the multiplexed image of the parallax images of the auxiliary images, which are supplied from the decoder 221, the 3D image generating unit 241 of the image generating unit 223 generates images that are of three or more viewpoints compatible with the display device (not shown) and have the same resolution as the compatible image, based on the image information, the imaging information, the parallax image multiplexing information, the compatibility information, the boundary information, the left-side boundary information, and the like. Like the 3D image generating unit 142 shown in FIG. 6, the 3D image generating unit 241 then converts the resolution of the generated multi-value images to the resolution calculated by dividing the resolution of the compatible image and the auxiliary images by the number of viewpoints, and combines the multi-view images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the 3D Image Generating Unit]

Figure 18:
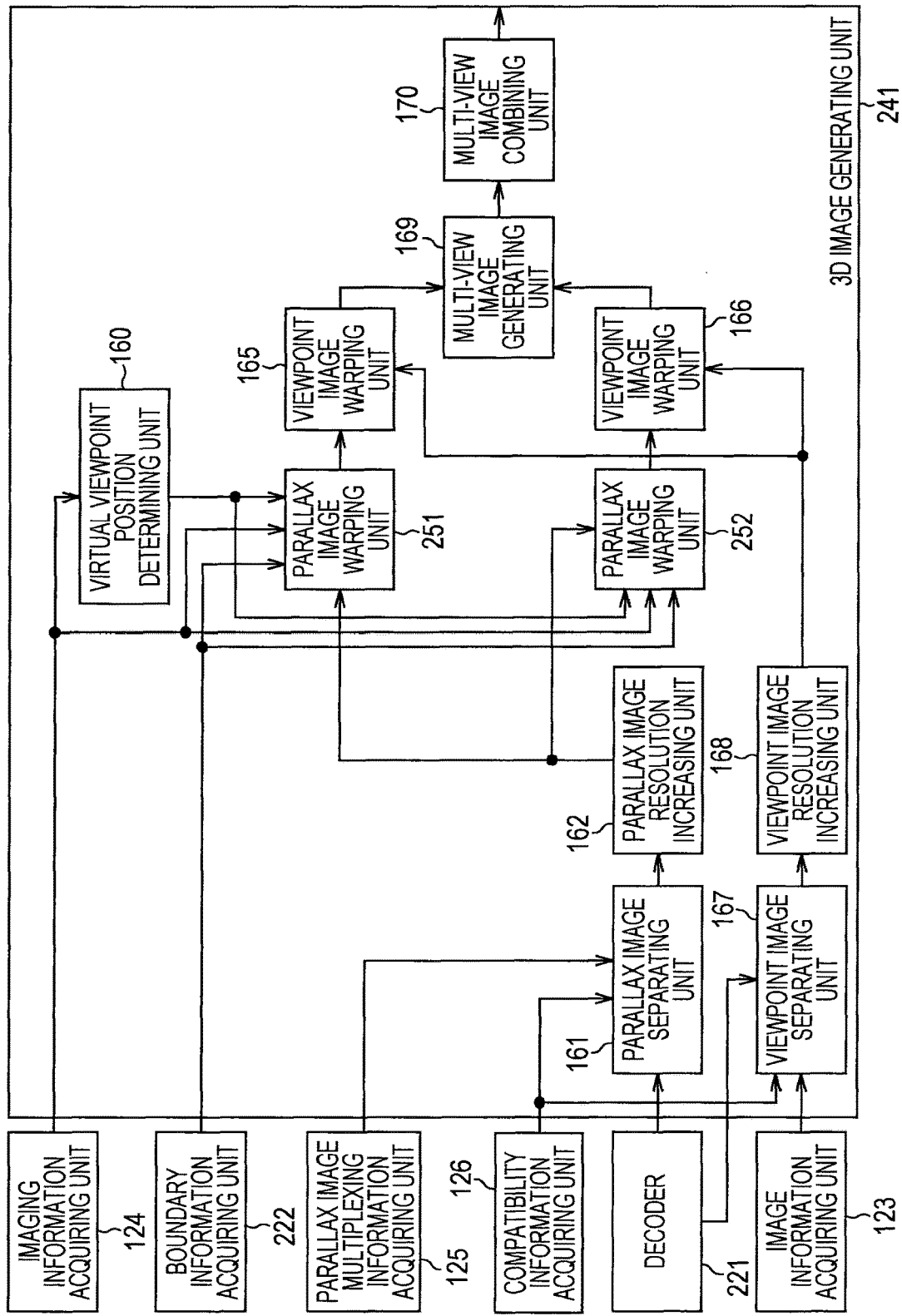
FIG. 18 is a block diagram showing a specific example structure of the 3D image generating unit shown in FIG. 17.

FIG. 18 is a block diagram showing a specific example structure of the 3D image generating unit 241 shown in FIG. 17.

In the structure illustrated in FIG. 18, the same components as those in FIG. 7 are denoted by the same reference numerals as those in FIG. 7. The explanations that have already been made will not be repeated.

The structure of the 3D image generating unit 241 shown in FIG. 18 differs from the structure shown in FIG. 7, in that the parallax image warping unit 163 and the parallax image warping unit 164 are replaced with a parallax image warping unit 251 and a parallax image warping unit 252.

The parallax image warping unit 251 of the 3D image generating unit 241 functions as a parallax image warping unit. Specifically, like the parallax image warping unit 163 shown in FIG. 7, based on parallax image identifying information supplied from a virtual viewpoint position determining unit 160, the parallax image warping unit 251 selects, for each virtual viewpoint, one image from the parallax images of the viewpoint image B1 and the viewpoint image C1 and the parallax image A1', which are supplied from a parallax image resolution increasing unit 162. Based on the imaging information from the imaging information acquiring unit 124, the boundary information and the left-side boundary information from the boundary information acquiring unit 127, and the positions of the respective virtual viewpoints from the virtual viewpoint position determining unit 160, the parallax image warping unit 163 performs a warping operation on the selected parallax image for each virtual viewpoint. The parallax image warping unit 163 supplies the parallax image of each virtual viewpoint generated through the warping operation to the viewpoint image warping unit 165.

The parallax image warping unit 252 performs the same operations as those of the parallax image warping unit 251, and supplies the resultant parallax images of the respective virtual viewpoints to the viewpoint image warping unit 166.

[Description of Parallax Image Warping Operations Based on Boundary Information and Left-Side Boundary Information]

Figure 19:
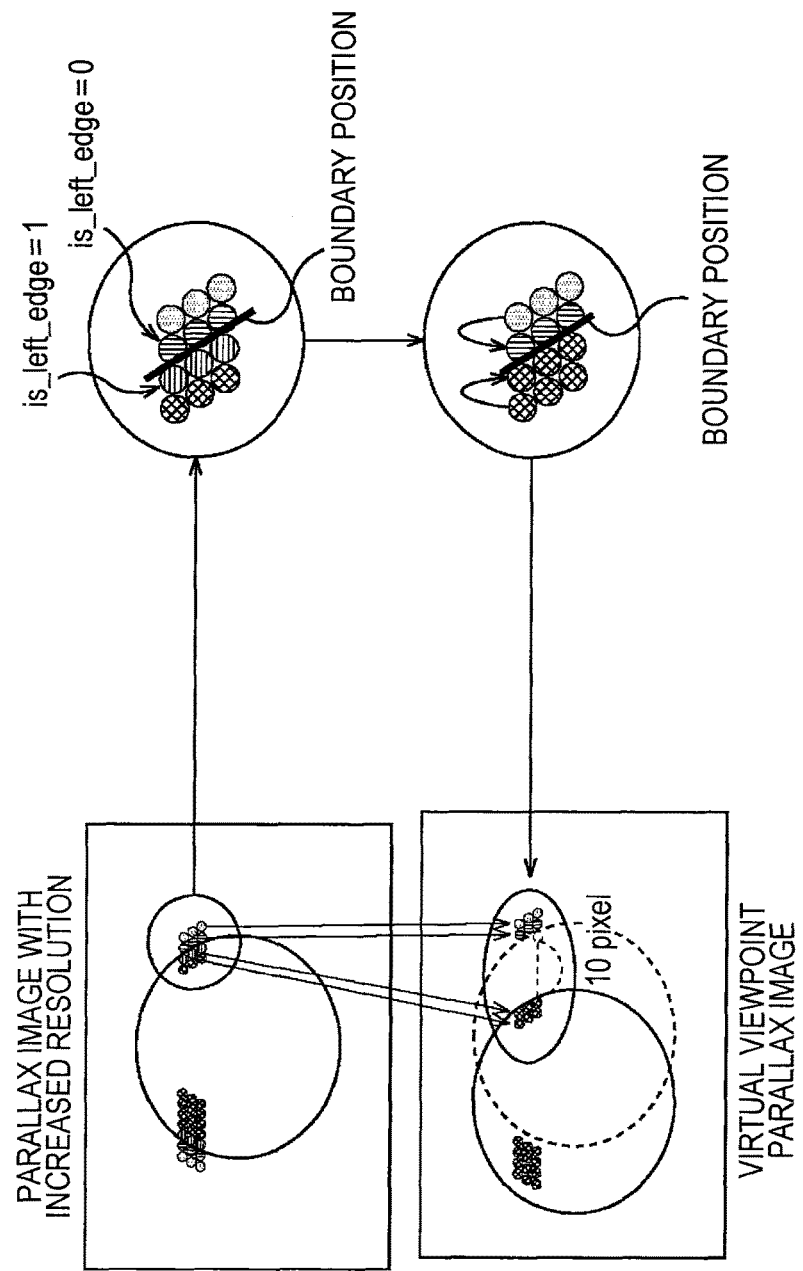
FIG. 19 is a diagram for explaining parallax image warping operations based on boundary information and left-side boundary information.

FIG. 19 is a diagram for explaining parallax image warping operations to be performed by the parallax image warping unit 251 (252) shown in FIG. 18, based on the boundary information and the left-side boundary information. In FIG. 19, the small circles represent pixels, and the patterns in the circles represent parallax values.

As shown in FIG. 19, in a case where the parallax image with a reduced resolution shown in A of FIG. 11 is supplied, the parallax image resolution increasing unit 162 increases the resolution of the parallax image, and generates the parallax image with an increased resolution shown in the upper portion of FIG. 19.

The parallax image warping unit 251 (252) changes the parallax value of each pixel having 1 as the boundary information and 1 as the left-side boundary information in the parallax image with the increased resolution in the upper portion of FIG. 19, to the parallax value of the adjacent pixel located on the left side of the pixel. The parallax image warping unit 251 (252) also changes the parallax value of each pixel having 1 as the boundary information and 0 as the left-side boundary information, to the parallax value of the adjacent pixel located on the right side of the pixel. The parallax image warping unit 251 (252) then performs a warping operation on the parallax image having the parallax values changed in the above manner. Accordingly, in the virtual viewpoint parallax image obtained as a result of the warping operation, the circular region having a predetermined parallax value other than 0 has moved leftward by the distance equivalent to 10 pixels, as shown in the lower portion of FIG. 19.

As described above, based on the boundary information and the left-side boundary information, the parallax image warping unit 251 (252) changes the parallax value of each left-side pixel adjacent to the boundary position in a parallax image of an auxiliary image with an increased resolution, to the parallax image of the adjacent pixel located on the left side of the pixel, and changes the parallax value of each right-side pixel adjacent to the boundary position to the parallax value of the adjacent pixel located on the right side of the pixel. The resultant parallax image is subjected to a warping operation. Accordingly, the parallax values of the pixels adjacent to the boundary position in the parallax image being subjected to a warping operation become closer to the parallax values in the parallax image having its resolution not yet reduced. Thus, more accurate warping operations can be performed on parallax images of the auxiliary images.

[Description of an Operation of the Decoding Device]

A decoding operation of the decoding device 220 shown in FIG. 17 is the same as the decoding operation shown in FIG. 13, except that the left-side boundary information as well as the boundary information is input to the image generating unit 223 in step S70 of FIG. 13, and a different multi-view image generating operation is performed. Therefore, only the multi-view image generating operation is described below.

Figure 20:
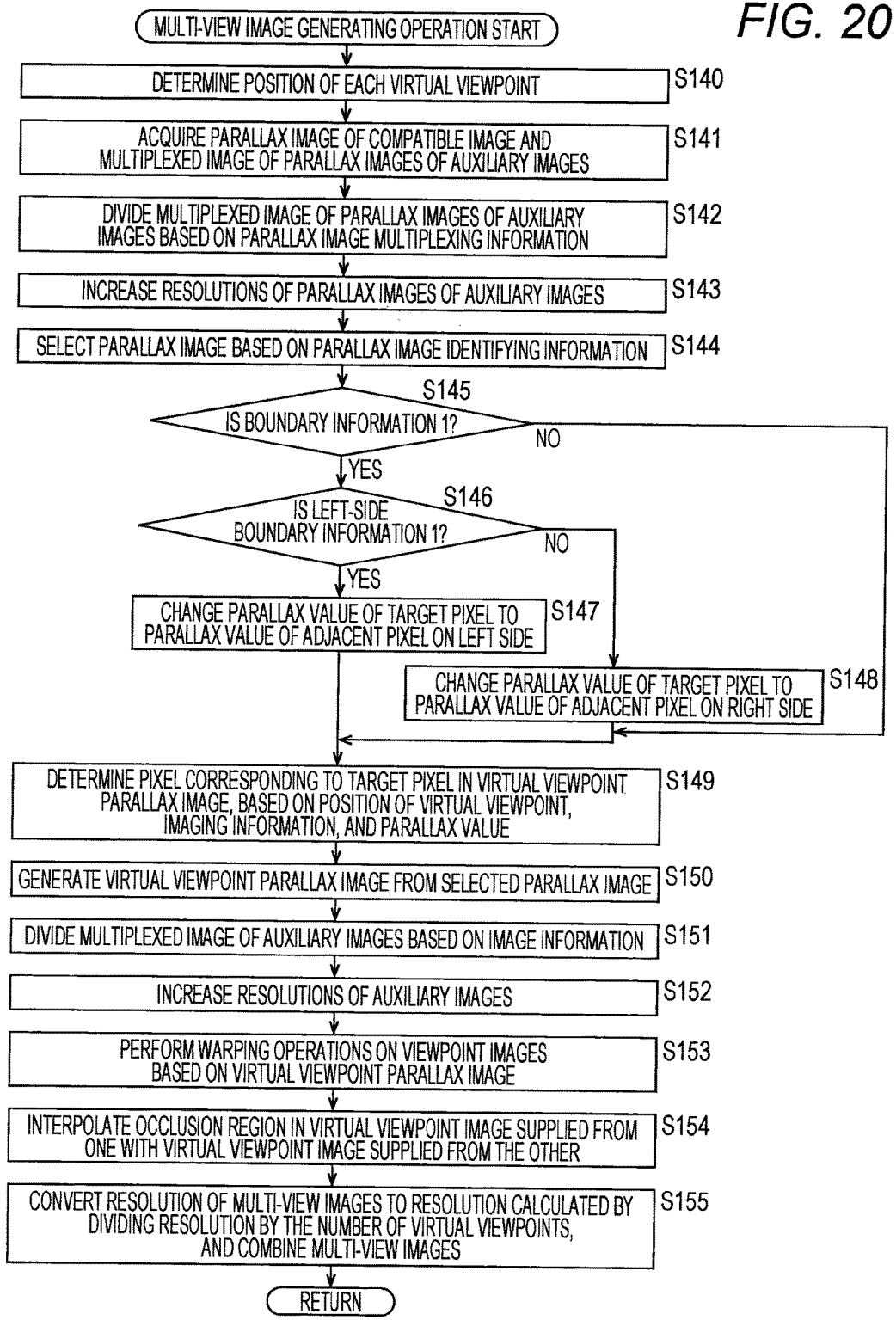
FIG. 20 is a flowchart for explaining in detail a multi-view image generating operation by the decoding device shown in FIG. 17.

FIG. 20 is a flowchart for explaining in detail the multi-view image generating operation by the decoding device 220 shown in FIG. 17.

The procedures of steps S140 through S144 of FIG. 20 are the same as the procedures in steps S90 through S94 of FIG. 14, and therefore, explanation of them is not repeated herein.

In steps S145 through S150, the parallax image warping units 251 and 252 each perform a warping operation on a selected parallax image.

Specifically, a pixel corresponding to the boundary information in the selected parallax image is set as the target pixel, and the procedures of steps S145 through S149 are carried out.

That is, in step S145, the parallax image warping unit 251 (252) determines whether the boundary information about the target pixel is 1. If the boundary information about the target pixel is determined to be 1 in step S145, the operation moves on to step S146.

In step S146, the parallax image warping unit 251 (252) determines whether the left-side boundary information about the target pixel is 1. If the left-side boundary information about the target pixel is determined to be 1 in step S146, the operation moves on to step S147.

In step S147, the parallax image warping unit 251 (252) changes the parallax value of the target pixel to the parallax value of the adjacent pixel located on the left side of the target pixel, and the operation moves on to step S149.

If the left-side boundary information about the target pixel is determined not to be 1 in step S146, or if the left-side boundary information about the target pixel is 0, the operation moves on to step S148.

In step S148, the parallax image warping unit 251 (252) changes the parallax value of the target pixel to the parallax value of the adjacent pixel located on the right side of the target pixel, and the operation moves on to step S149.

If the boundary information about the target pixel is determined not to be 1 in step S145, or if the boundary information about the target pixel is determined to be 0, the operation moves on to step S149.

In step S149, for each virtual viewpoint, the parallax image warping unit 251 (252) determines the pixel corresponding to the target pixel in the virtual viewpoint parallax image according to the above described equations (1), based on the position of the virtual viewpoint, the imaging information, and the parallax value of the target pixel. If the boundary information about the target pixel is 1, the parallax value of the target pixel used here is the parallax value changed in step S147 or S148. If the boundary information about the target pixel is 0, on the other hand, the parallax value of the target value used here is the parallax value of the target pixel in the parallax image selected in step S144.

The operation then moves on to step S150, and the procedures of steps S150 through S155, which are the same as the procedures of steps S98 through S103 of FIG. 14, are carried out.

As described above, the decoding device 220 performs warping operations on the parallax images of the auxiliary images with increased resolutions, based on the boundary information and the left-side boundary information transmitted from the encoding device 200. Accordingly, the decoding device 220 can change each parallax image being subjected to a warping operation to a parallax image similar to the parallax image having its resolution not yet reduced, by changing the parallax values of the left-side pixels adjacent to the boundary position in the parallax image of each auxiliary image having its resolution increased, to the parallax values of the adjacent pixels located on the left side of the pixels adjacent to the boundary position, changing the parallax values of the right-side pixels adjacent to the boundary position to the parallax values of the adjacent pixels located on the right side of the pixels adjacent to the boundary position, and subjecting each changed parallax image to a warping operation. As a result, more accurate warping operations can be performed on the parallax images of the auxiliary images.

<Third Embodiment>

[Example Structure of a Third Embodiment of an Encoding Device]

Figure 21:
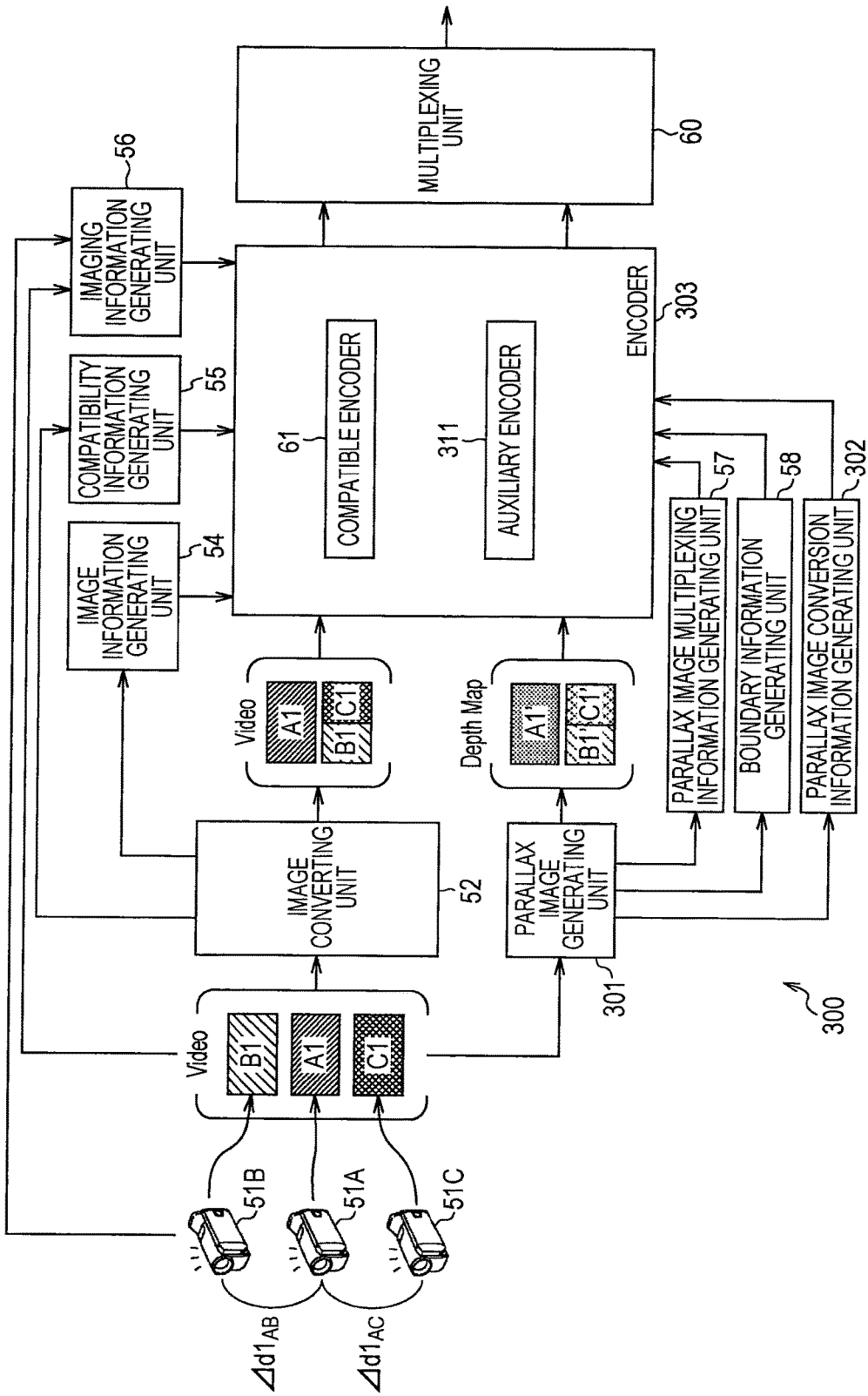
FIG. 21 is a block diagram showing an example structure of a third embodiment of an encoding device to which the present technique is applied.

FIG. 21 is a block diagram showing an example structure of a third embodiment of an encoding device as an image processing device to which the present technique is applied.

In the structure illustrated in FIG. 21, the same components as those in FIG. 1 are denoted by the same reference numerals as those in FIG. 1. The explanations that have already been made will not be repeated.

The structure of the encoding device 300 shown in FIG. 21 differs from the structure shown in FIG. 1, in that the parallax image generating unit 53 and the encoder 59 are replaced with a parallax image generating unit 301 and an encoder 303, and a parallax image conversion information generating unit 302 is newly added. The encoding device 300 transmits parallax image conversion information (Subsample_type) (resolution conversion information) indicating a method for reducing resolutions of parallax images.

Specifically, like the parallax image generating unit 53 shown in FIG. 1, the parallax image generating unit 301 of the encoding device 300 detects the parallax values of the respective pixels in viewpoint images A1 through C1 using the viewpoint images A1 through C1 supplied from imaging units 51A through 51C. Like the parallax image generating unit 53, the parallax image generating unit 53 generates a parallax image A1' of the viewpoint image A1 as the compatible image, and supplies the parallax image A1' to the encoder 303.

Like the parallax image generating unit 53, the parallax image generating unit 301 also generates a parallax image B1' of the viewpoint image B1 as an auxiliary image, and a parallax image C1' of the viewpoint image C1 as an auxiliary image, and supplies those parallax images to a boundary information generating unit 58. The parallax image generating unit 301 further functions as a resolution reducing unit, and reduces the resolutions of the parallax image B1' and the parallax image C1' by a predetermined resolution reducing method. The parallax image generating unit 301 then multiplexes the parallax images with the reduced resolutions by a predetermined multiplexing technique, and supplies the resultant multiplexed image to the encoder 303. Like the parallax image generating unit 53, the parallax image generating unit 301 supplies information indicating the multiplexing technique used for multiplexing the parallax images of the auxiliary images, to a parallax image multiplexing information generating unit 57.

The parallax image generating unit 301 also notifies the parallax image conversion information generating unit 302 of the method used for reducing the resolutions of the parallax images. The resolution reducing method may be a method among thinning methods, the Lanczos method, bicubic methods, bilinear methods, nearest neighbor methods, and the like, which involve filters or no filters, involve different kinds of filters, or involve filters with different intensities in resolution reductions.

Based on the method for reducing the resolutions of the parallax images notified from the parallax image generating unit 301, the parallax image conversion information generating unit 302 generates the parallax image conversion information, and supplies the parallax image conversion information to the encoder 303.

The encoder 303 is formed with a compatible encoder 61 and an auxiliary encoder 311. Like the auxiliary encoder 62 shown in FIG. 1, the auxiliary encoder 311 encodes, by a predetermined technique, a multiplexed image of the auxiliary images from an image converting unit 52, and the parallax image A1' of the compatible image and the multiplexed image of the parallax images of the auxiliary images from the parallax image generating unit 53.

The auxiliary encoder 311 also adds image information from an image information generating unit 54, compatibility information from a compatibility information generating unit 55, imaging information from an imaging information generating unit 56, parallax image multiplexing information from a parallax image multiplexing information generating unit 57, boundary information from a boundary information generating unit 58, the parallax image conversion information from the parallax image conversion information generating unit 302, and the like, to the encoded images obtained as a result of the encoding. An encoded stream is thus generated. Like the auxiliary encoder 62, the auxiliary encoder 311 supplies the encoded stream as an auxiliary stream to the multiplexing unit 60.

[Description of a Parallax Image Resolution Reduction]

Figure 22:
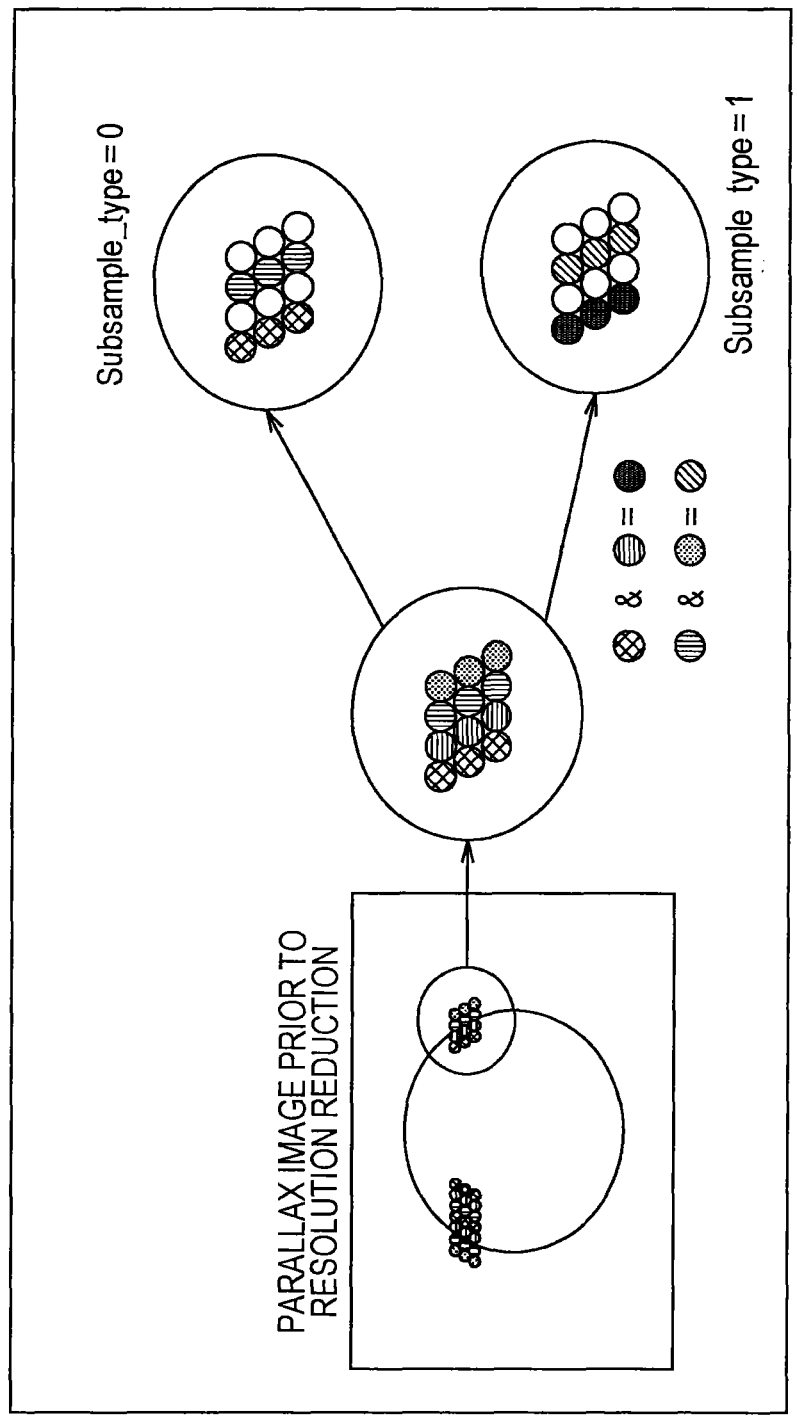
FIG. 22 is a diagram for explaining a resolution reduction in a parallax image.

FIG. 22 is a diagram for explaining a parallax image resolution reduction to be performed by the parallax image generating unit 301 shown in FIG. 21.

In FIG. 22, the small circles represent pixels, and the patterns in the circles represent parallax values. For ease of explanation, in FIG. 22, the pixels having their reductions not yet reduced are represented by circles, and the pixels to be removed by the resolution reduction are represented by the circles that are not shaded.

In a case where the parallax image generating unit 301 performs a resolution reduction in a parallax image by a thinning method, one of the parallax values of two pixels adjacent to each other in the horizontal direction in the parallax image having its resolution not yet reduced is left, and the other one of the parallax values is removed, as shown in the upper right portion of FIG. 22. At this point, 0, which indicates the thinning method, for example, is generated as the parallax image conversion information, as shown in FIG. 22.

In a case where the parallax image generating unit 301 performs a resolution reduction in a parallax image by a bilinear method, one of the parallax values of two pixels adjacent to each other in the horizontal direction in the parallax image having its resolution not yet reduced is set as the average value between the parallax values of the two pixels, and the other one of the parallax values is removed, as shown in the lower right portion of FIG. 22. At this point, 1, which indicates the bilinear method, for example, is generated as the parallax image conversion information, as shown in FIG. 22.

[Description of an Operation of the Encoding Device]

Figure 23:
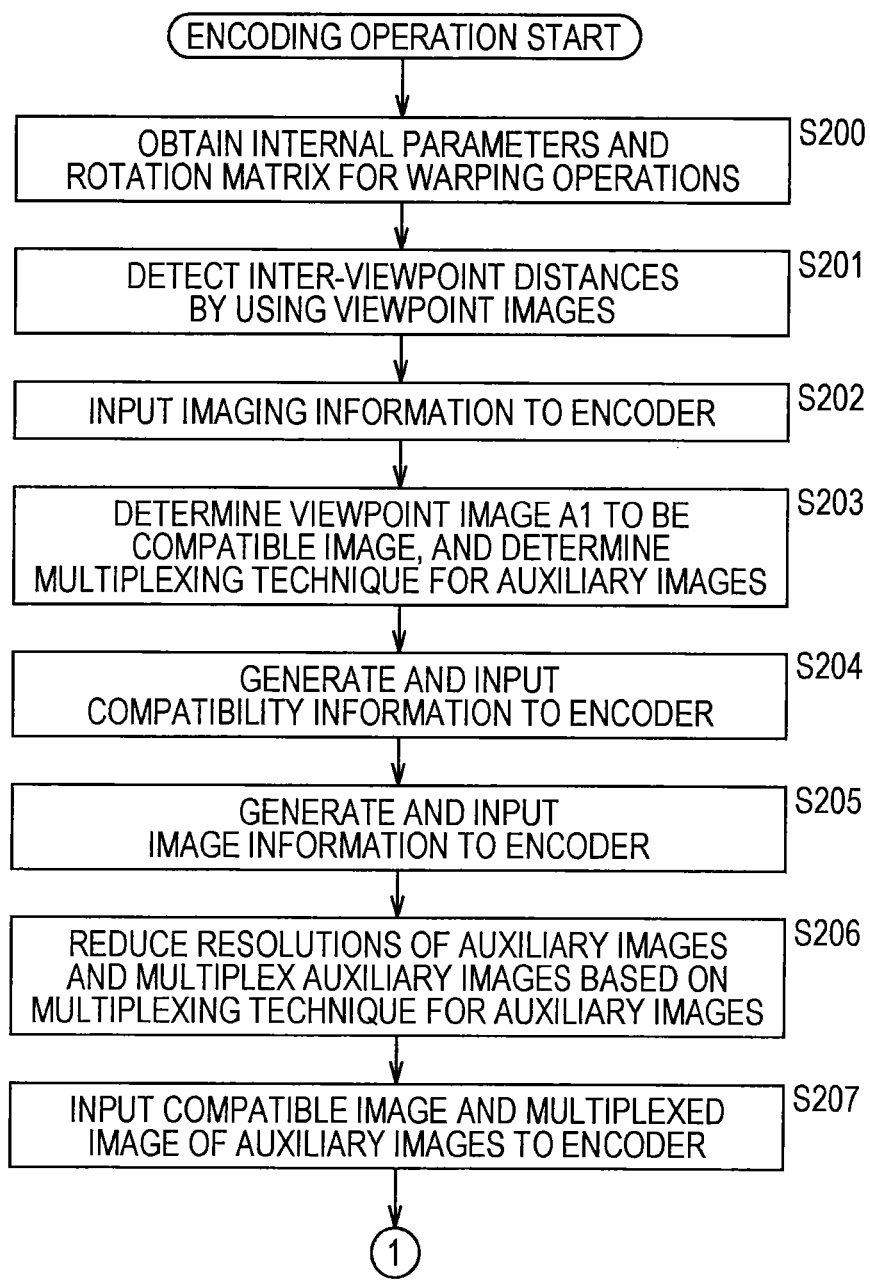
FIG. 23 is a flowchart for explaining an encoding operation by the encoding device shown in FIG. 21.
Figure 24:
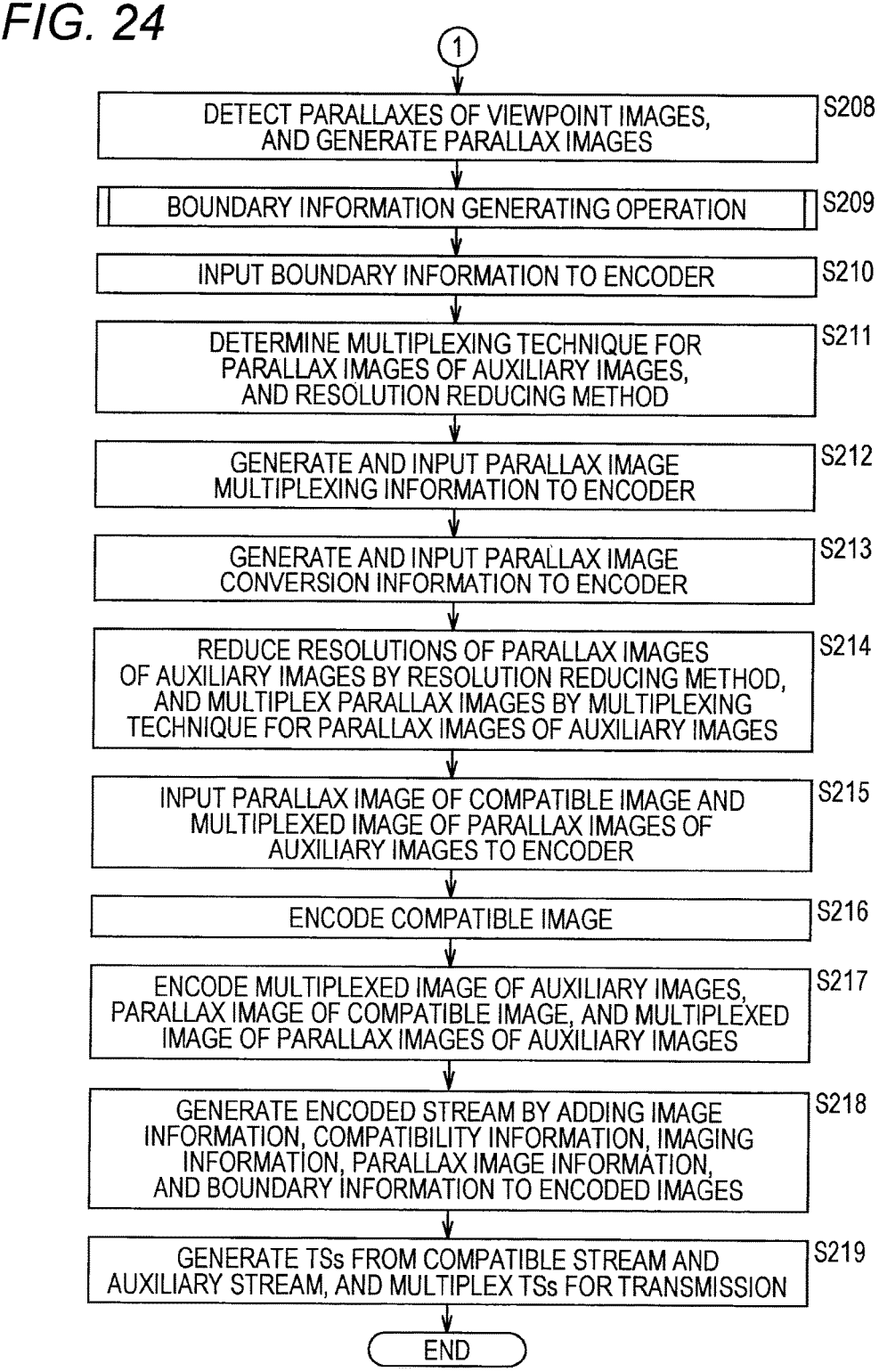
FIG. 24 is another flowchart for explaining the encoding operation by the encoding device shown in FIG. 21.

FIGS. 23 and 24 are flowcharts for explaining an encoding operation by the encoding device 300 shown in FIG. 21. This encoding operation is started when the viewpoint images A1 through C1 are output from the imaging units 51A through 51C, for example.

The procedures of step S200 of FIG. 23 through step S210 of FIG. 24 are the same as the procedures of step S10 of FIG. 3 through step S20 of FIG. 4, and therefore, explanation of them is not repeated herein.

After the procedure of step S210, the parallax image generating unit 301, in step S211, determines the multiplexing technique for multiplexing the parallax images of the auxiliary images, and the method for reducing the resolutions of the parallax images. The parallax image generating unit 301 supplies information indicating the determined multiplexing technique to the parallax image multiplexing information generating unit 57, and supplies the determined resolution reducing method to the parallax image conversion information generating unit 302.

In step S212, based on the information supplied from the parallax image generating unit 53, the parallax image multiplexing information generating unit 57 generates the parallax image multiplexing information, and inputs the parallax image multiplexing information to the encoder 303, as in step S22 of FIG. 4.

In step S213, based on the resolution reducing method supplied from the parallax image generating unit 53, the parallax image conversion information generating unit 302 generates the parallax image conversion information, and supplies the parallax image conversion information to the encoder 303.

In step S214, the parallax image generating unit 301 reduces the resolutions of the parallax image B1' and the parallax image C1' of the auxiliary images by the resolution reducing method determined in step S211, and multiplexes the resultant parallax images of the auxiliary images by the multiplexing technique. As a result, the parallax image generating unit 301 obtains a multiplexed image of the parallax images of the auxiliary images.

The procedures of steps S215 through S219 are the same as the procedures of steps S24 through S28 of FIG. 4, and therefore, explanation of them is not repeated herein.

As described above, the encoding device 300 reduces the resolutions of parallax images of auxiliary images by a predetermined resolution reducing method, and transmits the parallax images with the reduced resolutions, the parallax image conversion information, and the boundary information. Based on the parallax image conversion information, the later described decoding device can obtain parallax images more similar to the parallax images having their resolutions not yet reduced, by increasing the resolutions of the parallax images with the reduced resolutions by a method corresponding to the method indicated by the parallax image conversion information. Based on the boundary information, the decoding device can then perform warping operations on the parallax images of the auxiliary images more similar to the parallax images having their resolutions not yet reduced. As a result, the decoding device can perform more accurate warping operations on the parallax images of the auxiliary images.

[Example Structure of the Decoding Device]

Figure 25:
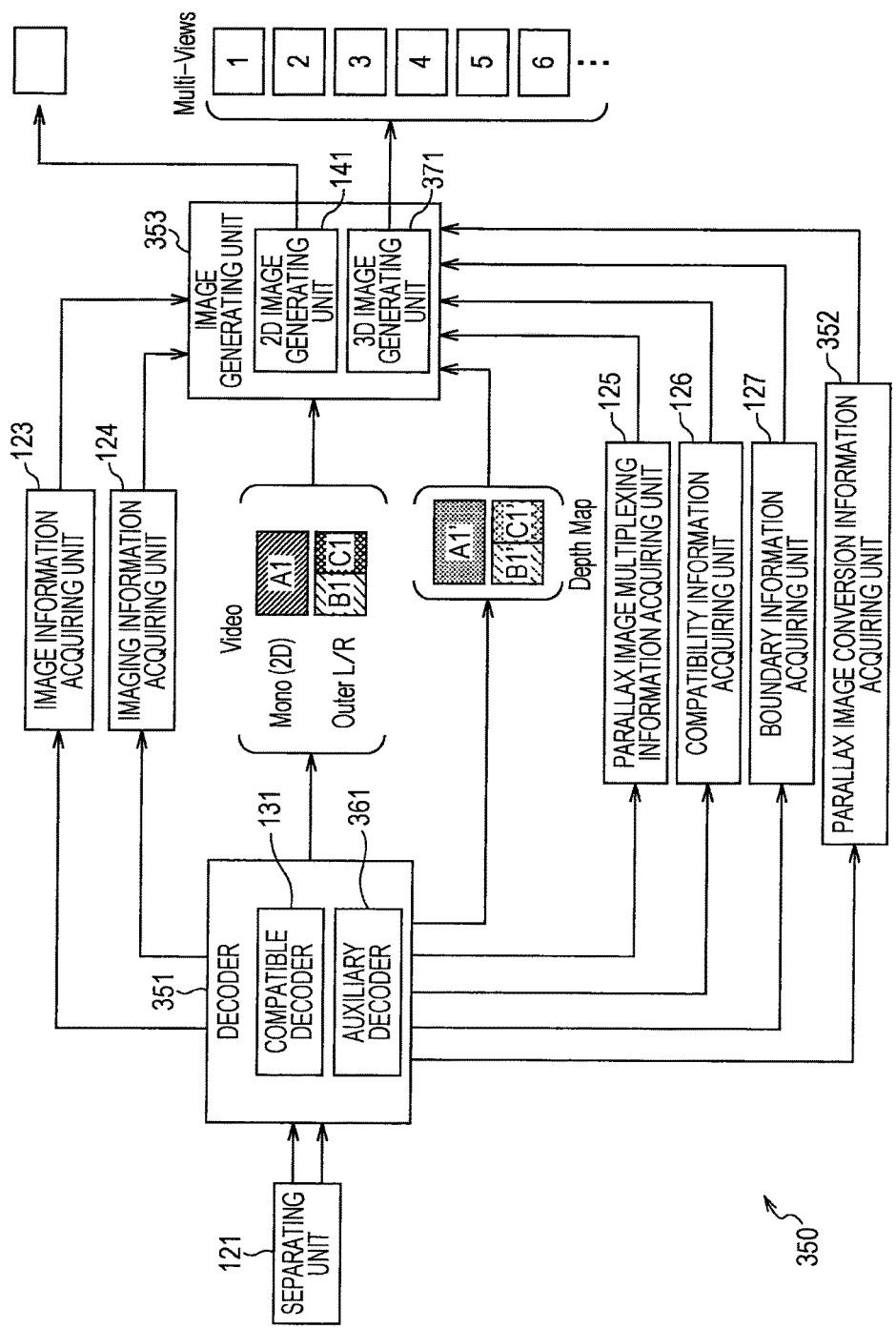
FIG. 25 is a diagram showing an example structure of a decoding device compatible with the encoding device shown in FIG. 21.

FIG. 25 is a diagram showing an example structure of the decoding device that decodes the multiplexed stream transmitted from the encoding device 300 shown in FIG. 21, the decoding device being an image processing device to which the present technique is applied.

In the structure illustrated in FIG. 25, the same components as those in FIG. 6 are denoted by the same reference numerals as those in FIG. 6. The explanations that have already been made will not be repeated.

The structure of the decoding device 350 shown in FIG. 25 differs from the structure shown in FIG. 6, in that the decoder 122 and the image generating unit 128 are replaced with a decoder 351 and an image generating unit 353, and a parallax image conversion information acquiring unit 352 is newly provided. The decoding device 350 decodes the multiplexed stream transmitted from the encoding device 300. The decoding device 350 increases the resolutions of parallax images, based on the parallax image conversion information, and performs warping operations on the parallax images with the increased resolutions, based on the boundary information.

Specifically, the decoder 351 of the decoding device 350 is formed with a compatible decoder 131 and an auxiliary decoder 361. Like the auxiliary decoder 132 shown in FIG. 6, the auxiliary decoder 361 supplies the compatibility information contained in the auxiliary stream supplied from a separating unit 121, to the compatible decoder 131. Like the auxiliary decoder 132, the auxiliary decoder 361 identifies the auxiliary stream from the compatible and auxiliary streams supplied from the separating unit 121, based on the compatibility information. The auxiliary decoder 361 decodes, by a technique compatible with the auxiliary encoder 311 shown in FIG. 21, the multiplexed image of the auxiliary images, the parallax image of the compatible image, and the multiplexed image of the parallax images of the auxiliary images, which have been encoded and are contained in the auxiliary stream supplied from the separating unit 121.

Like the auxiliary decoder 132, the auxiliary decoder 361 supplies the multiplexed image of the auxiliary images, the parallax image of the compatible image, and the multiplexed image of the parallax images of the auxiliary images, which are obtained as a result of the decoding, to the image generating unit 128. Also, like the auxiliary decoder 132, the auxiliary decoder 361 supplies the image information contained in the auxiliary stream to an image information acquiring unit 123, and supplies the imaging information to an imaging information acquiring unit 124. Further, like the auxiliary decoder 132, the auxiliary decoder 361 supplies the parallax image multiplexing information contained in the auxiliary stream to a parallax image multiplexing information acquiring unit 125, and supplies the compatibility information to a compatibility information acquiring unit 126. The auxiliary decoder 361 also supplies the boundary information contained in the auxiliary stream to a boundary information acquiring unit 127, and supplies the parallax image conversion information to the parallax image conversion information acquiring unit 352.

The parallax image conversion information acquiring unit 352 acquires the parallax image conversion information supplied from the auxiliary decoder 361, and supplies the parallax image conversion information to the image generating unit 353.

The image generating unit 353 is formed with a 2D image generating unit 141 and a 3D image generating unit 371. Using the viewpoint image A1, the multiplexed image of the auxiliary images, the parallax image A1' of the compatible image, and the multiplexed image of the parallax images of the auxiliary images, which are supplied from the decoder 351, the 3D image generating unit 371 generates images that are of three or more viewpoints compatible with a display device (not shown) and have the same resolution as the compatible image, based on the image information, the imaging information, the parallax image multiplexing information, the compatibility information, the boundary information, the parallax image conversion information, and the like. Like the 3D image generating unit 142 shown in FIG. 6, the 3D image generating unit 371 then converts the resolution of the generated multi-value images to the resolution calculated by dividing the resolution of the compatible image and the auxiliary images by the number of viewpoints, and combines the multi-view images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the Image Generating Unit]

Figure 26:
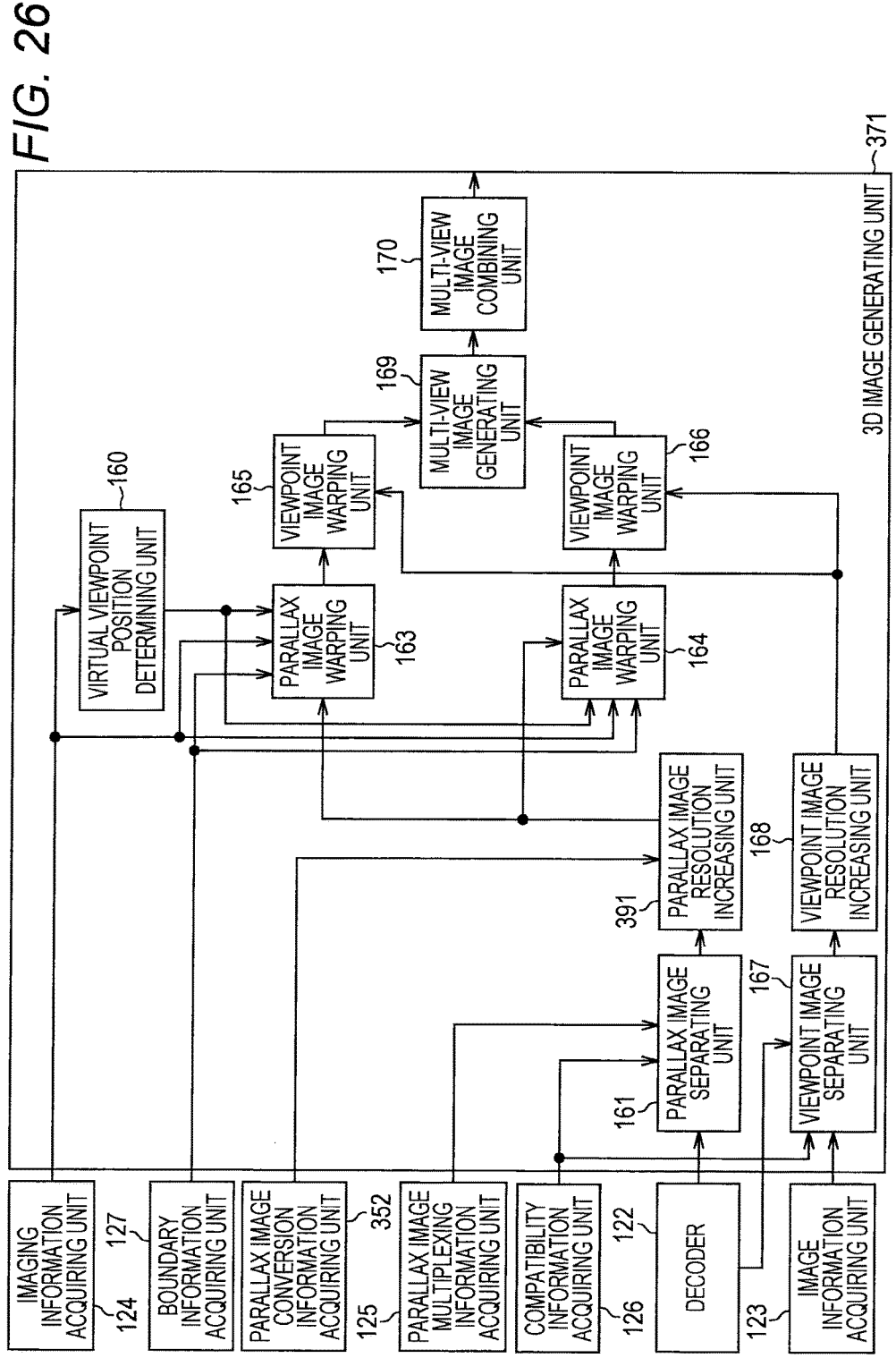
FIG. 26 is a block diagram showing a specific example structure of the 3D image generating unit shown in FIG. 25.

FIG. 26 is a block diagram showing a specific example structure of the 3D image generating unit 371 shown in FIG. 25.

In the structure illustrated in FIG. 26, the same components as those in FIG. 7 are denoted by the same reference numerals as those in FIG. 7. The explanations that have already been made will not be repeated.

The structure of the 3D image generating unit 371 shown in FIG. 26 differs from the structure shown in FIG. 7, in that the parallax image resolution increasing unit 162 is replaced with a parallax image resolution increasing unit 391.

The parallax image resolution increasing unit 391 of the 3D image generating unit 371 functions as a resolution increasing unit, and increases the resolutions of the respective parallax images of the viewpoint image B1 and the viewpoint image C1, which are supplied from a parallax image separating unit 161, based on the parallax image conversion information from the parallax image conversion information acquiring unit 352. Specifically, the parallax image resolution increasing unit 391 increases the resolutions of the respective parallax images of the viewpoint image B1 and the viewpoint image C1 by the method corresponding to the resolution reducing method indicated by the parallax image conversion information. As a result, the parallax image resolution increasing unit 391 obtains the parallax images of the viewpoint image B1 and the viewpoint image C1 with the same resolution as that of the compatible image. The parallax image resolution increasing unit 391 then supplies the obtained parallax images of the viewpoint image B1 and the viewpoint image C1, and the parallax image A1' supplied from the parallax image separating unit 161, to a parallax image warping unit 163 and a parallax image warping unit 164.

[Description of a Parallax Image Resolution Increase]

Figure 27:
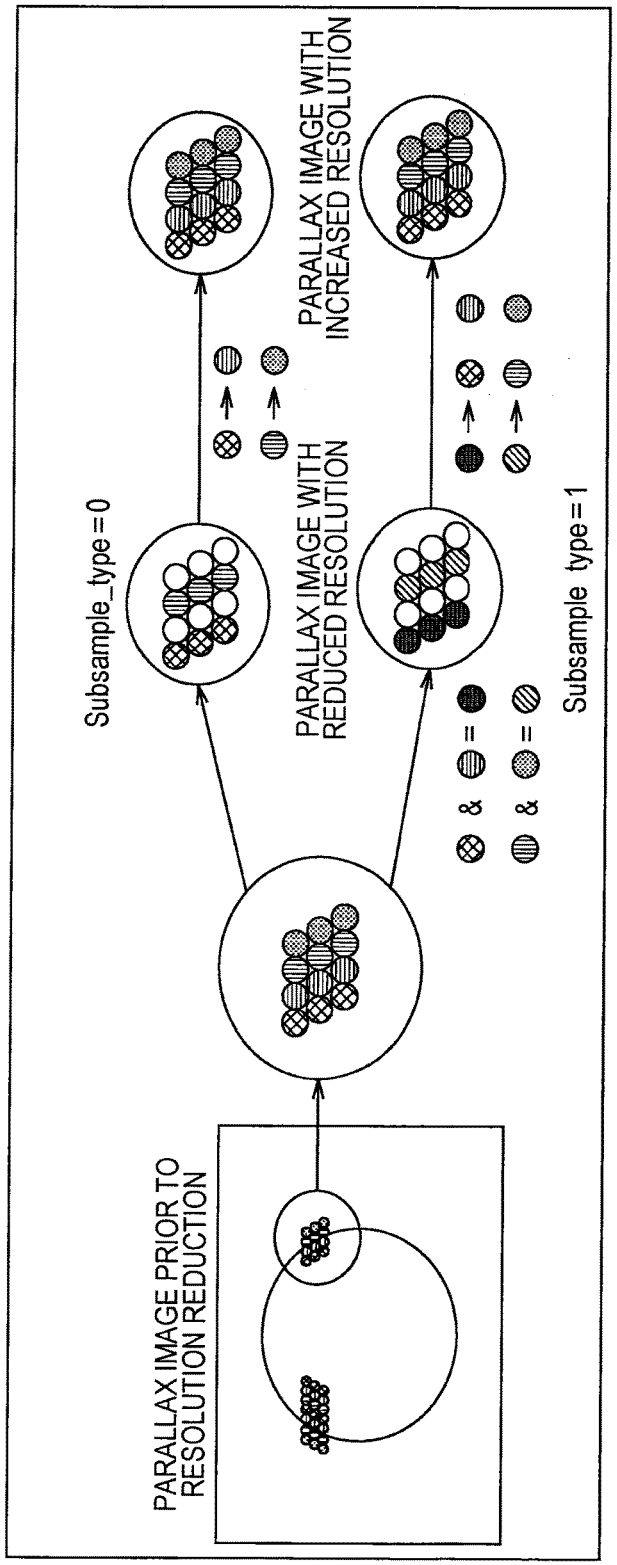
FIG. 27 is a diagram for explaining a resolution increase in a parallax image.

FIG. 27 is a diagram for explaining a parallax image resolution increase to be performed by the parallax image resolution increasing unit 391 shown in FIG. 26.

In FIG. 27, the small circles represent pixels, and the patterns in the circles represent parallax values. For ease of explanation, in FIG. 27, the pixels having their reductions not yet reduced are represented by circles, and the pixels to be removed by the resolution reduction are represented by the circles that are not shaded.

As shown in the upper portion of FIG. 27, in a case where the resolution of a parallax image is reduced by a thinning method, and 0 is generated as the parallax image conversion information, the parallax image resolution increasing unit 391 performs a resolution increase by performing an interpolation while maintaining the parallax values of the parallax image having its resolution reduced. That is, in a case where the resolution of a parallax image is reduced by a thinning method, the parallax values of the respective pixels after the resolution reduction are the same as the parallax values of the pixels corresponding to the respective pixels in the parallax image having its resolution not yet reduced. Therefore, the parallax values of the respective pixels are maintained. Specifically, the parallax image resolution increasing unit 391 sets the parallax values of the respective pixels in the parallax image having its resolution reduced as the parallax values of the pixels corresponding to the respective pixels, and interpolates the parallax values of the pixels other than those pixels by a weighting interpolation or the like.

In a case where the resolution of a parallax image is reduced by a bilinear method, and 1 is generated as the parallax image conversion information, on the other hand, the parallax image resolution increasing unit 391 performs a resolution increase by performing a linear interpolation as shown in the lower portion of FIG. 27. Specifically, the parallax image resolution increasing unit 391 linearly interpolates the parallax values of the respective pixels in the parallax image having its resolution increased, using the parallax values of the pixels corresponding to the respective pixels in the parallax image having its resolution reduced.

As described above, the parallax image resolution increasing unit 391 performs a resolution increase by the method compatible with the resolution reducing method used by the parallax image generating unit 301. Accordingly, the parallax image having its resolution increased is made similar to the parallax image having its resolution not yet reduced.

[Description of an Operation of the Decoding Device]

Figure 28:
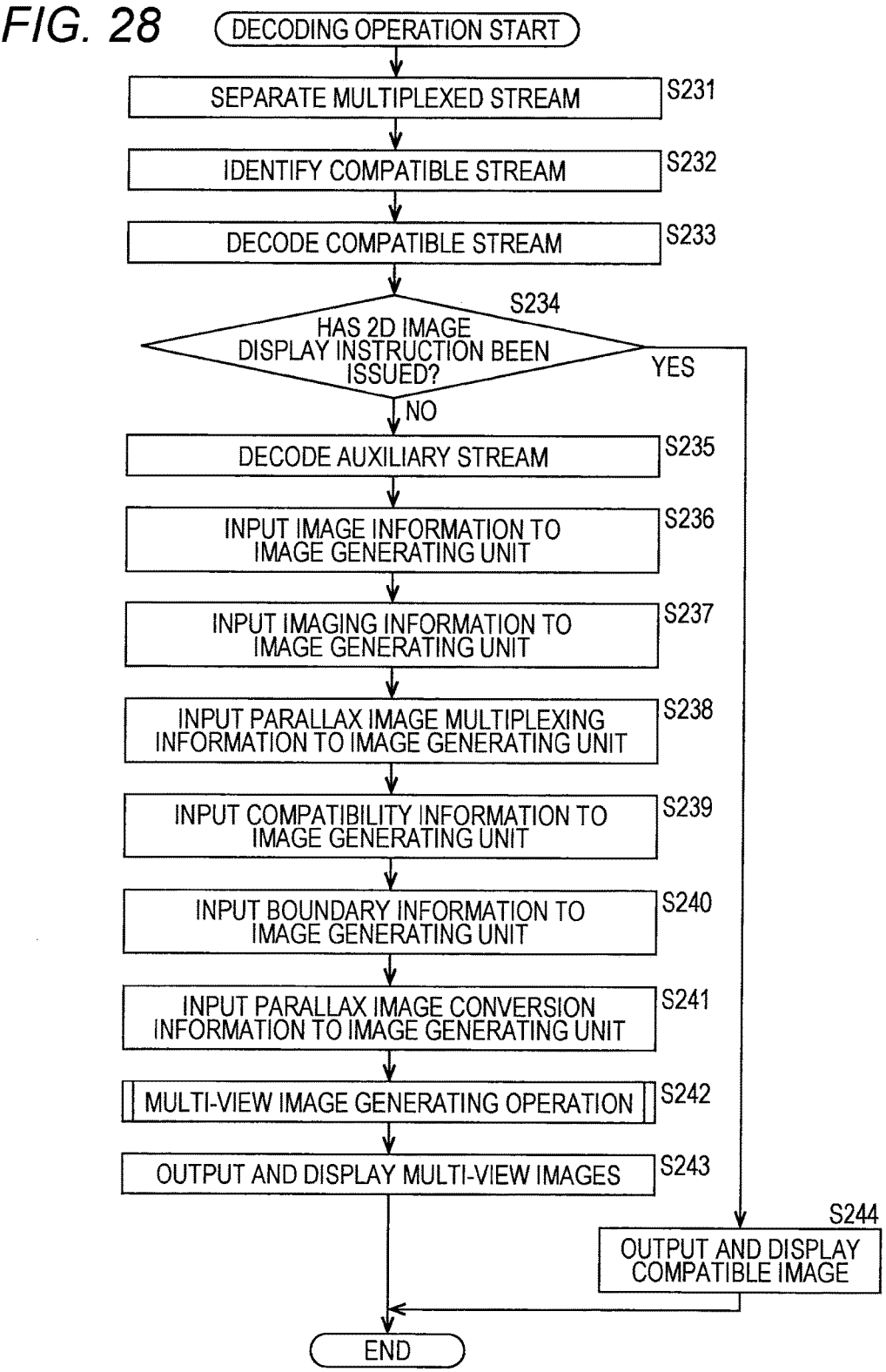
FIG. 28 is a flowchart for explaining a decoding operation by the decoding device shown in FIG. 25.

FIG. 28 is a flowchart for explaining a decoding operation by the decoding device 350 shown in FIG. 25. This decoding operation is started when the multiplexed stream transmitted from the encoding device 300 shown in FIG. 21 is input to the decoding device 350, for example.

The procedures of steps S231 through S240 of FIG. 28 are the same as the procedures of steps S61 through S70 of FIG. 13, and therefore, explanation of them is not repeated herein.

In step S241 of FIG. 28, the parallax image conversion information acquiring unit 352 inputs the parallax image conversion information to the image generating unit 353.

In step S242, the image generating unit 353 performs a multi-view image generating operation. This multi-view image generating operation will be described later in detail, with reference to FIG. 29.

The procedures of steps S243 and S244 are the same as the procedures of steps S72 and S73 of FIG. 13, and therefore, explanation of them is not repeated herein.

Figure 29:
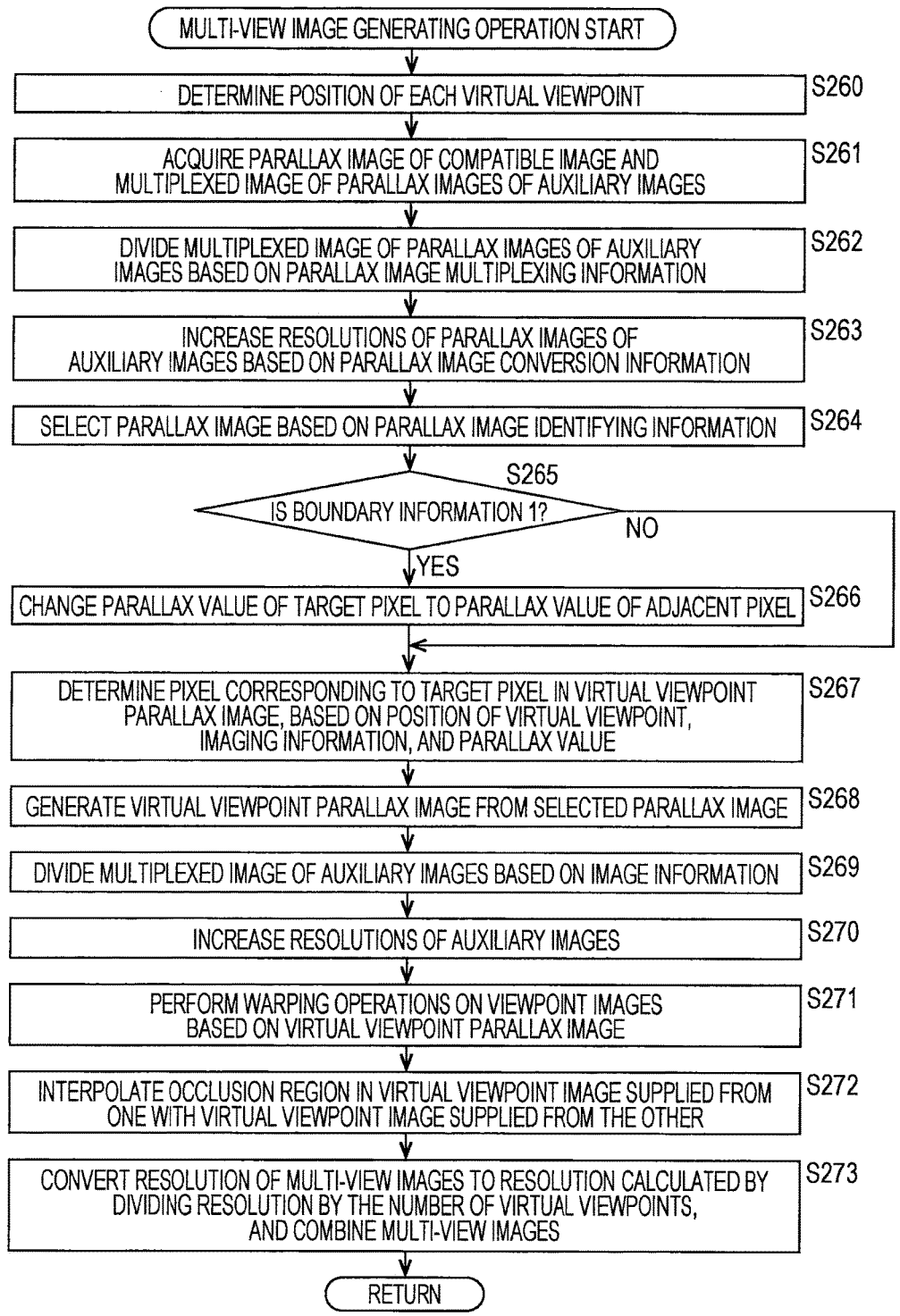
FIG. 29 is a flowchart for explaining in detail the multi-view image generating operation of FIG. 28.

FIG. 29 is a flowchart for explaining in detail the multi-view image generating operation of step S242 of FIG. 28.

The procedures of steps S260 through S273 of FIG. 29 are the same as those in the multi-view image generating operation shown in FIG. 14, except that the procedure of step S93 of FIG. 14 is replaced with the procedure of step S263.

In the procedure of step S263, based on the parallax image conversion information supplied from the parallax image conversion information acquiring unit 352, the parallax image resolution increasing unit 391 increases the resolutions of the respective parallax images of the viewpoint image B1 and the viewpoint image C1, which are the auxiliary images supplied from the parallax image separating unit 161.

As described above, based on the parallax image conversion information transmitted from the encoding device 300, the decoding device 350 increases the resolutions of the parallax images of auxiliary images with reduced resolutions. Accordingly, the parallax images with the increased resolutions are more similar to the parallax images having their resolutions not yet reduced. Based on the boundary information, the decoding device 350 can then perform warping operations on the parallax images of the auxiliary images similar to the parallax images having their resolutions not yet reduced. Thus, more accurate warping operations can be performed on parallax images of auxiliary images.

In the third embodiment, only the boundary information is transmitted from the encoding device 300 to the decoding device 350, as in the first embodiment. However, the left-side boundary information may also be transmitted as in the second embodiment.

Also, in the first through third embodiments, the number of viewpoints of viewpoint images to be captured is three, but the number of viewpoints is not limited to that. Although inter-viewpoint distances are detected by the imaging information generating unit 56, inter-viewpoint distances may be acquired from the imaging units 51A through 51C.

Further, in the first through third embodiments, the boundary information is used only for parallax image warping operations. However, the boundary information may also be used for decoding, increasing resolutions, and the like. In the first through third embodiments, the parallax values of the pixels adjacent to the boundary position are the same as the parallax values of the adjacent pixels located on the left or right side of the pixels. However, the parallax values of the pixels adjacent to the boundary position may be calculated by performing a weighting addition on the parallax values of the adjacent pixels located on the right and left sides. In this case, in the second embodiment, the parallax values of the left-side pixels adjacent to the boundary position are changed to parallax values obtained by performing a weighting addition so that the weight of the adjacent pixels located on the left side of the pixels becomes greater than the weight of the adjacent pixels located on the right side. Also, the parallax values of the right-side pixels adjacent to the boundary position are changed to parallax values obtained by performing a weighting addition so that the weight of the adjacent pixels located on the right side of the pixels becomes greater than the weight of the adjacent pixels located on the left side.

An image processing device of the present technique can also be applied to a display device or a reproducing device such as a television receiver. In the present technique, the number of pixels adjacent to the boundary position is not limited to two, and the pixels adjacent to the boundary position may include pixels that are adjacent to and are located on the left side of the boundary position, and pixels that are adjacent to and are located on the right side of the boundary position.

Further, the image information, the imaging information, the parallax image multiplexing information, the compatibility information, the boundary information, the left-side boundary information, and the parallax image conversion information may not be encoded, and may be transmitted through a different route from encoded streams. Alternatively, the image information, the imaging information, the parallax image multiplexing information, the compatibility information, the boundary information, the left-side boundary information, and the parallax image conversion information may be encoded, and then be transmitted through a different route from encoded streams.

Also, the image information, the imaging information, the parallax image multiplexing information, the compatibility information, the boundary information, the left-side boundary information, and the parallax image conversion information may not be encoded, and may be written in a predetermined area in an encoded stream, or may be encoded and be written in a predetermined area in an encoded stream.

<Fourth Embodiment>

[Description of a Computer to which the Present Technique is Applied]

The above described series of operations can be performed with hardware, and can also be performed with software. Where the series of operations are performed with software, the program that forms the software is installed into a general-purpose computer or the like.

Figure 31:
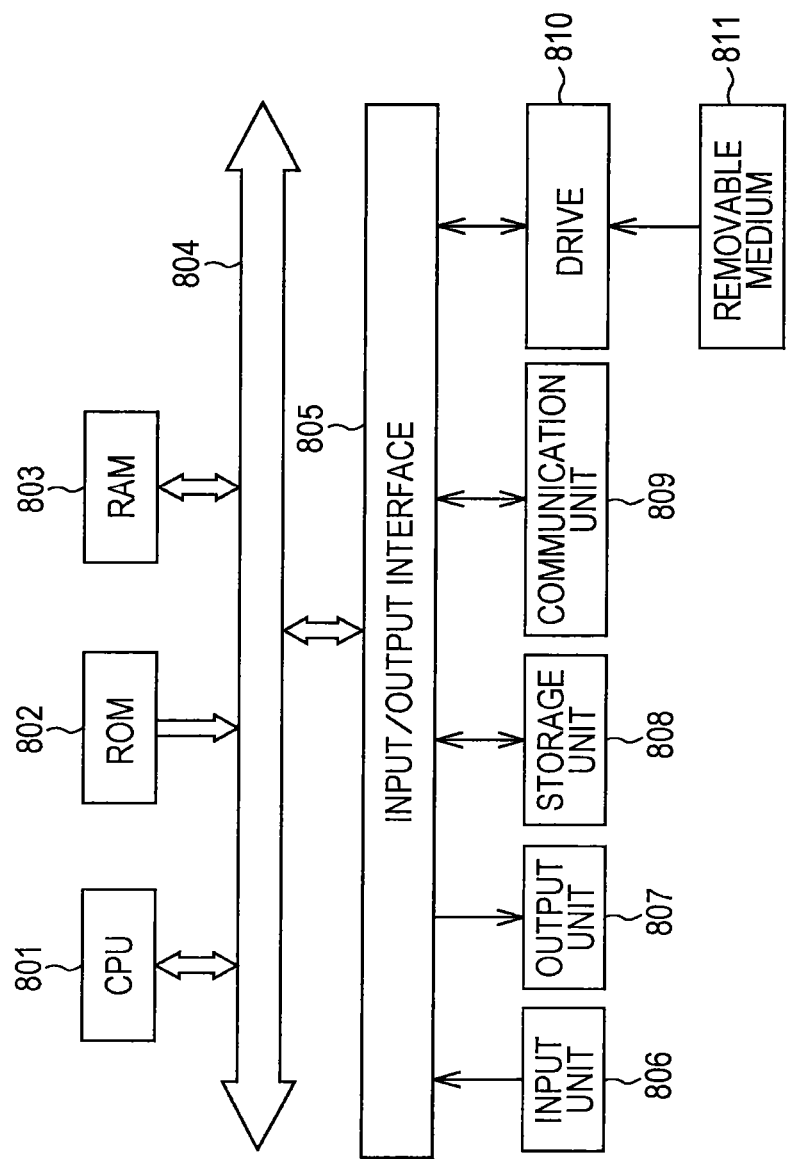
FIG. 31 is a diagram showing an example structure of an embodiment of a computer.

In view of this, FIG. 31 shows an example structure of an embodiment of a computer into which the program for performing the above described series of operations is installed.

The program can be recorded beforehand in a storage unit 808 or a ROM (Read Only Memory) 802 provided as a recording medium in the computer.

Alternatively, the program can be stored (recorded) in a removable medium 811. Such a removable medium 811 can be provided as so-called packaged software. Here, the removable medium 811 may be a flexible disk, a CD-ROM (Compact Disc Read Only Memory), an MO (Magneto Optical) disk, a DVD (Digital Versatile Disc), a magnetic disk, or a semiconductor memory, for example.

The program can be installed into the computer from the above described removable medium 811 via a drive 810, but can also be downloaded into the computer via a communication network or a broadcasting network and be installed into the internal storage unit 808. That is, the program can be wirelessly transferred from a download site, for example, to the computer via an artificial satellite for digital satellite broadcasting, or can be transferred by cable to the computer via a network such as a LAN (Local Area Network) or the Internet.

The computer includes a CPU (Central Processing Unit) 801, and an input/output interface 805 is connected to the CPU 801 via a bus 804.

When an instruction is input by a user operating an input unit 806 or the like via the input/output interface 805, the CPU 801 executes the program stored in the ROM 802 accordingly. Alternatively, the CPU 801 loads the program stored in the storage unit 808 into a RAM (Random Access Memory) 803, and executes the program.

By doing so, the CPU 801 performs the operations according to the above described flowcharts, or performs the operations with the structures illustrated in the above described block diagrams. Where necessary, the CPU 801 outputs the operation results from an output unit 807 or transmit the operation results from a communication unit 809, via the input/output interface 805, for example, and further stores the operation results into the storage unit 808.

The input unit 806 is formed with a keyboard, a mouse, a microphone, and the like. The output unit 807 is formed with a LCD (Liquid Crystal Display), a speaker, and the like.

In this specification, the operations performed by the computer in accordance with the program are not necessarily performed in chronological order compliant with the sequences shown in the flowcharts. That is, the operations to be performed by the computer in accordance with the program include operations to be performed in parallel or independently of one another (such as parallel operations or object-based operations).

The program may be executed by one computer (processor), or may be executed in a distributive manner by more than one computer. Further, the program may be transferred to a remote computer, and be executed therein.

The present technique can be applied to an encoding device and a decoding device that are used for reception via a network medium such as satellite broadcasting, cable TV (television), the Internet, or a portable telephone device, or for processing in a storage medium such as an optical or magnetic disk or a flash memory.

The above described encoding device and decoding device can also be applied to any electronic apparatuses. The following is a description of such examples.

<Fifth Embodiment>
[Example Structure of a Television Apparatus]

Figure 32:
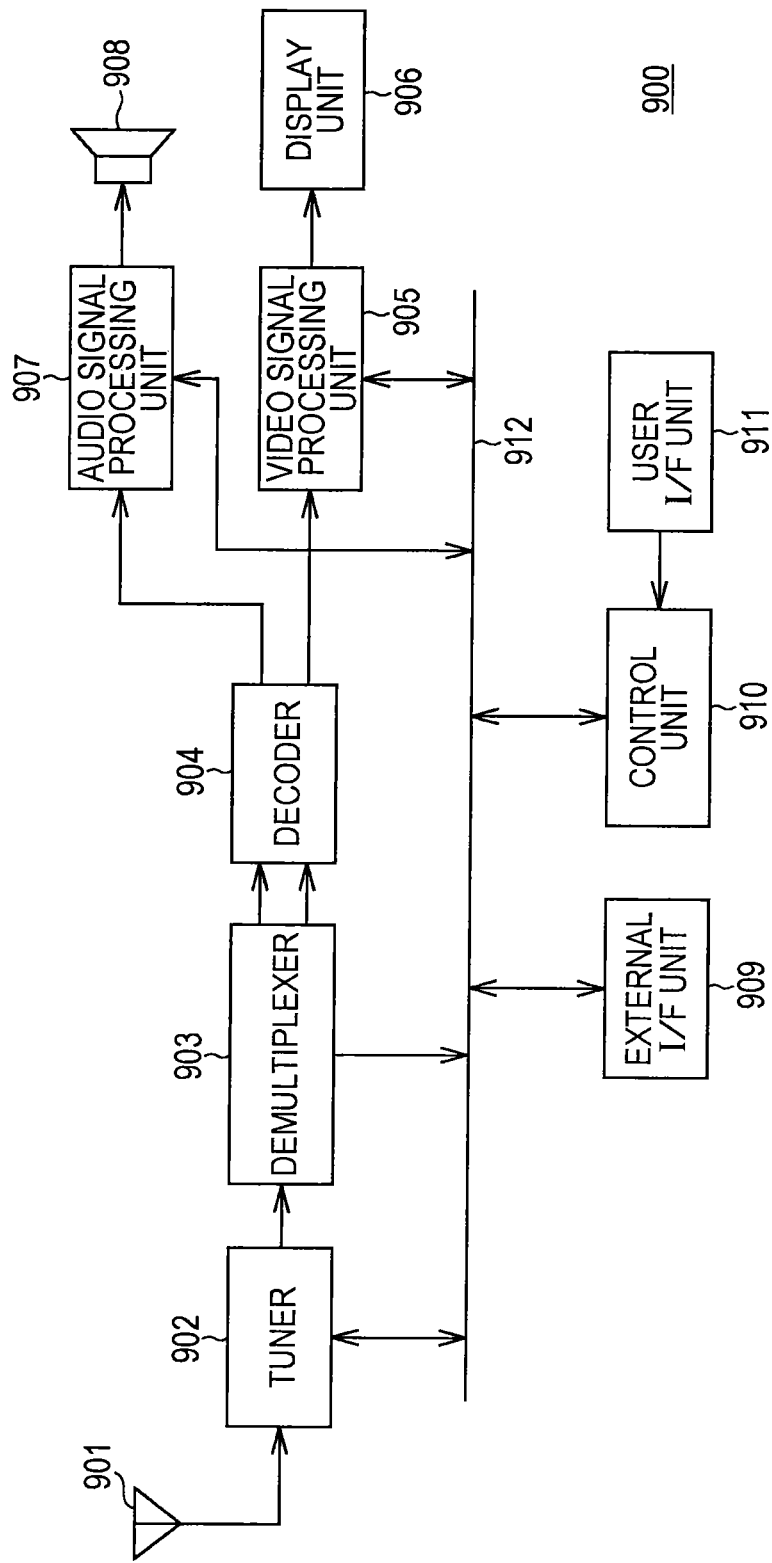
FIG. 32 is a diagram schematically showing the structure of a television apparatus to which the present technique is applied.

FIG. 32 schematically shows an example structure of a television apparatus to which the present technique is applied. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910, a user interface unit 911, and the like.

The tuner 902 selects a desired channel from broadcast wave signals received at the antenna 901, and performs demodulation. The resultant encoded bit stream is output to the demultiplexer 903.

The demultiplexer 903 extracts the video and audio packets of the show to be viewed from the encoded bit stream, and outputs the data of the extracted packets to the decoder 904. The demultiplexer 903 also supplies a packet of data such as EPG (Electronic Program Guide) to the control unit 910. Where scrambling is performed, the demultiplexer or the like cancels the scrambling.

The decoder 904 performs a packet decoding operation, and outputs the video data generated through the decoding operation to the video signal processing unit 905, and the audio data to the audio signal processing unit 907.

The video signal processing unit 905 subjects the video data to a noise removal and video processing or the like in accordance with user settings. The video signal processing unit 905 generates video data of the show to be displayed on the display unit 906, or generates image data or the like through an operation based on an application supplied via a network. The video signal processing unit 905 also generates video data for displaying a menu screen or the like for item selection, and superimposes the video data on the video data of the show. Based on the video data generated in this manner, the video signal processing unit 905 generates a drive signal to drive the display unit 906.

Based on the drive signal from the video signal processing unit 905, the display unit 906 drives a display device (a liquid crystal display element, for example) to display the video of the show.

The audio signal processing unit 907 subjects the audio data to predetermined processing such as a noise removal, and performs a D/A conversion operation and an amplification operation on the processed audio data. The resultant audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal reception unit, and the like, and supplies an operating signal according to a user operation to the control unit 910.

The control unit 910 is formed with a CPU (Central Processing Unit), a memory, and the like. The memory stores the program to be executed by the CPU, various kinds of data necessary for the CPU to perform operations, the EPG data, data obtained via a network, and the like. The program stored in the memory is read and executed by the CPU at a predetermined time such as the time of activation of the television apparatus 900. The CPU executes the program to control the respective components so that the television apparatus 900 operates in accordance with a user operation.

In the television apparatus 900, a bus 912 is provided for connecting the tuner 902, the demultiplexer 903, the video signal processing unit 905, the audio signal processing unit 907, the external interface unit 909, and the like, to the control unit 910.

In the television apparatus having such a structure, the function of an image processing device (an image processing method) of the present invention is provided in the decoder 904. Accordingly, when multi-view images are generated by decoding an encoded bit stream containing a parallax image having its resolution reduced, accurate parallax image warping operations can be performed.

<Sixth Embodiment>
[Example Structure of a Portable Telephone Device]

Figure 33:
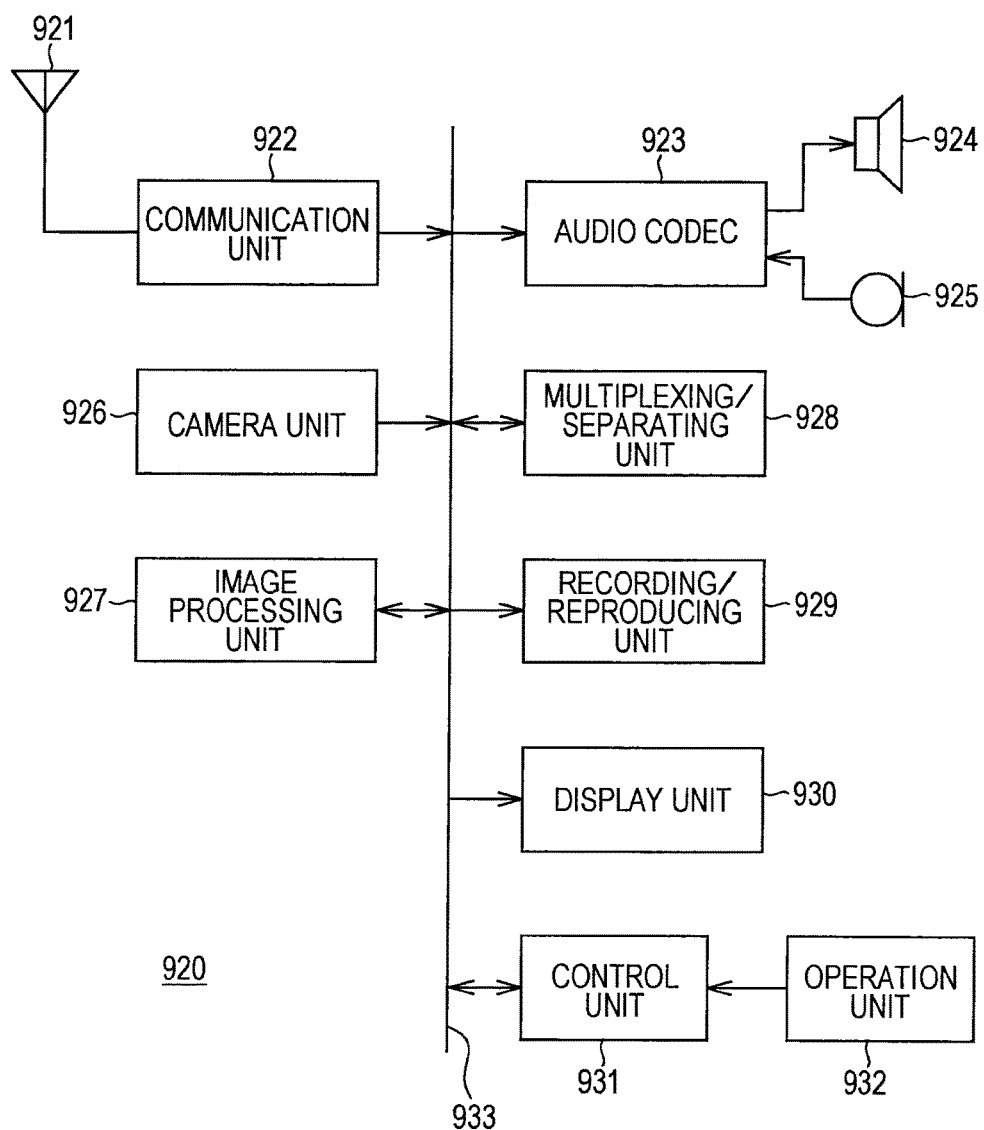
FIG. 33 is a diagram schematically showing the structure of a portable telephone device to which the present technique is applied.

FIG. 33 schematically shows an example structure of a portable telephone device to which the present technique is applied. The portable telephone device 920 includes a communication unit 922, an audio codec 923, a camera unit 926, an image processing unit 927, a multiplexing/separating unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone device 920 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation operation, a frequency conversion operation, and the like on the audio data, to generate a transmission signal. The communication unit 922 also supplies the transmission signal to the antenna 921, and the transmission signal is transmitted to a base station (not shown). The communication unit 922 also amplifies a signal received at the antenna 921, and performs a frequency conversion operation, a demodulation operation, and the like. The resultant audio data is supplied to the audio codec 923. The audio codec 923 decompresses audio data, and converts the audio data into an analog audio signal to be output to the speaker 924.

When mail transmission is performed in the data communication mode, the control unit 931 receives text data that is input by operating the operation unit 932, and the input text is displayed on the display unit 930. In accordance with a user instruction or the like through the operation unit 932, the control unit 931 generates and supplies mail data to the communication unit 922. The communication unit 922 performs a modulation operation, a frequency conversion operation, and the like on the mail data, and transmits the resultant transmission signal from the antenna 921. The communication unit 922 also amplifies a signal received at the antenna 921, and performs a frequency conversion operation, a demodulation operation, and the like, to restore the mail data. This mail data is supplied to the display unit 930, and the content of the mail is displayed.

The portable telephone device 920 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a USB memory, or a memory card.

When image data is transmitted in the data communication mode, image data generated at the camera unit 926 is supplied to the image processing unit 927. The image processing unit 927 performs an encoding operation on the image data, to generate encoded data.

The multiplexing/separating unit 928 multiplexes the encoded data generated at the image processing unit 927 and the audio data supplied from the audio codec 923 by a predetermined technique, and supplies the multiplexed data to the communication unit 922. The communication unit 922 performs a modulation operation, a frequency conversion operation, and the like on the multiplexed data, and transmits the resultant transmission signal from the antenna 921. The communication unit 922 also amplifies a signal received at the antenna 921, and performs a frequency conversion operation, a demodulation operation, and the like, to restore the multiplexed data. This multiplexed data is supplied to the multiplexing/separating unit 928. The multiplexing/separating unit 928 divides the multiplexed data, and supplies the encoded data to the image processing unit 927, and the audio data to the audio codec 923. The image processing unit 927 performs a decoding operation on the encoded data, to generate image data. This image data is supplied to the display unit 930, to display the received images. The audio codec 923 converts the audio data into an analog audio signal, and supplies the analog audio signal to the speaker 924, so that the received sound is output.

In the portable telephone device having such a structure, the function of an image processing device (an image processing method) of the present invention is provided in the image processing unit 927. Accordingly, when multiview images are generated by decoding encoded data containing a parallax image having its resolution reduced in image data communication, accurate parallax image warping operations can be performed.

<Seventh Embodiment>
[Example Structure of a Recording/Reproducing Device]

Figure 34:
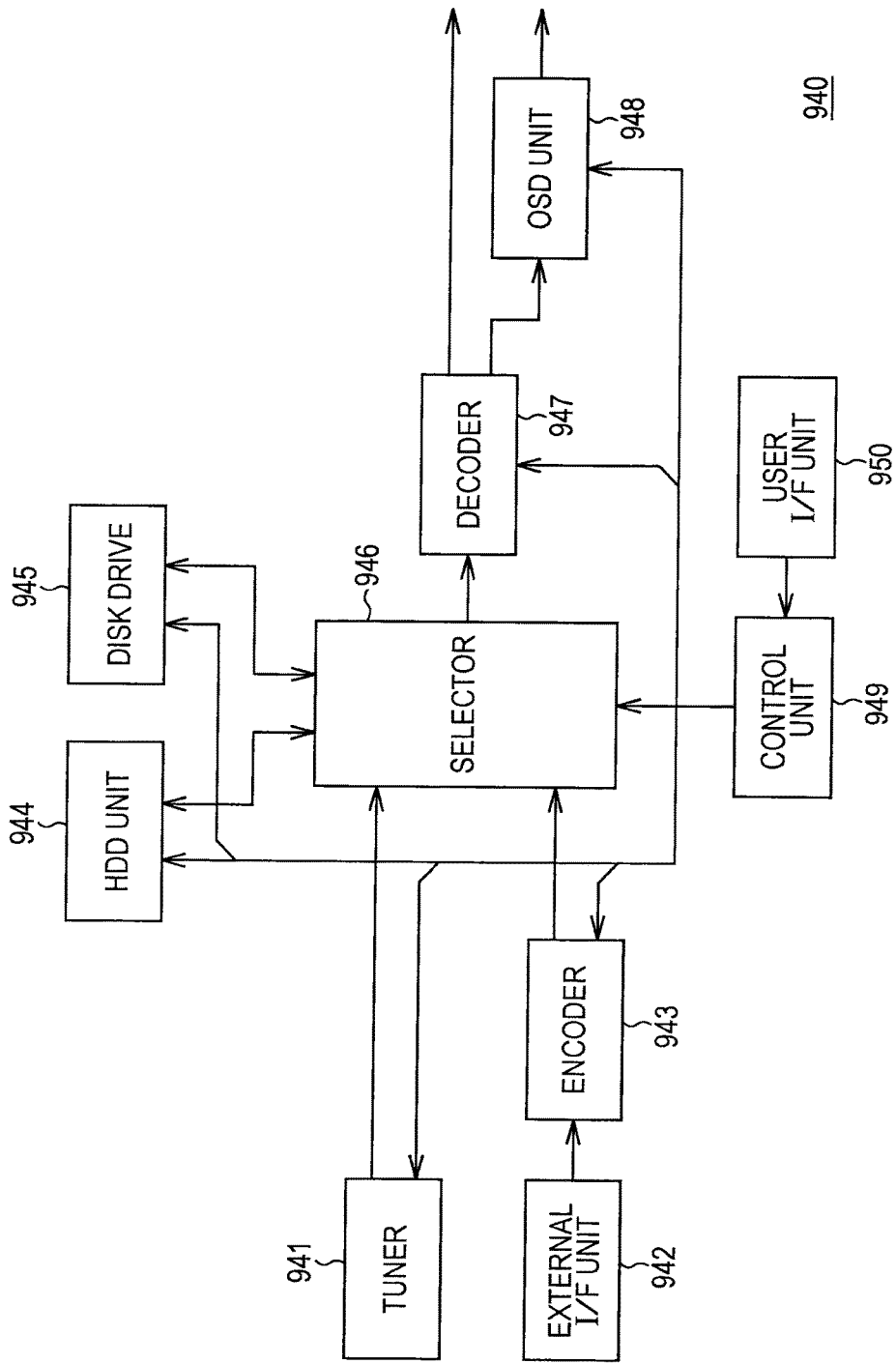
FIG. 34 is a diagram schematically showing the structure of a recording/reproducing device to which the present technique is applied.

FIG. 34 schematically shows an example structure of a recording/reproducing device to which the present technique is applied. The recording/reproducing device 940 records the audio data and video data of a received broadcast show on a recording medium, for example, and provides the recorded data to a user at the time according to an instruction from the user. The recording/reproducing device 940 can also obtain audio data and video data from another device, for example, and record the data on a recording medium. Further, the recording/reproducing device 940 decodes and outputs audio data and video data recorded on a recording medium, so that a monitor device or the like can display images and outputs sound.

The recording/reproducing device 940 includes a tuner 941, an external interface unit 942, an encoder 943, a HDD (Hard Disk Drive) unit 944, a disk drive 945, a selector 946, a decoder 947, an OSD (On-Screen Display) unit 948, a control unit 949, and a user interface unit 950.

The tuner 941 selects a desired channel from broadcast signals received at an antenna (not shown). The tuner 941 demodulates the received signal of the desired channel, and outputs the resultant encoded bit stream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded and the like.

The encoder 943 performs predetermined encoding on video data and audio data that are supplied from the external interface unit 942 and are not encoded, and outputs an encoded bit stream to the selector 946.

The HDD unit 944 records content data such as videos and sound, various kinds of programs, other data, and the like on an internal hard disk, and reads the data from the hard disk at the time of reproduction or the like.

The disk drive 945 performs signal recording and reproduction on a mounted optical disk. The optical disk may be a DVD disk (such as a DVD-Video, a DVD-RAM, a DVD-R, a DVD-RW, a DVD+R, or a DVD+RW) or a Blu-ray disc, for example.

The selector 946 selects an encoded bit stream from the tuner 941 or the encoder 943 at the time of video and audio recording, and supplies the encoded bit stream to either the HDD unit 944 or the disk drive 945. The selector 946 also supplies an encoded bit stream output from the HDD unit 944 or the disk drive 945 to the decoder 947 at the time of video and audio reproduction.

The decoder 947 performs a decoding operation on an encoded bit stream. The decoder 947 supplies the video data generated by performing the decoding to the OSD unit 948. The decoder 947 also outputs the audio data generated by performing the decoding.

The OSD unit 948 generates video data for displaying a menu screen or the like for item selection, and superimposes the video data on video data output from the decoder 947.

The user interface unit 950 is connected to the control unit 949. The user interface unit 950 is formed with operation switches, a remote control signal reception unit, and the like, and supplies an operating signal according to a user operation to the control unit 949.

The control unit 949 is formed with a CPU, a memory, and the like. The memory stores the program to be executed by the CPU, and various kinds of data necessary for the CPU to perform operations. The program stored in the memory is read and executed by the CPU at a predetermined time such as the time of activation of the recording/reproducing device 940. The CPU executes the program to control the respective components so that the recording/reproducing device 940 operates in accordance with a user operation.

In the recording/reproducing device having the above structure, the encoder 943 has the functions of an image processing device (an image processing method) of the present invention. Accordingly, an encoded bit stream containing parallax images with reduced resolutions can be output so that accurate parallax image warping operations can be performed on the decoding side.

<Eighth Embodiment>
[Example Structure of an Imaging Device]

Figure 35:
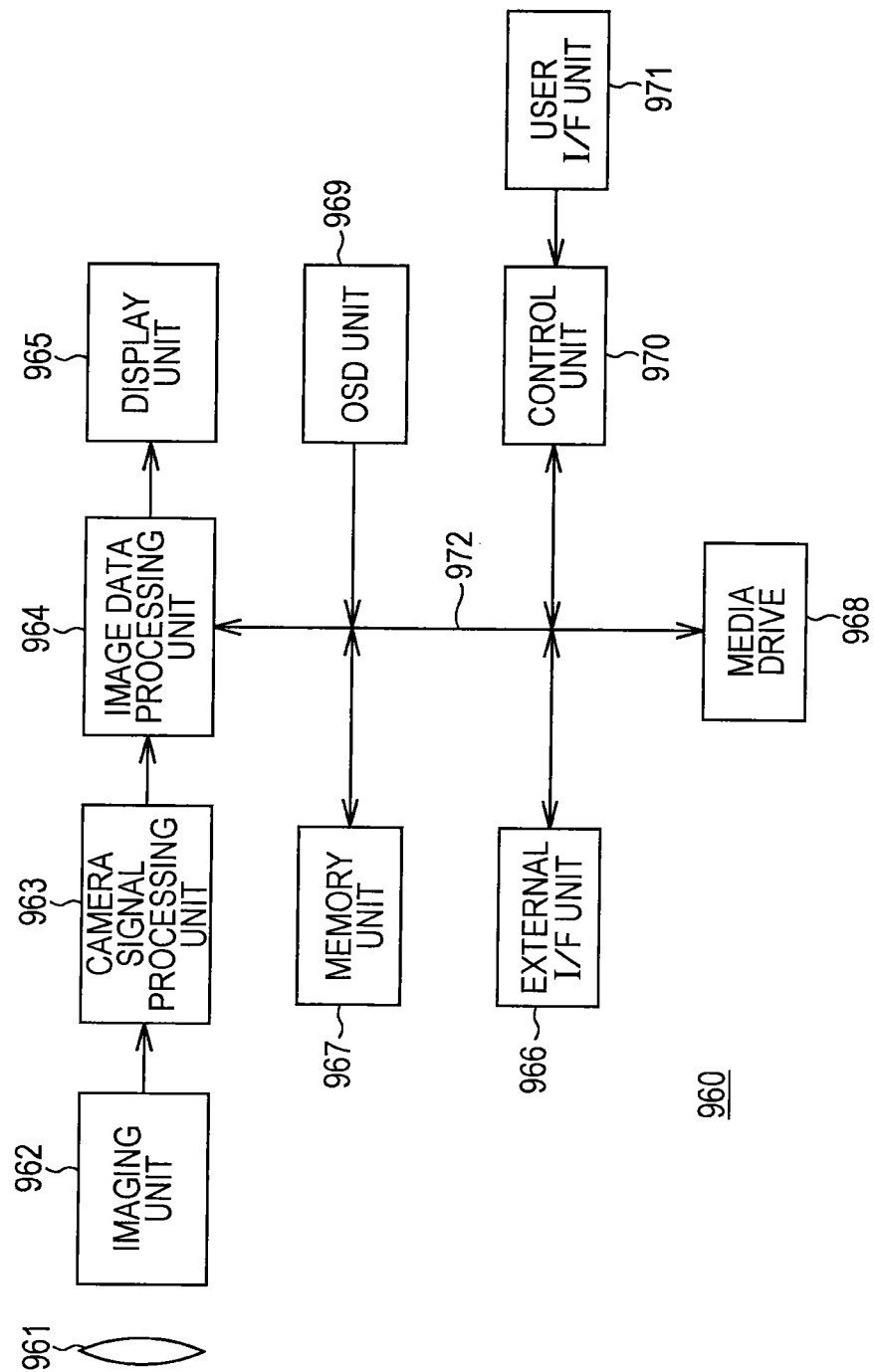
FIG. 35 is a diagram schematically showing the structure of an imaging device to which the present technique is applied.

FIG. 35 schematically shows an example structure of an imaging device to which the present technique is applied. An imaging device 960 captures an image of an object, and causes a display unit to display the image of the object or records the image as image data on a recording medium.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. Further, the image data processing unit 964, the external interface unit 966, the memory unit 967, the media drive 968, the OSD unit 969, the control unit 970, and the like are connected via a bus 972.

The optical block 961 is formed with a focus lens, a diaphragm, and the like. The optical block 961 forms an optical image of an object on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing such as a knee correction, a gamma correction, and a color correction on the electrical signal supplied from the imaging unit 962. The camera signal processing unit 963 supplies the image data subjected to the camera signal processing to the image data processing unit 964.

The image data processing unit 964 performs an encoding operation on the image data supplied from the camera signal processing unit 963. The image data processing unit 964 supplies the encoded data generated by performing the encoding operation, to the external interface unit 966 and the media drive 968. The image data processing unit 964 also performs a decoding operation on the encoded data supplied from the external interface unit 966 and the media drive 968. The image data processing unit 964 supplies the image data generated by performing the decoding operation to the display unit 965. The image data processing unit 964 also performs an operation to supply the image data supplied from the camera signal processing unit 963 to the display unit 965, or superimposes display data obtained from the OSD unit 969 on the image data and supplies the image data to the display unit 965.

The OSD unit 969 generates display data of a menu screen and icons formed with symbols, characters, or figures, and outputs the data to the image data processing unit 964.

The external interface unit 966 is formed with a USB input/output terminal and the like, for example, and is connected to a printer when image printing is performed. A drive is also connected to the external interface unit 966 where necessary, and a removable medium such as a magnetic disk or an optical disk is mounted on the drive as appropriate. A computer program read from such a removable disk is installed where necessary. Further, the external interface unit 966 includes a network interface connected to a predetermined network such as a LAN or the Internet. The control unit 970 reads encoded data from the memory unit 967 in accordance with an instruction from the user interface unit 971, for example, and can supply the encoded data from the external interface unit 966 to another device connected thereto via a network. The control unit 970 can also obtain, via the external interface unit 966, encoded data or image data supplied from another device via a network, and supply the encoded data or image data to the image data processing unit 964.

A recording medium to be driven by the media drive 968 may be a readable/rewritable removable medium such as a magnetic disk, a magnetooptical disk, an optical disk, or a semiconductor memory. The recording medium may be any type of removable medium, and may be a tape device, a disk, or a memory card. The recording medium may of course be a non-contact IC card or the like.

Alternatively, the media drive 968 and a recording medium may be integrated, and may be formed with an immobile storage medium such as an internal hard disk drive or a SSD (Solid State Drive).

The control unit 970 is formed with a CPU, a memory, and the like. The memory stores the program to be executed by the CPU, various kinds of data necessary for the CPU to perform operations, and the like. The program stored in the memory is read and executed by the CPU at a predetermined time such as the time of activation of the imaging device 960. The CPU executes the program to control the respective components so that the imaging device 960 operates in accordance with a user operation.

In the imaging apparatus having the above structure, the image data processing unit 964 has the functions of an image processing device (an image processing method) of the present invention. Accordingly, when multi-view images are generated by decoding encoded data that is recorded in the memory unit 967, a recording medium, or the like and contain parallax images with reduced resolutions in image data communication, accurate parallax image warping operations can be performed.

It should be noted that embodiments of the present technique are not limited to the above described embodiments, and various modifications may be made to them without departing from the scope of the present technique.

REFERENCE SIGNS LIST

50 Encoding device, 53 Parallax image generating unit, 58 Boundary information generating unit, 60 Multiplexing unit, 62 Auxiliary encoder, 120 Decoding device, 121 Separating unit, 132 Auxiliary decoder, 162 Parallax image resolution increasing unit, 163, 164 Parallax image warping unit, 165, 166 Viewpoint image warping unit, 169 Multi-view image generating unit, 200 Encoding device, 201 Boundary information generating unit, 211 Auxiliary encoder, 220 Decoding device, 231 Auxiliary decoder, 251, 252 Parallax image warping unit, 300 Encoding device, 301 Parallax image generating unit, 311 Auxiliary encoder, 350 Decoding device, 361 Auxiliary decoder, 391 Parallax image resolution increasing unit

The invention claimed is:

1. An image processing device, comprising:
at least one processor configured to:
reduce a resolution of a depth image;
detect a boundary position on the depth image, where pixel values in the depth image vary, based on a pixel value difference that is larger than a threshold value, wherein the pixel value difference is between a plurality of first adjacent pixels in a horizontal direction in the depth image;
generate boundary information on a pixel basis, wherein the boundary information indicates the plurality of first adjacent pixels adjacent to the boundary position, based on the boundary position;
generate left-side boundary information on the pixel basis, wherein the left-side boundary information indicates a plurality of second adjacent pixels located on a left side of the boundary position among the plurality of first adjacent pixels indicated by the boundary information,
wherein, in an increased resolution depth image derived from the depth image having reduced resolution, a first pixel value of a plurality of first pixels adjacent to a plurality of second pixels is changed to a second pixel value of the plurality of second pixels, and wherein the first pixel value is changed to the second pixel value based on the boundary information and the left-side boundary information; and transmit the depth image having the reduced resolution, the boundary information, and the left-side boundary information.

2. The image processing device according to claim 1, wherein
the at least one processor are further configured to transmit the depth image having the reduced resolution, the boundary information, and resolution conversion information.

3. The image processing device according to claim 1, wherein
the at least one processor is further configured to:
encode the depth image, having the reduced resolution, on a block basis,
generate the boundary information on one of the pixel basis or on the block basis, and
transmit the encoded depth image, and the generated boundary information.

4. The image processing device according to claim 1, wherein the at least one processor is further configured to transmit a viewpoint image, the depth image having the reduced resolution, and the boundary information.

5. The image processing device according to claim 1, wherein the at least one processor is further configured to set the generated boundary information to "1" based on the pixel value difference that is larger than the threshold value.

6. The image processing device according to claim 1, wherein the at least one processor is further configured to set the generated boundary information to "0" based on the pixel value difference that is smaller than the threshold value.

7. The image processing device according to claim 1, wherein a plurality of pixels adjacent to the boundary position include at least one pattern, wherein the at least one pattern is different for the plurality of first adjacent pixels.

8. The image processing device according to claim 7, wherein the at least one processor is further configured to detect the boundary position based on a difference of the at least one pattern for the plurality of first adjacent pixels.

9. An image processing method, comprising:
in an image processing device:
reducing a resolution of a depth image;
detecting a boundary position on the depth image, where pixel values in the depth image vary, based on a pixel value difference that is larger than a threshold value,
wherein the pixel value difference is between a plurality of first adjacent pixels in a horizontal direction of the depth image;
generating boundary information on a pixel basis, wherein the boundary information indicates the plurality of first adjacent pixels adjacent to the boundary position, based on the boundary position;
generating left-side boundary information on the pixel basis, wherein the left-side boundary information indicates a plurality of second adjacent pixels located on a left side of the boundary position among the plurality of first adjacent pixels indicated by the boundary information, wherein, in an increased resolution depth image derived from the depth image having reduced resolution, a first pixel value of a plurality of first pixels adjacent to a plurality of second pixels is changed to a second pixel value of the plurality of second pixels, and wherein the first pixel value is changed to the second pixel value based on the boundary information and the left-side boundary information; and transmitting the depth image having the reduced resolution, the generated boundary information, and the left-side boundary information.

10. An image processing device, comprising:
at least one processor configured to:
receive a first depth image having a reduced resolution, and boundary information which indicates a plurality of first pixels adjacent to a boundary position where a plurality of pixel values in the first depth image vary;
increase resolution of the first depth image;
generate a second depth image of a virtual viewpoint based on the first depth image having the increased resolution, the boundary information, and a position of the virtual viewpoint; and
based on the boundary information, change a first pixel value of the plurality of first pixels indicated by the boundary information to a second pixel value of a plurality of second pixels adjacent to the plurality of first pixels in the first depth image having the increased resolution.

11. The image processing device according to claim 10, wherein
the at least one processor is further configured to:
receive the first depth image having the reduced resolution, the boundary information on a pixel basis, and left-side boundary information that indicates a plurality of third pixels located on a left side of the boundary position among the plurality of first pixels indicated by the boundary information, and
based on the boundary information, the left-side boundary information, and the position of the virtual viewpoint, process the first depth image having the increased resolution.

12. The image processing device according to claim 11, wherein, based on the boundary information and the left-side boundary information, the at least one processor is further configured to change a third pixel value of the plurality of first pixels indicated by the boundary information and the left-side boundary information to a fourth pixel value of left-side pixels adjacent to the plurality of first pixels in the first depth image having the increased resolution.

13. The image processing device according to claim 12, wherein the at least one processor is further configured to change a fifth pixel value of a plurality of fourth pixels different from the first pixel value of the plurality of first pixels indicated by the boundary information and the left-side boundary information to a sixth pixel value of right-side pixels adjacent to the plurality of first pixels.

14. The image processing device according to claim 10, wherein
the at least one processor is further configured to:
receive the first depth image having the reduced resolution, the boundary information, and resolution conversion information for the reduced resolution, and
increase resolution of the received first depth image based on the resolution conversion information.

15. The image processing device according to claim 14, wherein the at least one processor is further configured to increase resolution of the first depth image based on interpolation of a seventh pixel value of each pixel in the first depth image having the increased resolution with an eight pixel value of each pixel in the first depth image having the reduced resolution.

16. The image processing device according to claim 14, wherein the at least one processor is further configured to increase resolution of the first depth image based on linear interpolation of the first depth image having the reduced resolution.

17. The image processing device according to claim 10, wherein the at least one processor is further configured to:
decode an encoded first depth image, wherein an encode of the first depth image is executed on a block basis,
receive the encoded first depth image, and the boundary information on one of a pixel basis or on the block basis,
decode the encoded first depth image based on the block basis, and
increase resolution of the decoded first depth image.

18. The image processing device according to claim 10, wherein the at least one processor is further configured to generate a viewpoint image of the virtual viewpoint, based on the second depth image of the virtual viewpoint.

19. The image processing device according to claim 18, wherein the at least one processor is further configured to interpolate an occlusion region in the viewpoint image of the virtual viewpoint, wherein the occlusion region is a first region which exists in the viewpoint image of the virtual viewpoint while the occlusion region is a second region non-existent in the viewpoint image corresponding to the second depth image.

20. The image processing device according to claim 19, wherein
the at least one processor is further configured to:
receive a first viewpoint image of a first viewpoint, a second viewpoint image of a second viewpoint, the first depth image having the reduced resolution, and the boundary information,
generate a third depth image of the virtual viewpoint based on a fourth depth image of the first viewpoint having an increased resolution, the boundary information about the first viewpoint, and the position of the virtual viewpoint, and
generate a fifth depth image of the virtual viewpoint based on a sixth depth image of the second viewpoint having the increased resolution, the boundary information about the second viewpoint, and the position of the virtual viewpoint,
generate the first viewpoint image of the virtual viewpoint based on the first viewpoint and the third depth image of the viewpoint image,
generate the second viewpoint image of the virtual viewpoint based on the second viewpoint and the fifth depth image, and
interpolate the occlusion region of one of the first viewpoint image or the second viewpoint image of the virtual viewpoint, with the occlusion region of the other one of the first viewpoint image or the second viewpoint image.

21. An image processing method, comprising:
receiving a first depth image having a reduced resolution, and boundary information which indicates a plurality of first pixels adjacent to a boundary position where a plurality of pixel values in the first depth image vary;
increasing resolution of the received first depth image; and
generating a second depth image of a virtual viewpoint based on the first depth image having the increased resolution, the boundary information and a position of the virtual viewpoint,
wherein, based on the boundary information, changing a first pixel value of the plurality of first pixels indicated by the boundary information to a second pixel value of a plurality of second pixels adjacent to the plurality of first pixels in the first depth image having the increased resolution.

* * * * *